(12) United States Patent
Molhoek et al.

(10) Patent No.: US 11,807,781 B2
(45) Date of Patent: Nov. 7, 2023

(54) ONE-COMPONENT (1K) THERMOSETTING POWDER COATING COMPOSITIONS FOR IMPACT RESISTANT AND LOW GLOSS CONSISTENT MATT POWDER COATINGS

(71) Applicant: Covestro (Netherlands) B.V., Geleen (NL)

(72) Inventors: Leendert Jan Molhoek, Echt (NL); Nicole Anne Marie Willems, Echt (NL); Wouter Van Houts, Echt (NL); Menno Ferdinand Van Hierden, Echt (NL); Paulus Franciscus Anna Buijsen, Echt (NL)

(73) Assignee: Covestro (Netherlands) B.V., Geleen (NL)

( * ) Notice: Subject to any disclaimer, the term of this patent is extended or adjusted under 35 U.S.C. 154(b) by 711 days.

(21) Appl. No.: 16/977,291

(22) PCT Filed: Mar. 8, 2019

(86) PCT No.: PCT/EP2019/055830
§ 371 (c)(1),
(2) Date: Sep. 1, 2020

(87) PCT Pub. No.: WO2019/170854
PCT Pub. Date: Sep. 12, 2019

(65) Prior Publication Data
US 2021/0002492 A1    Jan. 7, 2021

(30) Foreign Application Priority Data
Mar. 8, 2018  (EP) ..................................... 18160651

(51) Int. Cl.
| | |
|---|---|
| C09D 5/00 | (2006.01) |
| C09D 5/03 | (2006.01) |
| B05D 1/06 | (2006.01) |
| C08G 63/183 | (2006.01) |
| C08G 63/60 | (2006.01) |
| C08K 5/00 | (2006.01) |
| C08K 5/20 | (2006.01) |
| C09D 167/02 | (2006.01) |

(52) U.S. Cl.
CPC .............. *C09D 5/032* (2013.01); *B05D 1/06* (2013.01); *C08G 63/183* (2013.01); *C08G 63/60* (2013.01); *C08K 5/0025* (2013.01); *C08K 5/20* (2013.01); *C09D 5/035* (2013.01); *C09D 167/02* (2013.01); *C08G 2150/20* (2013.01)

(58) Field of Classification Search
CPC ........ C09D 5/033; C09D 5/03; C08G 63/183; C08G 2150/20
See application file for complete search history.

(56) References Cited

U.S. PATENT DOCUMENTS

| | | | |
|---|---|---|---|
| 2004/0143073 A1* | 7/2004 | Bejko ................. | C09D 167/00 525/418 |
| 2017/0218222 A1* | 8/2017 | Bos ...................... | B05D 3/0263 |
| 2019/0023939 A1* | 1/2019 | Klomann ................. | C09D 5/03 |
| 2019/0161625 A1* | 5/2019 | Weaver .................... | C09D 7/63 |

FOREIGN PATENT DOCUMENTS

| | | |
|---|---|---|
| WO | 2016/012252 | 1/2016 |
| WO | 2017/203045 | 11/2017 |

OTHER PUBLICATIONS

International Search Report for PCT/EP2019/055830 dated Apr. 9, 2019, 3 pages.
Written Opinion of the ISA for PCT/EP2019/055830 dated Apr. 9, 2019, 5 pages.

* cited by examiner

*Primary Examiner* — Robert C Boyle
(74) *Attorney, Agent, or Firm* — THE WEBB LAW FIRM

(57) ABSTRACT

The invention relates to an one-component (1 K) thermosetting powder coating composition A (PCC A). The invention further relates to a process for making the thermosetting powder coating composition A and processes for coating an article with the PCC A. The invention further relates to a cured PCC A. The invention further relates to an article having coated thereon the thermosetting powder coating composition A as well as to an article having coated and cured thereon the thermosetting powder coating composition A. The invention further relates to the use of: the PCC A, the cured PCC A, articles coated with the PCC A, articles having coated and cured thereon the PCC A. The invention further relates to the use of the PCC A for matt powder coatings. The invention further relates to the use of the PCC A for matt and impact resistant powder coatings. The invention further relates to the use of the PCC A for impact resistant matt powder coatings which have also at least sufficient—preferably excellent—low gloss consistency. The invention further relates to the use of the PCC A as described in the claims and as disclosed herein for impact resistant matt powder coatings which have also at least sufficient—preferably excellent low gloss consistency, and also at least sufficient—preferably excellent—batch-to-batch low gloss consistency.

17 Claims, No Drawings

ONE-COMPONENT (1K) THERMOSETTING POWDER COATING COMPOSITIONS FOR IMPACT RESISTANT AND LOW GLOSS CONSISTENT MATT POWDER COATINGS

This application is the U.S. national phase of International Application No. PCT/EP2019/055830 filed Mar. 8, 2019 which designated the U.S. and claims priority to EP Patent Application No. 18160651.8 filed Mar. 8, 2018, the entire contents of each of which are hereby incorporated by reference.

The invention relates to an one-component (1K) thermosetting powder coating composition A (PCC A). The invention further relates to a process for making the thermosetting powder coating composition A and processes for coating an article with the PCC A. The invention further relates to a cured PCC A. The invention further relates to an article having coated thereon the thermosetting powder coating composition A as well as to an article having coated and cured thereon the thermosetting powder coating composition A. The invention further relates to the use of: the PCC A, the cured PCC A, articles coated with the PCC A, articles having coated and cured thereon the PCC A. The invention further relates to the use of the PCC A for matt powder coatings. The invention further relates to the use of the PCC A for matt and impact resistant powder coatings. The invention further relates to the use of the PCC A for impact resistant matt powder coatings which have also at least sufficient—preferably excellent—low gloss consistency. The invention further relates to the use of the PCC A as described in the claims and as disclosed herein for impact resistant matt powder coatings which have also at least sufficient—preferably excellent low gloss consistency, and also at least sufficient—preferably excellent—batch-to-batch low gloss consistency.

Powder coating compositions which are substantially dry, finely divided, free flowing, solid materials at room temperature and at atmospheric pressure, have gained considerable popularity in recent years over liquid coating compositions for a number of reasons. For one powder coatings are user and environmentally friendly materials since they are virtually free of harmful volatile organic solvents carriers that are normally present in liquid coating compositions. Therefore, powder coatings give off little, if any, volatile materials to the environment when cured. This eliminates the solvent emission problems associated with liquid coating compositions such as air pollution and dangers to the health of workers employed in coating operations. Powder coating compositions (or commonly also known as powders) are also clean and convenient to use since they are applied in a clean manner over the substrate because they are in substantially dry solid form. The powders are easily swept up in the event of a spill and do not require special cleaning and spill containment supplies, as do liquid coating compositions. Working hygiene is thus improved. Moreover, powder coating compositions are essentially 100% recyclable since the sprayed powders can be fully reclaimed and recombined with fresh powder feed. Recycling of liquid coatings during application is often not done, which leads to increased waste and hazardous waste disposal costs. In addition, powder coating compositions are ready to use, i.e., no thinning or dilution is required.

Powder coating compositions are typically finely divided particles of a polymer, and a crosslinker in case of a thermosetting powder coating composition, that also usually contain pigments, fillers, and other additives. After application to the substrate, the individual powder particles are melted in an oven and coalesce to form a continuous film typically known as a powder coating having decorative and protective properties associated with conventional organic coatings. Methods of application of powder coating compositions are considered to be fusion-coating processes; that is, at some time in the coating process the powder particles must be fused or melted. Although this is usually carried out in a convection oven, infrared and induction heating methods have also been used. Therefore, with minor exceptions, powder coatings are factory applied in fixed installations, essentially excluding their use in maintenance applications. Powder coating compositions are typically applied on a substrate via an electrostatic spray process; the powder coating composition is dispersed in an air stream and passed through a corona discharge field where the particles acquire an electrostatic charge. The charged particles are attracted to and deposited on the grounded object to be coated. The object usually at room temperature, is then placed in an oven where the powder melts and forms a powder coating. A hybrid process based on a combination of high voltage electrostatic charging and fluidized-bed application techniques (electrostatic fluidized bed) has evolved, as well as triboelectric spray application methods. Powder coating compositions and their process of application are the preferred coating compositions and process for coating many familiar items such as lawn and garden equipment, patio and other metal furniture, electrical cabinets, lighting, shelving and store fixtures, and many automotive components. Today, powder coating compositions are widely accepted, with thousands of installations in the factories of original equipment manufacturers (OEMS) and custom coating job shops.

Powder coating compositions can be thermosetting or thermoplastic. The present invention relates to the field of thermosetting powder coating compositions. The preparation of thermosetting powder coating compositions is described by Misev in 'Powder Coatings, Chemistry and Technology' (pp. 224-300; 1991, John Wiley).

In a variety of applications such as white goods (e.g. fridges, freezers, washing machines, dishwashers), furniture (e.g. tables, chairs), cable covers, docking stations, tractors, crane, forklifts, bulldozers, matt coatings and especially matt powder coatings are required. Typically, high gloss coatings are easier to achieve in respect to matt coatings. The formulation of matt thermosetting powder coatings poses a series of challenges for the formulator such as poor physical and/or mechanical properties, poor storage stability of the thermosetting powder coating composition, a process for making thermosetting powder coating compositions suitable for matt powder coatings that is expensive and difficult to control, and inconsistency of the matting effect of the powder coatings (large batch-to-batch variation) and high dependency of the curing conditions of the thermosetting powder coating compositions suitable for matt powder coatings.

The use of special matting additives/agents e.g. silicas, waxes, may assist to achieve matt powder coatings. However, their use interferes with the performance and properties of the powder coatings by compromising properties such as their mechanical properties e.g. impact resistance. And, the modern challenges for the formulator of matt powder coatings do not end here.

Two-component (2K) thermosetting powder coating compositions were employed in order improve the otherwise poor storage stability of thermosetting powder coating compositions suitable to produce matt powder coatings by physically separating the reactive parts of the thermosetting powder coating compositions, e.g. the polyester resins from the crosslinker e.g. β-hydroxyalkylamide compounds. Two-component (2K) thermosetting powder coating compositions require the preparation of at least two separate, distinct powders each of which with different chemical compositions. The at least two separate, distinct and different powders are each typically prepared via melt-mixing e.g. extrusion, and then the at least two separate, distinct and different powders are physically mixed via for example physical blending to produce the 2K thermosetting powder coating composition which is an heterogenous thermosetting powder coating composition by its method of preparation. Once the 2K thermosetting powder coating composition is prepared, it may then be either stored, or applied onto an article and cured. However, although the storage stability of the 2K thermosetting powder coating compositions may be (though not always) improved, their overall performance is not satisfactory since the gloss level of their corresponding powder coatings is not as low as desired and at the same time their mechanical properties for example the reverse impact resistance (RIR) may be compromised. Impact resistant powder coatings are of utmost importance since they enable the ease of preparation, handling and transportation as well as enhance end-user satisfaction by offering powder coated articles with robust mechanical performance e.g. no cracks, chips, delamination. Even if a 2K thermosetting powder coating composition is able to provide matt powder coatings, the low gloss consistency is insufficient; this severely limits their commercial applications in areas where matt powder coatings are required.

The WO 2016-012252 A1 (which disclosed two-component (2K) thermosetting powder coating compositions) and the WO 2017-203045 A1 are silent as to the compositions disclosed in this specification.

One-component (1K) thermosetting powder coating compositions are desirable since they require the preparation of only one thermosetting powder coating composition all the components of which are melt-mixed e.g. via extrusion, and form part of one homogeneous thermosetting powder coating composition. The 1K thermosetting powder coating compositions avoid a series of process steps when compared with the 2K counterparts since for example only one thermosetting powder coating composition needs to be prepared, and no mixing of two individually prepared thermosetting powder coating compositions is required.

However, the challenges the powder paint formulator faces when is aiming to transition from 2K thermosetting powder coating compositions to 1K thermosetting powder coating compositions is very significant since the solutions represented by the 2K thermosetting powder coating compositions are not directly applicable to 1K thermosetting powder coating compositions. For example, just to mention one of the many, the low gloss consistency of 1K thermosetting powder coating compositions is poor; the rather large variations in low gloss values renders the 1K thermosetting powder coating compositions unattractive for low gloss end-applications, limiting as a result the use of powder coating technology in general.

Therefore, the combination of good physical storage stability, low gloss (matt) (preferably without the use of matting additives/agents e.g. silicas, waxes) and good impact resistance, poses a serious challenge for a formulator of 1K thermosetting powder coating compositions. This challenge becomes significantly greater if the formulator aims to also formulate 1K thermosetting powder coating compositions which would be suitable for producing powder coatings having at least sufficient—preferably excellent—low gloss consistency, and preferably also at least sufficient (preferably excellent) batch-to-batch low gloss consistency.

Therefore, there is a desire for one-component (1K) thermosetting powder coating compositions which have at least good physical storage stability (PSS) and are in particular suitable for producing upon curing impact resistant matt powder coatings (preferably without the use of matting additives/agents e.g. silicas, waxes) which have also at least sufficient (preferably excellent) low gloss consistency, and preferably also at least sufficient (preferably excellent) batch-to-batch low gloss consistency.

It is therefore the object of the invention to provide for one-component (1K) thermosetting powder coating compositions which have at least good physical storage stability (PSS) and are in particular suitable for producing upon curing impact resistant matt powder coatings having also at least sufficient (preferably excellent) low gloss consistency, and preferably also at least sufficient (preferably excellent) batch-to-batch low gloss consistency.

This object was surprisingly achieved by the 1K thermosetting powder coating composition A (herein 'PCC A'), as described in the claims and as disclosed herein. The PCC A have at least good physical storage stability (PSS) and upon curing they provide impact resistant matt powder coatings (preferably without the use of matting additives/agents e.g. silicas, waxes) which have also at least sufficient (preferably excellent) low gloss consistency, and preferably also at least sufficient (preferably excellent) batch-to-batch low gloss consistency. In particular, the combination of impact resistant matt powder coatings (without the use of matting additives/agents e.g. silicas, waxes), and at least sufficient—preferably excellent—low gloss consistency as well as at least sufficient—preferably excellent—batch-to-batch low gloss consistency, is of extreme significance and importance for this invention, and as such it constitutes a major technological advancement for the powder coating technology.

Broadly in accordance with the invention, there is provided 1K thermosetting powder coating compositions A (herein 'PCC A') as described in the claims and as disclosed herein.

Broadly in accordance with the invention, there is provided a cured PCC A, as described in the claims and as disclosed herein.

Broadly in accordance with the invention, there is provided an article having coated thereon a PCC A, as described in the claims and as disclosed herein.

Broadly in accordance with the invention, there is provided an article having coated and cured thereon a PCC A, as described in the claims and as disclosed herein.

Broadly in accordance with the invention, there is provided a process for producing an article having coated and cured thereon a PCC A as described in the claims and as disclosed herein.

Broadly in accordance with the invention, there is provided a process for making a composition or an article, each one of them suitable for any one of the applications selected from the group consisting of powder coating applications, powder-in-mould coating applications, 3D-printing applications, automotive applications, marine applications, aerospace applications, medical applications, defense applications, sports/recreational applications, architectural applications, bottling applications, household applications, machinery applications, can applications, coil applications, energy applications, textile applications and electrical applications, wherein the process comprises the step of using (providing) a PCC A as described in the claims and as disclosed herein.

Broadly in accordance with the invention, there is provided a use of:
i) a PCC A as described in the claims and as disclosed herein; or
ii) a cured PCC A as described in the claims and as disclosed herein; or
iii) an article as described herein;
in powder coatings, powder-in-mould coatings, 3D-printing, automotive applications, marine applications, aerospace applications, medical applications, defense applications, sports/recreational applications, architectural applications, bottling applications, household applications, machinery applications, can applications, coil applications, energy applications, textile applications and electrical applications.

Broadly in accordance with the invention there is provided a use of a PCC A as described in the claims and as disclosed herein for matt powder coatings.

Broadly in accordance with the invention there is provided a use of a PCC A as described in the claims and as disclosed herein for impact resistant matt powder coatings.

Broadly in accordance with the invention there is provided a use of a PCC A as described in the claims and as disclosed herein for matt powder coatings having at least sufficient—preferably excellent—low gloss consistency.

Broadly in accordance with the invention there is provided a use of a PCC A as described in the claims and as disclosed herein for matt powder coatings having at least sufficient—preferably excellent—batch-to-batch low gloss consistency.

Broadly in accordance with the invention there is provided a use of a PCC A as described in the claims and as disclosed herein for impact resistant matt powder coatings which have also at least sufficient—preferably excellent low gloss consistency.

Broadly in accordance with the invention there is provided a use of a PCC A as described in the claims and as disclosed herein for impact resistant matt powder coatings which have also at least sufficient—preferably excellent low gloss consistency, and also at least sufficient—preferably excellent—batch-to-batch low gloss consistency.

A1 Broadly in accordance with the invention, there is provided an one-component (1K) thermosetting powder coating composition A (PCC A) comprising:
a) a binder (B) in an amount of at least 30 and at most 100, preferably at least 40 and at most 100, more preferably at least 50 and at most 100, even more preferably at least 60 and at most 100 pph PCC A, wherein the B consists of:
i) a polyester binder (PB) in an amount of at least 90.0 and at most 98.0, preferably of at least 92.0 and at most 96.0, more preferably at least 92.5 and at most 95.0 pph B, wherein the PB consists of a polyester resin A (PRA) and a polyester resin B (PRB), and wherein the weight ratio of the weight amount of PRA to the weight amount of PRB (R=weight of PRA/weight of PRB) is at least 0.50 and at most 4.00 preferably at least 0.55 and at most 3.00, more preferably at least 0.60 and at most 2.50, even more preferably at least 0.60 and at most 2.00, most preferably at least 0.60 and at most 1.50, especially at least 0.70 and at most 1.30, more especially at least 0.80 and at most 1.25, even more especially at least 0.88 and at most 1.13, most especially at least 0.91 and at most 1.10, for example is equal to 1.0, and wherein the difference between the acid value of the PRB ($AV_B$) and the acid value of the PRA ($AV_A$) (DeltaAV=$AV_B$−$AV_A$) is at least 20 and at most 59, preferably at least 30 and at most 59, more preferably at least 40 and at most 59 mg KOH/g, and
ii) a crosslinker in an amount of at least 2.0 and at most 10.0, preferably of at least 4.0 and at most 8.0, more preferably at least 5.0 and at most 7.5 pph B, wherein the crosslinker is selected from the group consisting of β-hydroxylalkyl-amides—as these are disclosed herein-, and mixtures thereof, wherein the crosslinker is able to react with the PB, and
b) a pigment in an amount of at least 0 and at most 70, preferably at least 0 and at most 60, more preferably at least 0 and at most 50, even more preferably at least 0 and at most 40 pph PCC A,
and
wherein the PRA is the polycondensation reaction product of at least:
a component A1 in an amount of at least 45.0 and at most 49.9, more preferably at least 46.0 and at most 49.9, even more preferably at least 47.0 and at most 49.9, especially at least 47.5 and at most 49.9, more especially at least 47.5 and at most 49.5, most especially at least 48 and at most 49.5 mol % based on PRA, wherein the component A1 consists of: i) 2,2-dimethylpropane-1,3-diol in an amount of at least 70 and at most 100, preferably at least 80 and at most 100, more preferably at least 90 and at most 100, even more preferably at least 95 and at most 100, most preferably at least 96 and at most 100, especially 100% of the total amount of moles making up the A1, and ii) a diol-A1 selected from the group consisting of $C_2$-$C_{18}$ preferably $C_2$-$C_{16}$ aliphatic saturated diols excluding the 2,2-dimethylpropane-1,3-diol, and mixtures thereof, in an amount of at least 0 and at most 30, preferably at least 0 and at most 20, more preferably at least 0 and at most 10, even more preferably at least 0 and at most 5, most preferably at least 0 and at most 4, especially is 0% of the total amount of moles making up the A1,
and
a component A2 in an amount of at least 48.0 and at most 55.0, preferably at least 49.0 and at most 54.0, more preferably at least 49.5 and at most 53.0, even more preferably at least 49.8 and at most 52.5, most preferably at least 49.9 and at most 52.0, especially at least 50.1 and at most 52.0 mol % based on PRA, selected from the group consisting of terephthalic acid, esters of terephthalic acid (e.g. diesters of terephthalic acid such as dimethyl terephthalate, diethyl terephthalate, dioctyl terephthalate), isophthalic acid, esters of isophthalic acid (e.g. diesters of isophthalic acid such as dimethyl isophthalate, diethyl isophthalate, dioctyl isophthalate), and mixtures thereof, in an amount of at least 90 and at most 100% of the total amount of moles making up the A2, and ii) a dicarboxylic-acid-A2b selected from the group consisting of 06-18 aliphatic saturated dicarboxylic acids (preferably 06-12 aliphatic saturated dicarboxylic acids, more preferably $C_{6-10}$ aliphatic saturated dicarboxylic acids), esters of 06-18 aliphatic saturated dicarboxylic acids (preferably esters of 06-12 aliphatic saturated dicarboxylic acids, more preferably esters of $C_{6-10}$ aliphatic saturated dicarboxylic acids, most preferably diesters of 06-18 aliphatic saturated dicarboxylic acids, especially diesters of 06-12 aliphatic saturated dicarboxylic acids, more especially diesters of $C_{6-10}$ aliphatic saturated dicarboxylic acids), hexahydrophthalic anhydride, and mixtures thereof, in an amount of at least 0 and at most 10% of the total amount of moles making up the A2, and a component A3 in an amount of at least 0 and at most 2.7, preferably at least 0 and at most 2.1, more preferably at least 0 and at most 1.5, even more preferably at least 0 and at most 1, most preferably at least 0 and at most 0.5 mol % based on PRA, wherein the component A3 is selected from the group consisting of: i) an alcohol-A3 selected from the group consisting of $C_{3-10}$ aliphatic saturated alcohols having at least 3 and at most 6 hydroxyl groups, and mixtures thereof, and ii) a carboxylic-acid-anhydride-A3 selected from the group consisting of trimellitic acid anhydride, pyromellitic acid anhydride, and mixtures thereof, wherein the total amount of monomers reacted to produce the PRA is 100 mol %, and wherein the PRA is carboxylic acid functional having an acid value ($AV_A$) as measured titrimetrically by ISO 2114-2000, of at least 15 and at most 35, preferably at least 15 and at most 33, more preferably at least 15 and at most 30, even more preferably at least 15 to 28, most preferably at least 15 to 26, for example at least 17 and at most 35, example at least 17 and at most 33, example at least 17 and at most 30, example at least 17 and at most 28, example at least 17 and at most 26, for example at least 20 and at most 35, example at least 20 and at most 33, example at least 20 and at most 30, example at least 20 and at most 28, example at least 20 and at most 26, for example at least 22 and at most 35, example at least 22 and at most 33, example at least 22 and at most 30, example at least 22 and at most 28, example at least 22 and at most 26, for example at least 23 and at most 35, example at least 23 and at most 33, example at least 23 and at most 30, example at least 23 and at most 28, example at least 23 and at most 26 mg KOH/g, and a hydroxyl value ($OHV_A$) as measured titrimetrically by ISO 4629-2-2016, of at most 10, preferably at most 5 mg KOH/g, has a glass transition temperature ($T_{gA}$) as determined by Differential Scanning calorimetry (DSC) according to the description, of at least 40 and at most 75° C., and has a functionality ($f_A$) of at least 2.0 and at most 3.5, preferably at least 2.0 and at most 2.5, and has a number average molecular weight ($M_{nA}$) as determined by Size Exclusion Chromatography (SEC) according to the description, of at least 1100 and at most 10000 Da, preferably at least 2000 and at most 9000 Da, more preferably at least 2500 and at most 8000 Da, even more preferably at least 3000 and at most 7000 Da, has a weight average molecular weight ($M_{wA}$) as determined by SEC according to the description, of at least 2200 and at most 20000 Da, preferably at least 4000 and at most 18000 Da, more preferably at least 5000 and at most 18000 Da, even more preferably at least 6000 and at most 18000 Da, has a polydispersity DA ($=M_{wA}/M_{nA}$) of at least 2.0 and at most 4.0, preferably at least 2.0 and at most 3.5, more preferably at least 2.0 and at most 3.0, and has a melt viscosity ($N_A$) as measured via rheometry according to the description, of at least 15 and at most 150, preferably at least 20 and at most 130, more preferably at least 25 and at most 120 Pa·s, and wherein the PRB is the polycondensation reaction product of at least:

a component B1 in an amount of at least 42 and at most 49.9, preferably at least 45.0 and at most 49.5, more preferably at least 47.0 and at most 49.0 mol % based on PRB, wherein the component B1 consists of: i) a diol-B1a selected from the group consisting of ethylene glycol, 1,2-propane diol, 1,3-propane diol, and mixtures thereof, in an amount of at least 50 and at most 90, preferably at least 57 and at most 88, more preferably at least 64 and at most 83% of the total amount of moles making up the B1, and ii) a diol-B1b selected from the group consisting of $C_{4-18}$ preferably $C_{4-16}$ aliphatic saturated diols and mixtures thereof, in an amount of at least 10 and at most 50, preferably at least 12 and at most 43, more preferably at least 17 and at most 36% of the total amount of moles making up the B1, and a component B2, in an amount of at least 42 and at most 55, preferably at least 43 and at most 52, more preferably at least 44 and at most 48 mol % on PRB, wherein the component B2 consists of: i) a dicarboxylic-acid-B2a selected from the group consisting of terephthalic acid, esters of terephthalic acid (e.g. diesters of terephthalic acid such as dimethyl terephthalate, diethyl terephthalate, dioctyl terephthalate), isophthalic acid, esters of isophthalic acid (e.g. diesters of isophthalic acid such as dimethyl isophthalate, diethyl isophthalate, dioctyl isophthalate), and mixtures thereof, in an amount of at least 80 and at most 100, more preferably at least 90 and at most 100% of the total amount of moles making up the B2, and ii) a dicarboxylic-acid-B2b selected from the group consisting of $C_{6-18}$ aliphatic saturated dicarboxylic acids (preferably $C_{6-12}$ aliphatic saturated dicarboxylic acids, more preferably $C_{6-10}$ aliphatic saturated dicarboxylic acids), esters of $C_{6-18}$ aliphatic saturated dicarboxylic acids (preferably esters of $C_{6-12}$ aliphatic saturated dicarboxylic acids, more preferably esters of $C_{6-10}$ aliphatic saturated dicarboxylic acids, most preferably diesters of $C_{6-13}$ aliphatic saturated dicarboxylic acids, especially diesters of $C_{6-12}$ aliphatic saturated dicarboxylic acids, more especially diesters of $C_{6-10}$ aliphatic saturated dicarboxylic acids), hexahydrophthalic anhydride, and mixtures thereof, in an amount of at least 0 and at most 20, more preferably at least 0 and at most 10% of the total amount of moles making up the B2, and a component B3 in an amount of at least 0.5 and at most 8.5, preferably at least 0.7 and at most 8.0, more preferably at least 1.0 and at most 8.0, even more preferably at least 2.0 and at most 8.0, most preferably at least 3.0 and at most 8.0, especially at least 4.0 and at most 8.0, more especially at least 5.0 and at most 8.0, even more especially at least 5.5 and at most 7.0, most especially at least 3.0 and at most 7.0 mol % on PRB, wherein the component B3 is selected from the group consisting of: i) an alcohol-B3 selected from the group consisting of $C_{3-10}$ aliphatic saturated alcohols having at least 3 and at most 6 hydroxyl groups, and mixtures thereof, and ii)

a carboxylic-acid-anhydride-B3 selected from the group consisting of trimellitic acid anhydride, pyromellitic acid anhydride, and mixtures thereof, and wherein the total amount of monomers reacted to produce the PRB is 100 mol %, and wherein the PRB is a branched carboxylic acid functional having an acid value ($AV_B$) as measured titrimetrically by ISO 2114-2000, of at least 40 and at most 74, preferably at least 45 and at most 74, more preferably at least 50 and at most 74, even more preferably at least 54 and at most 74, most preferably at least 60 and at most 74, especially at least 40 and at most 73, more especially at least 45 and at most 73, even more especially at least 50 and at most 73, most especially at least 54 and at most 73, for example at least 60 and at most 73, for example at least 60 and at most 73, for example at least 40 and at most 72, for example at least 45 and at most 72, for example at least 50 and at most 72, for example at least 54 and at most 72, for example at least 60 and at most 72, for example at least 40 and at most 70, for example at least 45 and at most 70, for example at least 50 and at most 70, for example at least 54 and at most 70, for example at least 60 and at most 70, for example at least 62 and at most 74, for example at least 62 and at most 73, for example at least 62 and at most 72, for example at least 62 and at most 70, for example at least 64 and at most 74, for example at least 64 and at most 73, for example at least 64 and at most 72, for example at least 64 and at most 70, for example at least 68 and at most 74, for example at least 68 and at most 73, for example at least 68 and at most 72, for example at least 68 and at most 70, and a hydroxyl value ($OHV_A$) as measured titrimetrically by ISO 4629-2-2016, of at most 10, preferably at most 5 mg KOH/g, has a glass transition temperature ($T_{gB}$) as determined by DSC according to the description, of at least 40 and at most 80° C., preferably at least 50 and at most 70° C., more preferably at least 55 and at most 65° C., and has a functionality ($f_B$) of at least 2.7 and at most 6.0, preferably at least 3.5 and at most 5.0, and has a number average molecular weight ($M_{nB}$) as determined by SEC according to the description, of at least 1100 and at most 10000 Da, preferably at least 1500 and at most 8000 Da, more preferably at least 1600 and at most 7000 Da, even more preferably at least 1700 and at most 6000 Da, most preferably at least 1800 and at most 5500 Da, has a weight average molecular weight ($M_B$) as determined by SEC according to the description, of at least 3000 and at most 25000 Da, preferably at least 4000 and at most 24000 Da, more preferably at least 5000 and at most 23000 Da, even more preferably at least 6000 and at most 22000 Da, especially at least 6500 and at most 21000 Da, has a polydispersity DB ($=M_{wB}/M_{nB}$) of at least 2.5 and at most 4.0, preferably at least 2.5 and at most 3.5, and has a melt viscosity ($N_B$) as determined via rheometry according to the description, of at least 8 and at most 120, more preferably at least 10 and at most 100, even more preferably at least 12 and at most 90 Pa·s.

A1a Broadly in accordance with the invention there is provided an one-component (1K) thermosetting powder coating composition A (PCC A) comprising:

a) a binder (B) in an amount of at least 30 and at most 100, preferably at least 40 and at most 100, more preferably at least 50 and at most 100, even more preferably at least 60 and at most 100 pph PCC A, wherein the B consists of:

i) a polyester binder (PB) in an amount of at least 90.0 and at most 98.0, preferably of at least 92.0 and at most 96.0, more preferably at least 92.5 and at most 95.0 pph B, wherein the PB consists of a polyester resin A (PRA) and a polyester resin B (PRB), and wherein the weight ratio of the weight amount of PRA to the weight amount of PRB (R=weight of PRA/weight of PRB) is at least 0.50 and at most 4.00 preferably at least 0.55 and at most 3.00, more preferably at least 0.60 and at most 2.50, even more preferably at least 0.60 and at most 2.00, most preferably at least 0.60 and at most 1.50, especially at least 0.70 and at most 1.30, more especially at least 0.80 and at most 1.25, even more especially at least 0.88 and at most 1.13, most especially at least 0.91 and at most 1.10, for example is equal to 1.0, and wherein the difference between the acid value of the PRB ($AV_B$) and the acid value of the PRA ($AV_A$) (DeltaAV=$AV_B-AV_A$) is at least 20 and at most 59, preferably at least 30 and at most 59, more preferably at least 40 and at most 59 mg KOH/g, and ii) a crosslinker in an amount of at least 2.0 and at most 10.0, preferably of at least 4.0 and at most 8.0, more preferably at least 5.0 and at most 7.5 pph B, wherein the crosslinker is selected from the group consisting of β-hydroxylalkyl-amides, and mixtures thereof, wherein the crosslinker is able to react with the PB, and wherein the β-hydroxylalkyl-amides are chemical compounds having the average chemical structure represented by the following Formulae 1 or 2:

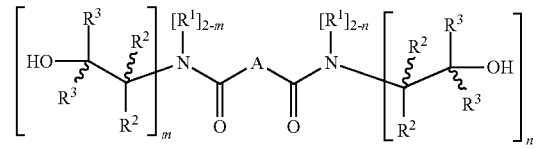

Formula 1 wherein:

n ranges from and including 1 up to and including 2, preferably equal or greater than 1.6 and lower than 2;

m ranges from and including 1 up to and including 2, preferably equal or greater than 1.6 and lower than 2;

A is a $C_{1-60}$ optionally-substituted-hydrocarbylene (preferably a $C_{1-60}$ saturated-hydrocarbylene, more preferably a $C_{1-20}$ optionally-substituted-hydrocarbylene, even more preferably a $C_{1-20}$ saturated-hydrocarbylene) linking group;

$R^1$ is hydrogen, or a $C_{1-5}$ alkyl group optionally substituted with one or more hydroxyl groups;

$R^2$ is hydrogen, or a $C_{1-5}$ alkyl group;

$R^3$ is hydrogen, or a $C_{1-5}$ alkyl group;

while one of the groups $R^2$ and one of the groups $R^3$ of the unit m, may also form—together with the adjacent carbon atoms-, a cycloalkyl group; and/or while one of the groups $R^2$ and one of the groups $R^3$ of the unit n, may also form—together with the adjacent carbon atoms-, a cycloalkyl group,

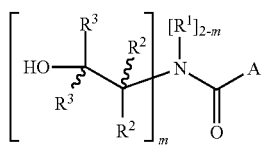

Formula 2 wherein:
m ranges from and including 1 up to and including 2, preferably equal or greater than 1.6 and lower than 2;
A is a $C_{1-60}$ optionally-substituted-hydrocarbyl (preferably a $C_{1-60}$ saturated-hydrocarbyl, more preferably a $C_{1-20}$ optionally-substituted-hydrocarbyl, even more preferably a $C_{1-20}$ saturated-hydrocarbyl);
$R^1$ is hydrogen, or a $C_{1-5}$ alkyl group optionally substituted with one or more hydroxyl groups;
$R^2$ is hydrogen, or a $C_{1-5}$ alkyl group;
$R^3$ is hydrogen, or a $C_{1-5}$ alkyl group;
while one of the groups $R^2$ and one of the groups $R^3$, may also form—together with the adjacent carbon atoms-, a cycloalkyl group,
and
b) a pigment in an amount of at least 0 and at most 70, preferably at least 0 and at most 60, more preferably at least 0 and at most 50, even more preferably at least 0 and at most 40 pph PCC A,
and
wherein the PRA is the polycondensation reaction product of at least:
a component A1 in an amount of at least 45.0 and at most 49.9, more preferably at least 46.0 and at most 49.9, even more preferably at least 47.0 and at most 49.9, especially at least 47.5 and at most 49.9, more especially at least 47.5 and at most 49.5, most especially at least 48 and at most 49.5 mol % based on PRA, wherein the component A1 consists of: i) 2,2-dimethylpropane-1,3-diol in an amount of at least 70 and at most 100, preferably at least 80 and at most 100, more preferably at least 90 and at most 100, even more preferably at least 95 and at most 100, most preferably at least 96 and at most 100, especially 100% of the total amount of moles making up the A1, and ii) a diol-A1 selected from the group consisting of $C_{2-18}$ preferably $C_{2-16}$ aliphatic saturated diols excluding the 2,2-dimethylpropane-1,3-diol, and mixtures thereof, in an amount of at least 0 and at most 30, preferably at least 0 and at most 20, more preferably at least 0 and at most 10, even more preferably at least 0 and at most 5, most preferably at least 0 and at most 4, especially is 0% of the total amount of moles making up the A1,
and
a component A2 in an amount of at least 48.0 and at most 55.0, preferably at least 49.0 and at most 54.0, more preferably at least 49.5 and at most 53.0, even more preferably at least 49.8 and at most 52.5, most preferably at least 49.9 and at most 52.0, especially at least 50.1 and at most 52.0 mol % based on PRA, wherein the component A2 consists of: i) a dicarboxylic-acid-A2a selected from the group consisting of terephthalic acid, esters of terephthalic acid (e.g. diesters of terephthalic acid such as dimethyl terephthalate, diethyl terephthalate, dioctyl terephthalate), isophthalic acid, esters of isophthalic acid (e.g. diesters of isophthalic acid such as dimethyl isophthalate, diethyl isophthalate, dioctyl isophthalate), and mixtures thereof, in an amount of at least 90 and at most 100% of the total amount of moles making up the A2, and ii) a dicarboxylic-acid-A2b selected from the group consisting of $C_{6-18}$ aliphatic saturated dicarboxylic acids (preferably $C_{6-12}$ aliphatic saturated dicarboxylic acids, more preferably $C_{6-10}$ aliphatic saturated dicarboxylic acids), esters of $C_{6-18}$ aliphatic saturated dicarboxylic acids (preferably esters of $C_{6-12}$ aliphatic saturated dicarboxylic acids, more preferably esters of $C_{6-10}$ aliphatic saturated dicarboxylic acids, most preferably diesters of $C_{6-18}$ aliphatic saturated dicarboxylic acids, especially diesters of $C_{6-12}$ aliphatic saturated dicarboxylic acids, more especially diesters of $C_{6-10}$ aliphatic saturated dicarboxylic acids), hexahydrophthalic anhydride, and mixtures thereof, in an amount of at least 0 and at most 10% of the total amount of moles making up the A2,
and
a component A3 in an amount of at least 0 and at most 2.7, preferably at least 0 and at most 2.1, more preferably at least 0 and at most 1.5, even more preferably at least 0 and at most 1, most preferably at least 0 and at most 0.5 mol % based on PRA, wherein the component A3 is selected from the group consisting of: i) an alcohol-A3 selected from the group consisting of $C_{3-10}$ aliphatic saturated alcohols having at least 3 and at most 6 hydroxyl groups, and mixtures thereof, and ii) a carboxylic-acid-anhydride-A3 selected from the group consisting of trimellitic acid anhydride, pyromellitic acid anhydride, and mixtures thereof,
wherein the total amount of monomers reacted to produce the PRA is 100 mol %, and wherein the PRA
is carboxylic acid functional having an acid value ($AV_A$) as measured titrimetrically by ISO 2114-2000, of at least 15 and at most 35, preferably at least 15 and at most 33, more preferably at least 15 and at most 30, even more preferably at least 15 to 28, most preferably at least 15 to 26, for example at least 17 and at most 35, example at least 17 and at most 33, example at least 17 and at most 30, example at least 17 and at most 28, example at least 17 and at most 26, for example at least 20 and at most 35, example at least 20 and at most 33, example at least 20 and at most 30, example at least 20 and at most 28, example at least 20 and at most 26, for example at least 22 and at most 35, example at least 22 and at most 33, example at least 22 and at most 30, example at least 22 and at most 28, example at least 22 and at most 26, for example at least 23 and at most 35, example at least 23 and at most 33, example at least 23 and at most 30, example at least 23 and at most 28, example at least 23 and at most 26 mg KOH/g, and a hydroxyl value ($OHV_A$) as measured titrimetrically by ISO 4629-2-2016, of at most 10, preferably at most 5 mg KOH/g,
has a glass transition temperature ($T_{gA}$) as determined by Differential Scanning Calorimetry (DSC) according to the description, of at least 40 and at most 75° C., and
has a functionality ($f_A$) of at least 2.0 and at most 3.5, preferably at least 2.0 and at most 2.5, and has a number average molecular weight ($M_{nA}$) as determined by Size Exclusion Chromatography (SEC) according to the description, of at least 1100 and at most 10000 Da, preferably at least 2000 and at most 9000 Da, more preferably at least 2500 and at most 8000 Da, even more preferably at least 3000 and at most 7000 Da, has a weight average molecular weight ($M_A$) as determined by SEC according to the description, of at least 2200 and at most 20000 Da, preferably at least 4000 and at most 18000 Da, more preferably at least 5000 and at most 18000 Da, even more preferably at least 6000 and at most 18000 Da, has a polydispersity $D_A$ ($=M_{wA}/M_{nA}$) of at least 2.0 and at most 4.0, preferably at least 2.0 and at most 3.5, more preferably at least 2.0 and at most 3.0, and has a melt viscosity ($N_A$) as determined via rheometry according to the description, of at least 15 and at most 150, preferably at least 20 and at most 130, more preferably at least 25 and at most 120 Pa·s, and
wherein the PRB is the polycondensation reaction product of at least:

a component B1 in an amount of at least 42 and at most 49.9, preferably at least 45.0 and at most 49.5, more preferably at least 47.0 and at most 49.0 mol % based on PRB, wherein the component B1 consists of: i) a diol-B1a selected from the group consisting of ethylene glycol, 1,2-propane diol, 1,3-propane diol, and mixtures thereof, in an amount of at least 50 and at most 90, preferably at least 57 and at most 88, more preferably at least 64 and at most 83% of the total amount of moles making up the B1, and ii) a diol-B1b selected from the group consisting of $C_{4-18}$ preferably $C_{4-16}$ aliphatic saturated diols and mixtures thereof, in an amount of at least 10 and at most 50, preferably at least 12 and at most 43, more preferably at least 17 and at most 36% of the total amount of moles making up the B1, and a component B2, in an amount of at least 42 and at most 55, preferably at least 43 and at most 52, more preferably at least 44 and at most 48 mol % on PRB, wherein the component B2 consists of: i) a dicarboxylic-acid-B2a selected from the group consisting of terephthalic acid, esters of terephthalic acid (e.g. diesters of terephthalic acid such as dimethyl terephthalate, diethyl terephthalate, dioctyl terephthalate), isophthalic acid, esters of isophthalic acid (e.g. diesters of isophthalic acid such as dimethyl isophthalate, diethyl isophthalate, dioctyl isophthalate), and mixtures thereof, in an amount of at least 80 and at most 100, more preferably at least 90 and at most 100% of the total amount of moles making up the B2, and ii) a dicarboxylic-acid-B2b selected from the group consisting of $C_{6-13}$ aliphatic saturated dicarboxylic acids (preferably $C_{6-12}$ aliphatic saturated dicarboxylic acids, more preferably $C_{6-10}$ aliphatic saturated dicarboxylic acids), esters of $C_{6-13}$ aliphatic saturated dicarboxylic acids (preferably esters of $C_{6-12}$ aliphatic saturated dicarboxylic acids, more preferably esters of $C_{6-10}$ aliphatic saturated dicarboxylic acids, most preferably diesters of $C_{6-13}$ aliphatic saturated dicarboxylic acids, especially diesters of $C_{6-12}$ aliphatic saturated dicarboxylic acids, more especially diesters of $C_{6-10}$ aliphatic saturated dicarboxylic acids), hexahydrophthalic anhydride, and mixtures thereof, in an amount of at least 0 and at most 20, more preferably at least 0 and at most 10% of the total amount of moles making up the B2, and a component B3 in an amount of at least 0.5 and at most 8.5, preferably at least 0.7 and at most 8.0, more preferably at least 1.0 and at most 8.0, even more preferably at least 2.0 and at most 8.0, most preferably at least 3.0 and at most 8.0, especially at least 4.0 and at most 8.0, more especially at least 5.0 and at most 8.0, even more especially at least 5.5 and at most 7.0, most especially at least 3.0 and at most 7.0 mol % on PRB, wherein the component B3 is selected from the group consisting of: i) an alcohol-B3 selected from the group consisting of $C_{3-10}$ aliphatic saturated alcohols having at least 3 and at most 6 hydroxyl groups, and mixtures thereof, and ii) a carboxylic-acid-anhydride-B3 selected from the group consisting of trimellitic acid anhydride, pyromellitic acid anhydride, and mixtures thereof, and wherein the total amount of monomers reacted to produce the PRB is 100 mol %, and wherein the PRB is a branched carboxylic acid functional having an acid value ($AV_B$) as measured titrimetrically by ISO 2114-2000, of at least 40 and at most 74, preferably at least 45 and at most 74, more preferably at least 50 and at most 74, even more preferably at least 54 and at most 74, most preferably at least 60 and at most 74, especially at least 40 and at most 73, more especially at least 45 and at most 73, even more especially at least 50 and at most 73, most especially at least 54 and at most 73, for example at least 60 and at most 73, for example at least 60 and at most 73, for example at least 40 and at most 72, for example at least 45 and at most 72, for example at least 50 and at most 72, for example at least 54 and at most 72, for example at least 60 and at most 72, for example at least 40 and at most 70, for example at least 45 and at most 70, for example at least 50 and at most 70, for example at least 54 and at most 70, for example at least 60 and at most 70, for example at least 62 and at most 74, for example at least 62 and at most 73, for example at least 62 and at most 72, for example at least 62 and at most 70, for example at least 64 and at most 74, for example at least 64 and at most 73, for example at least 64 and at most 72, for example at least 64 and at most 70, for example at least 68 and at most 74, for example at least 68 and at most 73, for example at least 68 and at most 72, for example at least 68 and at most 70, and a hydroxyl value ($OHV_A$) as measured titrimetrically by ISO 4629-2-2016, of at most 10, preferably at most 5 mg KOH/g, has a glass transition temperature ($T_{gB}$) as determined by DSC according to the description, of at least 40 and at most 80° C., preferably at least 50 and at most 70° C., more preferably at least 55 and at most 65° C., and has a functionality ($f_B$) of at least 2.7 and at most 6.0, preferably at least 3.5 and at most 5.0, and has a number average molecular weight ($M_{nB}$) as determined by SEC according to the description, of at least 1100 and at most 10000 Da, preferably at least 1500 and at most 8000 Da, more preferably at least 1600 and at most 7000 Da, even more preferably at least 1700 and at most 6000 Da, most preferably at least 1800 and at most 5500 Da, has a weight average molecular weight ($M_B$) as determined by SEC according to the description, of at least 3000 and at most 25000 Da, preferably at least 4000 and at most 24000 Da, more preferably at least 5000 and at most 23000 Da, even more preferably at least 6000 and at most 22000 Da, especially at least 6500 and at most 21000 Da, has a polydispersity $D_B$ ($=M_{wB}/M_{nB}$) of at least 2.5 and at most 4.0, preferably at least 2.5 and at most 3.5, and has a melt viscosity ($N_B$) as determined via rheometry according to the description, of at least 8 and at most 120, more preferably at least 10 and at most 100, even more preferably at least 12 and at most 90 Pa·s.

A2 Preferably, the PCC A is as disclosed in any one of paragraphs A1, A1a, or in section 1 (including its subsections), wherein the diol-B1a is ethylene glycol.

A3 Preferably, the PCC A is as disclosed in any one of paragraphs A1, A1a, A2 or in section 1 (including its subsections), wherein the diol-B1b is 2,2-dimethylpropane-1,3-diol.

A4 Preferably, the PCC A is as disclosed in any one of paragraphs A1, A1a, A2 to A3, or in section 1 (including its subsections), wherein the component B3 is trimellitic acid anhydride in an amount of at least 3 and at most 7 mol % on PRB.

A5 Preferably, the PCC A is as disclosed in any one of paragraphs A1, A1a, A2 to A4, or in section 1 (including its subsections), wherein the dicarboxylic-acid-B2a is selected from the group consisting of isophthalic acid, terephthalic acid, and mixtures thereof, in an amount of at least 95 and at most 100% of the total amount of moles making up the B2, and the dicarboxylic-acid-B2b is adipic acid in an amount of at least 0 and at most 5% of the total amount of moles making up the B2.

A6 Preferably, the PCC A is as disclosed in any one of paragraphs A1, A1a, A2 to A5, or in section 1 (including its subsections), wherein the component A1 is 2,2-dimethylpropane-1,3-diol.

A7 Preferably, the PCC A is as disclosed in any one of paragraphs A1, A1a, A2 to A6 or in section 1 (including its subsections), wherein the dicarboxylic-acid-A2a is a mixture of terephthalic acid and isophthalic acid, in an amount of at least 90 and at most 100% of the total amount of moles making up the A2, and the dicarboxylic-acid-A2b is adipic acid in an amount of at least 0 and at most 10% of the total amount of moles making up the A2.

A8 Preferably, the PCC A is as disclosed in any one of paragraphs A1, A1a, A2 to A7 or in section 1 (including its subsections), wherein the R is at least 0.55 and at most 3.00, more preferably at least 0.60 and at most 2.50, even more preferably at least 0.60 and at most 2.00, most preferably at least 0.60 and at most 1.50, especially at least 0.70 and at most 1.30, more especially at least 0.80 and at most 1.25, even more especially at least 0.88 and at most 1.13, most especially at least 0.91 and at most 1.10, for example is equal to 1.0.

A9 Preferably, the PCC A is as disclosed in any one of paragraphs A1, A1a, A2 to A8 or in section 1 (including its subsections), wherein the the crosslinker is selected from the group consisting of β-hydroxylalkyl-amides having the average structure represented by the following Formula 3, and mixtures thereof,

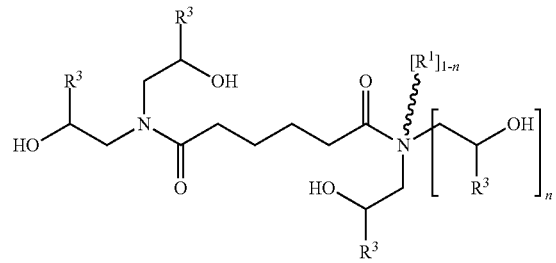

Formula 3 wherein n ranges from and including 0.2 up to and including 1

$R^1$ is hydrogen, or a $C_{1-5}$ alkyl group;

$R^3$ is hydrogen, or a $C_{1-5}$alkyl group (preferably $R^3$ is hydrogen or a methyl group).

A10 Preferably, the PCC A is as disclosed in any one of paragraphs A1, A1a, A2 to A9 or in section 1 (including its subsections), wherein the PCC A, comprises:

a) a binder (B) in an amount of at least 30 and at most 100, preferably at least 40 and at most 100, more preferably at least 50 and at most 100, even more preferably at least 60 and at most 100 pph PCC A, wherein the B consists of:

i) a polyester binder (PB) in an amount of at least 90.0 and at most 98.0, preferably of at least 92.0 and at most 96.0, more preferably at least 92.5 and at most 95.0 pph B, wherein the PB consists of a polyester resin A (PRA) and a polyester resin B (PRB), and wherein the weight ratio of the weight amount of PRA to the weight amount of PRB (R=weight of PRA/weight of PRB) is at least 0.50 and at most 4.00, and wherein the difference between the acid value of the PRB ($AV_B$) and the acid value of the PRA ($AV_A$) (DeltaAV=$AV_B-AV_A$) is at least 20 and at most 59, preferably at least 30 and at most 59, more preferably at least 40 and at most 59 mg KOH/g, and ii) a crosslinker in an amount of at least 2.0 and at most 10.0, preferably of at least 4.0 and at most 8.0, more preferably at least 5.0 and at most 7.5 pph B, wherein the crosslinker is selected from the group consisting of β-hydroxylalkyl-amides—as these are described in the description-, and mixtures thereof, b) a pigment in an amount of at least 0 and at most 70, preferably at least 0 and at most 60, more preferably at least 0 and at most 50, even more preferably at least 0 and at most 40 pph PCC A, and wherein the PRA is the polycondensation reaction product of at least:

a component A1 in an amount of at least 47.5 and at most 49.9, especially at least 48 and at most 49.5 mol % based on PRA, wherein the component A1 consists of: i) 2,2-dimethylpropane-1,3-diol in an amount of at least 90 and at most 100, even more preferably at least 95 and at most 100, most preferably at least 96 and at most 100, especially 100% of the total amount of moles making up the A1, and ii) a diol-A1 selected from the group consisting of $C_{2-18}$ preferably $C_{2-16}$ aliphatic saturated diols excluding the 2,2-dimethylpropane-1,3-diol, and mixtures thereof, in an amount of at least 0 and at most 10, preferably at least 0 and at most 5, most preferably at least 0 and at most 4, especially is 0% of the total amount of moles making up the A1, and a component A2 in an amount of at least 49.5 and at most 53.0, most preferably at least 49.8 and at most 52.5, especially at least 50.1 and at most 52.0 mol % based on PRA, wherein the component A2 consists of: i) a dicarboxylic-acid-A2a selected from the group consisting of terephthalic acid, esters of terephthalic acid (e.g. diesters of terephthalic acid such as dimethyl terephthalate, diethyl terephthalate, dioctyl terephthalate), isophthalic acid, esters of isophthalic acid (e.g. diesters of isophthalic acid such as dimethyl isophthalate, diethyl isophthalate, dioctyl isophthalate), and mixtures thereof, in an amount of at least 90 and at most 100% of the total amount of moles making up the A2, and ii) a dicarboxylic-acid-A2b selected from the group consisting of $C_{6-13}$ aliphatic saturated dicarboxylic acids (preferably $C_{6-12}$ aliphatic saturated dicarboxylic acids, more preferably $C_{6-10}$ aliphatic saturated dicarboxylic acids), esters of $C_{6-13}$ aliphatic saturated dicarboxylic acids (preferably esters of $C_{6-12}$ aliphatic saturated dicarboxylic acids, more preferably esters of $C_{6-10}$ aliphatic saturated dicarboxylic acids, most preferably diesters of $C_{6-13}$ aliphatic saturated dicarboxylic acids, especially diesters of $C_{6-12}$ aliphatic saturated dicarboxylic acids, more especially diesters of $C_{6-10}$ aliphatic saturated dicarboxylic acids), hexahydrophthalic anhydride, and mixtures thereof, in an amount of at least 0 and at most 10% of the total amount of moles making up the A2, and a component A3 in an amount of at least 0 and at most 1, most preferably at least 0 and at most 0.5 mol % based on PRA, wherein the component A3 is selected from the group consisting of: i) an alcohol-A3 selected from the group consisting of $C_{3-10}$ aliphatic saturated alcohols having at least 3 and at most 6 hydroxyl groups, and mixtures thereof, and ii) a carboxylic-acid-anhydride-A3 selected from the group consisting of trimellitic acid anhydride, pyromellitic acid anhydride, and mixtures thereof, and wherein the total amount of monomers reacted to produce the PRA is 100 mol %, and wherein the PRA is carboxylic acid functional having an acid value ($AV_A$) as measured titrimetrically by ISO 2114-2000, of at least 22 and at most 35, preferably of at least 22 and at most 33, more preferably of at least 22 and at most 30, even more preferably of at least 22 and at most 28, most preferably of at least 22 and at most 26, for example at least 23 and at most 35, example at least 23 and at most 33, example at least 23 and at most 30, example at least 23 and at most 28, example at least 23 and at most 26 mg KOH/g, and a hydroxyl value ($OHV_A$) as measured titrimetrically by ISO 4629-2-2016, of at most 10, preferably at most 5 mg KOH/g, and has a glass transition temperature ($T_{gA}$) as determined by Differential Scanning Calorimetry (DSC) according to the description, of at least 50 and at most 65, preferably at least 55 and at most 65° C., and has a functionality ($f_A$) of at least 2.0 and at most 2.5, and has a number average molecular weight ($M_{nA}$) as determined by Size Exclusion Chromatography (SEC) according to the description, of at least 3000 and at most 6000 Da, preferably at least 3500 and at most 5000 Da, has a weight average molecular weight ($M_A$) as determined by SEC according to the description, of at least 7000 and at most 16000 Da, preferably at least 8000 and at most 15000 Da, and has a polydispersity $D_A$ ($=M_{wA}/M_{nA}$) of at least 2.0 and at most 3.5, preferably at least 2.0 and at most 3.0, and has a melt viscosity ($N_A$) as determined via rheometry according to the description, of at least 15 and at most 150, preferably at least 20 and at most 130, more preferably at least 25 and at most 60 Pa·s, and wherein the PRB is the polycondensation reaction product of at least:

a component B1 in an amount of at least 47.0 and at most 49.0, preferably at least 47.5 and at most 48.5, mol % based on PRB, wherein the component B1 consists of: i) a diol-B1a selected from the group consisting of ethylene glycol, 1,2-propane diol, 1,3-propane diol, and mixtures thereof, in an amount of at least 60 and at most 75, more preferably at least 64 and at most 70% of the total amount of moles making up the B1, and ii) a diol-B1b selected from the group consisting of $C_{4-18}$ preferably $C_{4-16}$ aliphatic saturated diols and mixtures thereof, in an amount of at least 25 and at most 40, preferably at least 30 and at most 36% of the total amount of moles making up the B1, and a component B2, in an amount of at least 44.0 and at most 48.0, preferably at least 44.5 and at most 47.0 mol % on PRB, wherein the component B2 consists of: i) a dicarboxylic-acid-B2a selected from the group consisting of terephthalic acid, esters of terephthalic acid (e.g. diesters of terephthalic acid such as dimethyl terephthalate, diethyl terephthalate, dioctyl terephthalate), isophthalic acid, esters of isophthalic acid (e.g. diesters of isophthalic acid such as dimethyl isophthalate, diethyl isophthalate, dioctyl isophthalate), and mixtures thereof, in an amount of at least 80 and at most 100, more preferably at least 90 and at most 100% of the total amount of moles making up the B2, and ii) a dicarboxylic-acid-B2b selected from the group consisting of $C_{6-13}$ aliphatic saturated dicarboxylic acids (preferably $C_{6-12}$ aliphatic saturated dicarboxylic acids, more preferably $C_{6-10}$ aliphatic saturated dicarboxylic acids), esters of $C_{6-13}$ aliphatic saturated dicarboxylic acids (preferably esters of $C_{0-12}$ aliphatic saturated dicarboxylic acids, more preferably esters of $C_{6-10}$ aliphatic saturated dicarboxylic acids, most preferably diesters of $C_{6-13}$ aliphatic saturated dicarboxylic acids, especially diesters of $C_{6-12}$ aliphatic saturated dicarboxylic acids, more especially diesters of $C_{6-10}$ aliphatic saturated dicarboxylic acids), hexahydrophthalic anhydride, and mixtures thereof, in an amount of at least 0 and at most 20, more preferably at least 0 and at most 10% of the total amount of moles making up the B2, and a component B3 in an amount of at least 5.0 and at most 8.0, preferably at least 5.5 and at most 7.0, most preferably at least 3.0 and at most 7.0 mol % on PRB, wherein the component B3 is selected from the group consisting of: i) an alcohol-B3 selected from the group consisting of $C_{3-10}$ aliphatic saturated alcohols having at least 3 and at most 6 hydroxyl groups, and mixtures thereof, and ii) a carboxylic-acid-anhydride-B3 selected from the group consisting of trimellitic acid anhydride, pyromellitic acid anhydride, and mixtures thereof, and wherein the total amount of monomers reacted to produce the PRB is 100 mol %, and wherein the PRB is a branched carboxylic acid functional having an acid value ($AV_B$) as measured titrimetrically by ISO 2114-2000, of at least 60.0 and at most 74.0, preferably at least 64.0 and at most 74.0, more preferably at least 68.0 and at most 74.0 mg KOH/g, and a hydroxyl value ($OHV_A$) as measured titrimetrically by ISO 4629-2-2016, of at most 10, preferably at most 5 mg KOH/g, and has a glass transition temperature ($T_{gB}$) as determined by DSC according to the description, of at least 50 and at most 70° C., preferably at least 55 and at most 65° C., and has a functionality ($f_B$) of at least 3.5 and at most 5.0, and has a number average molecular weight ($M_{nB}$) as determined by SEC according to the description, of at least 2000 and at most 5000 Da, preferably at least 2500 and at most 4000 Da, and has a weight average molecular weight ($M_B$) as determined by SEC according to the description, of at least 6000 and at most 13000 Da, preferably at least 6500 and at most 12000 Da, and has a polydispersity DB (=$M_{wB}/M_{nB}$) of at least 2.0 and at most 4.0 preferably at least 2.5 and at most 3.5, and has a melt viscosity ($N_B$) as determined via rheometry according to the description, of at least 8 and at most 120, more preferably at least 10 and at most 100, even more preferably at least 20 and at most 40 Pa·s.

A11 Preferably, the PCC A is as disclosed in any one of paragraphs A1, A1a, A2 to A10 or in section 1 (including its subsections), wherein the PCC A comprises the pigment in an amount of at least 1 and at most 70, preferably at least 1 and at most 60, more preferably at least 1 and at most 50, even more preferably at least 1 and at most 40, for example at least 2 and at most 70, for example at least 2 and at most 60 for example at least 2 and at most 50 for example at least 2 and at most 40 pph PCC A.

A12 Broadly in accordance with the invention, there is provided a cured PCC A as the PCC A is as disclosed in any one of paragraphs A1, A1a, A2 to A11 or in section 1 (including its subsections).

A13 Broadly in accordance with the invention, there is provided an article having either i) having coated thereon a PCC A as the PCC A is disclosed in any one of paragraphs A1, A1a, A2 to A11 or in section 1 (including its subsections), or ii) coated and cured thereon a PCC A, as the PCC A is disclosed in any one of paragraphs A. A11a, A2 to A11.

A14 Broadly in accordance with the invention, there is provided a process for producing an article having coated and cured thereon a PCC A as disclosed in any one of paragraphs A1, A1a, A2 to A11 or in section 1 (including its subsections), wherein the process comprises the steps of:

a. applying the PCC A, to an article;
b. heating the PCC A for enough time e.g. 1-60 minutes, and at a suitable temperature e.g. 140-225° C. to cure the PCC A to obtain the article having coated and cured thereon the PCC A.

A15 Broadly in accordance with the invention, there is provided a process for making a composition or an article, each one of them suitable for any one of the applications selected from the group consisting of powder coating applications, powder-in-mould coating applications, 3D-printing applications, automotive applications, marine applications, aerospace applications, medical applications, defense applications, sports/recreational applications, architectural applications, bottling applications, household applications, machinery applications, can applications, coil applications, energy applications, textile applications and electrical applications, wherein the process comprises the step of using (providing) a PCC A as disclosed in any one of paragraphs A1, A1a, A2 to A11 or in section 1 (including its subsections).

A16 Broadly in accordance with the invention, there is provided a process for making the PCC A as the PCC A is disclosed in any one of paragraphs A1, A1a, A2 to A11 or in section 1 (including its subsections), wherein the process comprises the steps of:

a. mixing the components of the polyester binder (PB)—that is the PRA and PRB—to obtain a PB-premix;
b. mixing the PB-premix with the crosslinker and optionally other components of the PCC A to obtain a premix, and
c. heating the premix in an extruder, to obtain an extrudate;
d. cooling down the extrudate to obtain a solidified extrudate; and
e. grinding the solidified extrudate into smaller particles to obtain the PCC A.

A17 Broadly in accordance with the invention, there is provided a process for making the PCC A as the PCC A is disclosed in any one of paragraphs A1, A1a, A2 to A11 or in section 1 (including its subsections), wherein the process comprises the steps of:

a. mixing the components of the polyester binder (PB)—that is the PRA and PRB—with the crosslinker and optionally other components of the PCC A to obtain a premix, and
b. heating the premix in an extruder, to obtain an extrudate;
c. cooling down the extrudate to obtain a solidified extrudate; and
d. grinding the solidified extrudate into smaller particles to obtain the PCC A.

A18 Broadly in accordance with the invention, there is provided a process for producing an article having coated and cured thereon a PCC A as disclosed in any one of paragraphs A1, A1a, A2 to A11 or in section 1 (including its subsections), wherein the process is as disclosed in section 4 including any combination of its preferments.

A19 Broadly in accordance with the invention, there is provided a process for making the PCC A as the PCC A is disclosed in any one of paragraphs A1, A1a, A2 to A11 or in section 1 (including its subsections), wherein the process is as disclosed in section 2 including any combination of its preferments.

All combinations of minimum and maximum values of the parameters disclosed herein may be used to define the parameter ranges for various preferments or embodiments of the invention.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application can be combined with each other.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects of the invention as these are disclosed in sections 1 (including its subsections), 2, 3, 4 and 5 can be combined with each other.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 1—and its subsections—can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 3 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 4 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 5 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects of the invention as these are disclosed in sections 1 (including its subsections), 2, 3, 4 and 5 can be combined with each other and with the any feature, element, component, embodiment, aspect, range and especially any preferred feature, preferred element, preferred embodiment, preferred aspect, preferred range, preferred combination of ranges, preferments, embodiments and aspects of the invention as these are disclosed in paragraphs A1, A1a, A2-A19.

Definitions

A 'resin' is herein understood to have the same meaning as it has to a skilled person in thermosetting polymer chemistry, namely as a low molecular weight polymer having functional groups e.g. carboxylic acid functional groups ( . . . —COOH); the term 'low molecular weight' means a number average molecular weight ($M_n$) of at least 1000 Da and at most 25000 Da; preferably, the number of reactive groups per molecule is at least two. The resin is able to crosslink via reactions that involve its functional groups, said reactions are induced by means of heat and/or radiation, ultimately connecting the polymer chains together through the formation of permanent covalent (crosslink) bonds, resulting to a cured resin.

By 'polymer' is meant herein a high molecular weight polymer having a number average molecular weight ($M_n$) higher than 25000 Da.

By 'functional groups' is meant herein a covalently bonded group of atoms within a molecule, such as for example the carboxylic acid group in a carboxylic acid or the hydroxyl group in an alcohol, that determines the chemical behaviour of said compound, are capable of reacting with functional groups of another molecule and are responsible for the characteristic chemical reactions of those molecules. In the case of a carboxylic acid functional polyester resin the functional groups of said polyester resin are predominantly carboxylic acid functional groups that behave as a unit in chemical reactions and said groups are capable of reacting with the functional groups of another molecule, for example a crosslinker such as HHA compounds. Typically in the case of a carboxylic acid functional polyester resin, the carboxylic acid functional groups are terminal groups (=end-groups) which are located at the end(s) of the polyester resin's macromolecular structure (including terminal groups on side chains which side chains form part of the main and longer-when compared to side chains—macromolecular chain) of each polyester resin molecule.

By 'mol % based on a polyester resin' (e.g. mol % based on PRA) is meant herein the total amount of moles of monomers reacted to produce said polyester resin. For clarity, the total amount of monomers reacted to produce the polyester resin is (allowing for rounding errors) 100 mol %. For example the total amount of the specific components—as described in the claims and as disclosed herein—that are used to prepare the polyester resins PRA and PRB, and optionally any other alcohol and/or carboxylic acid and/or carboxylic acid anhydride and/or diester of a carboxylic acid that may be used to prepare the polyester resins PRA and PRB, is 100 mol %.

By '$M_n$' of a resin for example a polyester resin, is meant the number average molecular weight. The $M_n$ is determined using Size Exclusion Chromatography (SEC) as described herein.

By '$M_w$' of a resin for example a polyester resin, is meant the weight average molecular weight. The $M_w$ is determined using Size Exclusion Chromatography (SEC) as described herein.

By 'AV' of a resin for example a polyester resin, is meant the acid value. The AV is determined titrimetrically by ISO 2114-2000, as described herein.

By 'OHV' of a resin for example a polyester resin, is meant the hydroxyl value. The OHV is determined titrimetrically by ISO 4629-2-2016 as described herein.

By 'polydispersity (D)' of a resin for example a polyester resin having a $M_n$ and $M_w$, is meant herein (equation EQ1):

$$D=M_w/M_n \tag{EQ1}$$

By 'melt viscosity (N)' (or equally viscosity (N), in Pa·s) of a resin for example a polyester resin is meant herein the melt viscosity (in Pa·s) at 160° C., determined via rheometry, as disclosed herein.

The 'functionality (f)' of a resin for example a polyester resin, having a number average molecular weight ($M_n$), an acid value (AV) and a hydroxyl value (OHV) is calculated according to the following equation EQ2:

$$f=[M_n \times (AV+OHV)]/56110 \tag{EQ2}$$

By '$T_g$' is meant herein the glass transition temperature. The $T_g$ is determined using DSC (Differential Scanning Calorimetry) as described herein; in case a resin for example a polyester resin or a thermosetting powder coating composition has multiple glass transition temperatures then the $T_g$ recorded at the higher temperature is mentioned herein as $T_g$.

By '$\Delta H_m$' is meant herein the melting enthalpy. The $\Delta H_m$ is determined using DSC (Differential Scanning Calorimetry) as described herein.

By 'carboxylic acid functional polyester resin' is meant a polyester resin which has an acid value that is higher than its hydroxyl value. A carboxylic acid functional polyester resin has predominantly carboxylic acid functional groups.

By 'hydroxyl functional polyester resin' is meant a polyester resin which has a hydroxyl value that is higher than its acid value. A hydroxyl functional polyester resin has predominantly hydroxyl functional groups.

By 'branched polyester resin' is meant herein a polyester resin having a functionality (f) of at least 2.01 and of at most 10.

The terms 'amorphous' and 'crystalline' used to characterize a resin for example a polyester resin, or a binder (B), or a polyester binder (PB), or a thermosetting powder coating composition, are informal terms used in the art to indicate the predominant character of the relevant resin or thermosetting powder coating composition, in respect to its degree of crystallinity but these terms are defined more precisely herein by melting enthalpy ($\Delta H_m$) values. The term 'crystalline' denotes both crystalline and semi-crystalline.

By 'amorphous' resin e.g. amorphous polyester resin, or amorphous binder (B), or amorphous polyester binder (PB), or amorphous thermosetting powder coating composition, is meant herein that a resin or a thermosetting powder coating composition has: i) a melting enthalpy ($\Delta H_m$) lower than 10 J/g, and ii) a glass transition temperature ($T_g$).

By 'crystalline' resin e.g. crystalline polyester resin, or crystalline binder (B), or crystalline polyester binder (PB), or crystalline thermosetting powder coating composition, is meant herein that a resin or a thermosetting powder coating composition has: i) a melting enthalpy ($\Delta H_m$) of at least 10 J/g, and ii) a glass transition temperature ($T_g$).

Each of the terms: 'binder (B)', 'polyester binder (PB)', 'component A1' (or simply 'A1'), 'diol-A1', 'component A2' (or simply 'A2'), 'dicarboxylic-acid-A2a', 'dicarboxylic-acid-A2b', 'component A3' (or simply 'A3'), 'alcohol-A3', 'carboxylic-acid-anhydride-A3', 'component B1' (or simply 'B1'), 'diol-B1', 'component B2' (or simply 'B2'), 'dicarboxylic-acid-B2a', 'dicarboxylic-acid-B2b', 'component B3' (or simply 'B3'), 'alcohol-B3', 'carboxylic-acid-anhydride-B3', has the meaning as described herein.

By the term 'hydrocarbon' is meant herein a chemical compound consisting of carbon and hydrogen only.

By the term 'hydrocarbyl' is meant herein a univalent organic group formed by removing a hydrogen atom from a saturated or unsaturated hydrocarbon.

Exemplary hydrocarbyls include but are not limited to methyl, ethyl, propyl, butyl, pentyl, hexyl, octyl, nonyl, decyl, eicosyl, triantacosyl, tetracontyl, pentacontyl, hexacontyl, phenyl, naphthyl, benzyl.

By the term 'saturated-hydrocarbyl' is meant herein a saturated hydrocarbyl. Exemplary saturated-hydrocarbyls include but are not limited to alkyls such as methyl, ethyl, propyl, butyl, pentyl, hexyl.

By the term 'optionally-substituted-hydrocarbyl' is meant herein a hydrocarbyl optionally substituted by one or more substituents.

By the term 'hydrocarbylene' is meant herein a divalent organic group formed by removing two hydrogen atoms from a saturated or unsaturated hydrocarbon, the free valences of which are not engaged in a double bond. Exemplary hydrocarbylenes include but are not limited to methylene, 1,3-phenylene, ethenyl, 1-methyl ethenyl, 3-butenyl-1,3,-diyl, 2-propenyl-1,2diyl.

By the term 'saturated-hydrocarbylene' is meant herein a saturated hydrocarbylene.

By the term 'optionally-substituted-hydrocarbylene' is meant herein a hydrocarbylene optionally substituted by one or more substituents. Exemplary optionally-substituted-hydrocarbylenes include but are not limited to trimethylene amino, triethylene amino, 3-carboxy-2-propenyl, 3-methoxy carbonyl-2-propenyl.

By the term 'substituent' is meant herein an atom or a group of atoms that replaces one or more hydrogen atoms attached to a parent structure. Exemplary substituents include but are not limited to oxygen, carboxyl, hydroxyl, amino, cyano, methoxy, formyl, imino, etc.

By 'composition' is meant herein the combining and/or mixture of distinct chemical substances and/or components to form a whole.

By 'powder' is meant herein, a substantially dry solid substance at room temperature and at atmospheric pressure reduced to a state of fine, loose particles wherein the individual particles have preferably a maximum particle size of at most 200, more preferably of at most 180, even more preferably of at most 160, most preferably of at most 150, especially of at most 140, more especially of at most 130, most especially of at most 120, for example of at most 110, for example of at most 100, for example of at most 90 μm at 23° C. and at atmospheric pressure; the individual particles have preferably a minimum particle size of at least 10, more preferably of at least 15, even more preferably of at least 20, most preferably of at least 25, especially of at least 30, more especially of at least 35, most especially of at least 40, for example of at least 45, for example of at least 50, for example of at least 60, for example of at least 70 μm at 23° C. and at atmospheric pressure. A particle is defined as a small object that: a) has mean linear dimensions as described herein after and b) behaves as a whole unit in terms of its transport and properties. The particle size distribution (PSD) of a powder is a list of values or a mathematical function that defines the relative amounts of particles present, sorted according to size. The terms 'particle size' and 'particle size distribution' will be used interchangeably in the context of the invention when used in relation to a powder.

The method used to measure the particle size of the thermosetting powder coating compositions of the invention is sieve analysis. According to it, the powder is separated on sieves of different sizes. Thus, the PSD is defined in terms of discrete size ranges: e.g. 'weight % of sample powder has particle size in the range of 75 microns to 90 microns', when sieves of these sizes are used. Preferably, 90 weight % of the thermosetting powder coating composition of the invention has a particle size in the range of 20 to 200 micron. The PSD can be determined for example by the following method: a certain amount of thermosetting powder coating composition, for example 100 g, is brought onto a Fritsch GmbH Analysette 3 Spartan sieving apparatus equipped with a 200 micron sieve. The sample is sieved for 15 minutes at a 2.5 mm amplitude. The fraction of the sample which remained on the sieve was weighed after sieving. The fraction of the sample that went through the sieve (sieved fraction) is collected and is placed on a 160 micron sieve and is sieved as mentioned herein above. Once the same measurements (weighing) are performed as mentioned herein above, the same procedure is repeated using sequentially a 140, a 125, a 112, a 100, a 90, a 75, a 50 and a 20 micron sieve; the last sieved fraction with a size smaller than 20 micron is also weighed. Summing up the various weight fractions, this should yield the initial amount of sample, in this example 100 g. The various weight fractions represent the PSD as a list of values representing the relative amounts of particles present, sorted according to sieves used.

By 'substantially dry' is meant herein that a powder e.g. a thermosetting powder composition, or a polyester resin does not comprise any deliberately added organic solvent and/or aqueous solvent e.g. water or moisture but the powder or the polyester resin may comprise moisture absorbed from the atmosphere in an amount of up to 30, preferably up to 20, more preferably up to 10, even more preferably up to 5, most preferably up to 3, especially up to 2, more especially up to 1% w/w based on the total weight of the thermosetting powder composition or that of the polyester resin.

By 'thermosetting powder coating compositions' or 'powders' is meant herein, a mixture of components in the form of a powder and which compositions have the ability to form an irreversible crosslinked network (the so-called 'cured form' or 'cured composition') upon curing, preferably via heat and/or radiation curing, more preferably via heat curing. For clarity, reference to any one of terms 'thermosetting powder coating compositions' or 'powders' is to be understood as uncured thermosetting powder coating compositions or equally uncured powders.

By 'components of a thermosetting powder coating composition' is meant herein constituent elements, their preferred embodiments and combinations thereof, that constitute part of the thermosetting powder coating composition of the invention; said components, their preferred embodiments and combinations thereof, should be construed in view of the whole disclosure.

By 'one-component thermosetting powder coating composition' or '1K thermosetting powder coating composition' or '1K system' is herein meant that all components of the thermosetting powder coating composition are melt-mixed e.g. via extrusion, and form part of one homogeneous thermosetting powder coating composition.

By 'two-component thermosetting powder coating composition' or '2K thermosetting powder coating composition' or '2K system' is herein meant an heterogeneous thermosetting powder coating composition that comprises at least two separate, distinct powders with different chemical compositions; the at least two separate, distinct and different powders are each typically prepared via melt-mixing. The at least two separate, distinct and different powders are physically mixed via for example physical blending to produce the 2K thermosetting powder coating composition, before the latter either being stored or applied and cured onto an article.

By 'physical mixture' is meant herein what a skilled person in the art thermosetting powder coatings would understand, that is the elements of the mixture are brought and mixed together without: i) a substantial physical transformation and/or process that involves for example substantial melting, use of any liquid media e.g. organic solvent, water, able to solubilize or disperse the powders, and/or ii) chemical transformation and/or process that involves for example a chemical reaction, taking place. For example the physical blending of the at least two separate, distinct powders with different chemical compositions of a 2K thermosetting powder coating composition, with a blender (mechanical mixing/blending) is viewed as a physical mixture according to the invention, whilst the melt-extrusion of the components of a 1K thermosetting powder coating composition e.g. binder, pigment (known also as co-extrusion), is viewed as a non-physical mixture.

By 'room temperature' is meant herein a temperature of 23±1° C.

By 'atmospheric pressure' is meant herein pressure of 1 atm.

The term 'binder (B)' (or equally 'B') has the meaning as described herein.

The term 'polyester binder (PB)' (or equally 'PB') has the meaning as described herein.

By 'crosslinker' is meant herein a compound or a mixture of compounds that are able to react with carboxylic acid functional polyester resins. The crosslinker may be a monodispersed compound, or a mixture of monodispersed compounds, or a resin or a mixture of resins, or a mixture of monodispersed compounds and resins.

By 'β-hydroxylalkyl-amide compounds' (HHA compounds) is meant herein chemical compounds having the average chemical structure represented by the following Formulae 1 or 2:

Formula 1

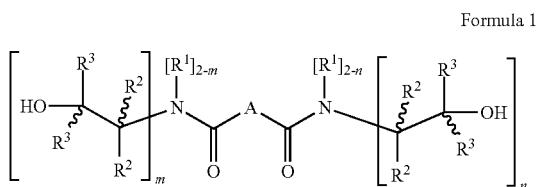

wherein:

n ranges from and including 1 up to and including 2, preferably equal or greater than 1.6 and lower than 2;

m ranges from and including 1 up to and including 2, preferably equal or greater than 1.6 and lower than 2;

A is a $C_{1-60}$ optionally-substituted-hydrocarbylene (preferably a $C_{1-60}$ saturated-hydrocarbylene, more preferably a $C_{1-20}$ optionally-substituted-hydrocarbylene, even more preferably a $C_1$-20 saturated-hydrocarbylene) linking group;

$R^1$ is hydrogen, or a $C_{1-5}$ alkyl group optionally substituted with one or more hydroxyl groups;

$R^2$ is hydrogen, or a $C_{1-5}$ alkyl group;

$R^3$ is hydrogen, or a $C_{1-5}$ alkyl group;

while one of the groups $R^2$ and one of the groups $R^3$ of the unit m, may also form—together with the adjacent carbon atoms-, a cycloalkyl group; and/or while one of the groups $R^2$ and one of the groups $R^3$ of the unit n, may also form—together with the adjacent carbon atoms-, a cycloalkyl group, Formula 2

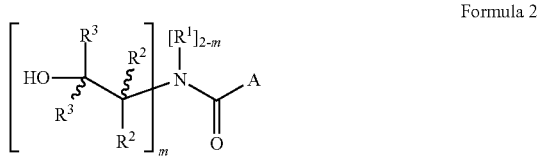

wherein:

m ranges from and including 1 up to and including 2, preferably equal or greater than 1.6 and lower than 2;

A is a $C_{1-60}$ optionally-substituted-hydrocarbyl (preferably a $C_{1-60}$ saturated-hydrocarbyl, more preferably a $C_{1-20}$ optionally-substituted-hydrocarbyl, even more preferably a $C_{1-20}$ saturated-hydrocarbyl);

$R^1$ is hydrogen, or a $C_{1-5}$ alkyl group optionally substituted with one or more hydroxyl groups;

$R^2$ is hydrogen, or a $C_{1-5}$ alkyl group;

$R^3$ is hydrogen, or a $C_{1-5}$ alkyl group;

while one of the groups $R^2$ and one of the groups $R^3$, may also form—together with the adjacent carbon atoms-, a cycloalkyl group.

Preferably the crosslinker is selected from the group consisting of β-hydroxylalkyl-amides having the average structure represented by the following Formula 3, and mixtures thereof.

Formula 3

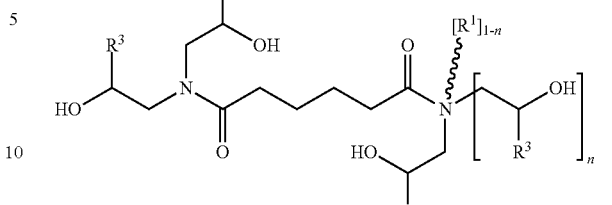

wherein n ranges from and including 0.2 up to and including 1

$R^1$ is hydrogen, or a $C_{1-5}$ alkyl group;

$R^3$ is hydrogen, or a $C_5$ alkyl group.

For clarity, Formula 3 represents HHA compounds that also read under the Formula 1. If the β-hydroxylalkyl-amide compounds represented by Formulae 1 or 2, are monodisperse then these Formulae represent a single molecule and n and m are independently an integer. If the β-hydroxylalkyl-amide compounds represented by Formulae 1 or 2, are polydisperse mixtures then these Formulae represent an average structure of the molecules in the mixture and n and m are independently real numbers. β-hydroxylalkyl-amides suitable as crosslinkers for thermosetting powder coating compositions are well-known to those skilled in the art. Examples of β-hydroxylalkyl-amides are disclosed in U.S. Pat. Nos. 4,727,111, 4,788,255, 4,076,917, EP 322834 and EP 473380, WO 2009106454.

By 'curing' or 'cure' is meant herein the process of becoming 'set' that is to form an irreversibly crosslinked network (the so-called 'cured form' or 'cured composition'), a material that can no longer flow, be melted or dissolved. Herein, the terms 'curing' 'cure' and 'crosslinking' are used interchangeably. Preferably, the curing of the thermosetting powder coating composition of the invention takes place using heat and in that case the curing can be called 'heat curing'. Optionally, a combination of heat and pressure can be used to cure the heat-curable thermosetting powder coating compositions of the invention. In the context of the invention, the term 'heat curing' does not exclude the application of pressure and/or vacuum along with heat in order to cure the heat-curable thermosetting powder coating compositions of the invention.

By 'heat-curable thermosetting powder coating composition' is meant herein a thermosetting powder coating composition, said composition has the ability to cure upon heating. The thermosetting powder coating compositions described herein are heat-curable.

By 'cured thermosetting powder coating composition' is meant herein an object that is derived upon partial or full curing of a thermosetting powder coating composition; said curing may be effected via heat; said object may have any shape, size or form and it can for example be a film, coating; preferably the cured thermosetting powder coating composition is a powder coating.

By 'powder coating' is meant herein the cured thermosetting powder coating composition in the form of a coating. A powder coating is derived upon curing of a thermosetting powder coating composition.

By 'equivalent weight of a carboxylic acid functional polyester resin ($EW_{POL}$)', is meant herein:

$$EW_{POL} = 56100 / AV_{POL}$$

wherein the $AV_{POL}$ is the acid value of the carboxylic acid functional polyester resin.

By 'equivalent weight of the PRA ($EW_{PRA}$)'—as the PRA is described herein-, is meant herein:

$$EW_{PRA}=56100/AV_{PRA}$$

wherein the $AV_{PRA}$ is the acid value of the PRA.

By 'equivalent weight of the PRB ($EW_{PRB}$)'—as the PRB is described herein-, is meant herein:

$$EW_{PRB}=56100/AV_{PRB}$$

wherein the $AV_{PRB}$ is the acid value of the PRB.

By 'equivalent weight of the polyester binder (PB) ($EW_{PB}$)'—as the polyester binder (PB) is described herein-, is meant herein:

$$EW_{PB}=56100/AV_{PB}$$

wherein the $AV_{PB}$ represents the calculated acid value of the polyester binder (PB), and this $AV_{PB}$ is calculated as follows:

$$AV_{PB}=[(WP_{RA}/W_{PB})\times AV_{PRA}]+[(W_{PRB}/W_{PB})\times AV_{PRB}]$$

wherein the $W_{PRA}$ represents the weight amount of PRA, $W_{PRB}$ represents the weight amount of PRB, $AV_{PRA}$ represents the acid value of the PRA and $AV_{PRB}$ represents the acid value of the PRB.

By 'equivalent weight of crosslinker ($EW_{CR}$)'-referring to the crosslinker of the PCC A (HHA compounds as these are described herein)—, is meant herein $$EW_{CR}=56100/OHV_{CR}$$

wherein the $OHV_{CR}$ is the hydroxyl value of the crosslinker. Typically the $OHV_{CR}$ is provided by the supplier of the crosslinker. If the supplier provides a range for the $OHV_{CR}$, then the value selected for the calculation of $EW_{CR}$, should be the highest of the given range. For example, the $OHV_{CR}$ of the Primid® XL-552—which was used as the crosslinker in the Examples—is 620-700 mg KOH/g. The $EW_{CR}$ calculated for the Primid® XL-552 was 84 mg KOH/g. If the supplier does not provide for a $OHV_{CR}$, then the $OHV_{CR}$ is determined titrimetrically by ISO 4629-2-2016 as described herein.

By 'white thermosetting powder coating compositions' is meant herein white pigmented thermosetting powder coating compositions comprising: i) a polyester binder (e.g. PB in case of an inventive white thermosetting powder coating composition), and a crosslinker (e.g. a β-hydroxylalkylamide crosslinker as described herein in case of an inventive white thermosetting powder coating composition), wherein the weight amounts of the polyester binder and the crosslinker are calculated on a stoichiometric basis. This stoichiometric basis is expressed by the following equation:

$$W_{CR}=(W_{PB}\times EW_{CR})/EW_{PB}$$

wherein the $W_{CR}$ represents the amount of the crosslinker, $W_{PB}$ represents the amount of the polyester binder (PB), and $EW_{CR}$ is as described herein, and $EW_{PB}$ is as described herein. The amount of crosslinker for the comparative white thermosetting powder coating compositions is based also on the principle of stoichiometric calculation as expressed just above in case of white thermosetting powder coating compositions according to the invention, adapted analogously to the formulation of the comparative white thermosetting powder coating compositions as one of ordinary skill in the art of thermosetting powder coating compositions understands, and ii) only Kronos® 2360 (titanium dioxide white pigment, supplied by Kronos Titan GmbH) as a pigment, in an amount of 50 pph B (or in case of a comparative formulation in an amount of 50 pph on the total amount of a polyester binder and a crosslinker).

By 'comparative white thermosetting powder coating compositions' is meant herein white pigmented thermosetting powder coating compositions—as defined herein—that are not according to the invention because for example at least one or both of the polyester binder and the crosslinker, is not according to the claimed invention, and any further components of these comparative white thermosetting powder coating compositions are the same and are contained in the same amounts when compared to a white thermosetting powder coating composition according to the invention.

By 'white powder coatings' is meant herein white pigmented powder coatings derived upon curing of white thermosetting powder coating compositions, as the latter are defined herein.

By 'comparative white powder coatings' is meant herein white pigmented powder coatings derived upon curing of comparative white thermosetting powder coating compositions, as the latter are defined herein.

By 'PSS' of a thermosetting powder coating composition is meant herein the physical storage stability as determined herein.

By 'RIR' of a powder coating is meant herein the reverse impact resistance as determined herein.

By 'gloss60° ' of a powder coating is meant herein the gloss of a powder coating measured at a 60° angle as described herein.

By 'thermosetting powder coating composition having 'excellent PSS' is meant herein that the white thermosetting powder coating composition has a physical storage stability (PSS) of at least 9 and at most 10.

By 'thermosetting powder coating composition having 'very good PSS' is meant herein that the white thermosetting powder coating composition has a physical storage stability (PSS) of at least 7 and at most 8.

By 'thermosetting powder coating composition having 'good PSS' is meant herein that the white thermosetting powder coating composition has a physical storage stability (PSS) of 6.

By 'thermosetting powder coating composition having 'insufficient PSS' is meant herein that the white thermosetting powder coating composition has a physical storage stability (PSS) of at least 4 and at most 5.

By 'thermosetting powder coating composition having 'poor PSS' is meant herein that the white thermosetting powder coating composition has a physical storage stability (PSS) of at least 2 and at most 3.

By 'thermosetting powder coating composition having 'very poor PSS' is meant herein that the white thermosetting powder coating composition has a physical storage stability (PSS) of 1.

By 'storage stable thermosetting powder coating composition' is meant herein a thermosetting powder coating composition having at least good PSS.

By 'matt powder coatings' or 'equally 'low gloss powder coatings' is meant herein a white powder coating—as these are defined herein—having a thickness of 60±5 μm on ALQ-46 test panels chromium conversion coated from Q-lab, that is obtained upon curing at 180° C. for 10 min of a white thermosetting powder coating composition as the latter are defined herein, wherein the white powder coating has a gloss60° (gloss60°-180) of at most 45, preferably at most 44, more preferably at most 43, even more preferably at most 42, most preferably at most 41, especially at most 40, more especially at most 39, for example at most 38, for example at most 37, for example at most 36, for example at most 35, for example at most 34, for example at most 33, for example at most 32, for example at most 31, for example at most 30, for example at most 29, for example at most 28, for example at most 27, for example at most 26, for example at most 25, for example at most 24, for example at most 23, for example at most 22, for example at most 21, for example at most 20, as gloss 60° is defined and measured herein.

By 'impact resistant powder coatings' is meant herein white powder coatings—as these are defined herein—which have reverse impact resistance (RIR) of at least 60 inch/lbs ('pass'), as RIR is defined and determined herein.

By 'non-impact resistant powder coatings' is meant herein white powder coatings—as these are defined herein—which have reverse impact resistance (RIR) lower than 60 inch/lbs ('fail'), as RIR is defined and measured herein.

By 'impact resistant matt powder coatings' is meant herein a powder coating which is matt and impact resistant.

The gloss60° of white powder coatings derived upon curing of white thermosetting powder coating compositions at 180° C. for 10 minutes is abbreviated as gloss60°-180. The gloss60° of white powder coatings derived upon curing of white thermosetting powder coating compositions at 160° C. for 10 minutes is abbreviated as gloss60°-160. The gloss60° of white powder coatings derived upon curing of white thermosetting powder coating compositions at 170° C. for 10 minutes is abbreviated as gloss60°-170. The gloss60° of white powder coatings derived upon curing of white thermosetting powder coating compositions at 190° C. for 10 minutes is abbreviated as gloss60°-190. The gloss60° of white powder coatings derived upon curing of white thermosetting powder coating compositions at 200° C. for 10 minutes is abbreviated as gloss60°-200.

By 'SD-gloss60° ' is meant herein the standard deviation (represented also by the Greek letter sigma a or the Latin letter s) of the data set consisting of the recorded values of gloss60°-200 and gloss60°-190 and gloss60°-180 and gloss60°-170 and gloss60°-160. The standard deviation of this data set is the square root of its variance.

By 'SD-BTB-gloss60° ' is meant herein the standard deviation (represented also by the Greek letter sigma a or the Latin letter s) of the data set consisting of the recorded values of gloss60°-180 of two white powder coatings each of which was prepared upon curing at 180° for 10 minutes of a different batch of compositionally the same white thermosetting powder coating composition. The standard deviation of this data set is the square root of its variance.

By 'different batch' of a compositionally the same thermosetting powder coating composition, is meant herein that one or both of the PRA and PRB making up the polyester binder (PB) of the thermosetting powder coating composition, was/were prepared in a different production batch.

By 'low gloss consistency' (or low gloss consistent') is meant herein that the SD-gloss60° of a matt powder coating (as the latter is defined herein), is at most 3.0. For example, for a powder coating to have low gloss consistency:
  i) it must be a matt powder coating (as this is defined herein), and
  ii) its SD-gloss60° must be at most 3.0.

By 'excellent low gloss consistency' is meant herein that the SD-gloss60° of a matt powder coating (as the latter is defined herein), is at most 2.0.

By 'sufficient low gloss consistency' is meant herein that the SD-gloss60° of a matt powder coating (as the latter is defined herein), is at least 2.1 and at most 3.0.

By 'insufficient low gloss consistency' is meant herein that the SD-gloss60° of a matt powder coating (as the latter is defined herein), is at least 3.1.

The compositions of the claimed invention provide for powder coatings having at least sufficient low gloss consistency. Preferably the compositions of the claimed invention provide for powder coatings having excellent low gloss consistency.

By 'batch-to-batch low gloss consistency' (or batch-to-batch low gloss consistent') is meant herein that the SD-BTB-gloss60° of a matt powder coating (as the latter is defined herein), is at most 3.0. For example, for a powder coating to have batch-to-batch low gloss consistency:
  i) it must be a matt powder coating (as this is defined herein), and
  ii) its SD-BTB-gloss60° must be at most 3.0.

By 'excellent batch-to-batch low gloss consistency' is meant herein that the SD-BTB-gloss60° of a matt powder coating (as the latter is defined herein), is at most 2.0.

By 'sufficient batch-to-batch low gloss consistency' is meant herein that the SD-BTB-gloss60° of a matt powder coating (as the latter is defined herein), is at least 2.1 and at most 3.0.

By 'insufficient batch-to-batch low gloss consistency' is meant herein that the SD-BTB-gloss60° of a matt powder coating (as the latter is defined herein), is at least 3.1.

Certain moieties, species, groups, repeat units, compounds, oligomers, polymers, materials, mixtures, compositions and/or formulations which comprise and/or are used in some or all of the invention as described herein may exist as one or more different forms such as any of those in the following non exhaustive list: stereoisomers (such as enantiomers (e.g. E and/or Z forms), diastereoisomers and/or geometric isomers); tautomers (e.g. keto and/or enol forms). The invention comprises and/or uses all such forms which are effective as defined herein.

By '(N)IR lamp' denotes herein both a near-IR lamp and an IR lamp.

By 'lower than' is meant herein that the relevant maximum boundary value is not included in the range.

By 'higher than' is meant herein that the relevant minimum boundary value is not included in the range.

By 'pph' is meant herein weight parts per hundred weight parts.

By 'pph PCC A' is meant herein weight parts per hundred weight parts of the PCC A.

By 'pph B' is meant herein weight parts per hundred weight parts of binder (B).

By 'article' is meant herein an individual object or item or element of a class designed to serve a purpose or perform a special function and can stand alone; the article can be in any size, form or shape. A substrate is an example of an article.

Preferably, said article is selected from the group consisting of heat-sensitive articles, non-heat sensitive articles and combinations thereof; more preferably said article is selected from the group of non-heat sensitive articles, even more preferably said article is selected from the group consisting of thermoplastic composite, thermoset composite, fibre reinforced composites, sandwich materials e.g. sandwich materials comprising heat sensitive foam core, metal and combinations thereof. Typical examples of non-heat-sensitive articles include glass, ceramic, composite, fiber cement board, or metal, for example aluminum, copper or steel articles, for instance carbon steel, where the main alloying constituent is carbon. Carbon steel usually contains carbon 0.2 and 1.5% w/w based on the total alloy composition and often contains other constituents such as manganese, chromium, nickel, molybdenum, copper, tungsten, cobalt, or silicon, depending on the desired steel properties. Steel has properties similar to iron if the amount of carbon is not too high, for example not more than 1.5% w/w based on the total alloy composition. The steel may be surface treated (treatment with zinc, or zinc phosphate or iron phosphate) or non-surface treated. Heat-sensitive articles for example heat-sensitive substrates, include plastic articles, wood articles for example solid wood, such as for example: hard wood, soft wood, plywood; veneer, particle board, low density fibre board, medium density fibreboard and high density fibreboard, OSB (Oriented Strand Board) wood laminates, chipboard and other articles in which wood is an important constituent, such as for example foil covered wooden articles, engineered wood, plastic modified wood, plastic articles or wood plastic compounds (WPC); articles with cellulosic fibres, for example cardboard or paper articles; textile and leather articles. Examples of plastic articles include unsaturated polyester resin based compositions, ABS (acrylonitrile butadiene styrene), melamine-formaldehyde resins, polycarbonate, polyethylene, polypropylene, ethylene-propylene-diene monomer (EPDM), thermoplastic olefin (TPO), polyurethane (PU), polypropylene oxide (PPO), polyethylene oxide (PEO), polyethylene terephthalate and nylon, for example polyamide 6,6 and combinations thereof, for example polycarbonate-ABS. Other heat-sensitive articles include objects that are a combination of a non-heat-sensitive part such as metal parts with a heat-sensitive part, such as any one of the aforementioned for example plastic hosing with heavy metal parts, strips for example aluminium frames with heat strips. The article can be a domestic furniture, such as tables, chairs, cabinets, bedroom and bathroom furniture, office furniture, contract furniture such as school and child furniture, hospital furniture, restaurant and hotel furniture, kitchen cabinets and furniture, (flat) panels for interior design, interior and exterior windows and doors, interior and exterior window frames and door frames, exterior and interior sidings and flooring, articles for automotive applications, such as interior car parts, wheel covers, bumpers, under the hood parts, flexible flooring, sporting goods, cosmetics, audio-visual applications, such as TV sets, computer housing, phones, household appliances and satellite dishes.

For all upper and lower boundaries of any parameters given herein, the boundary value is included in each range for each parameter. All combinations of minimum and maximum values of the parameters described herein may be used to define the parameter ranges for various embodiments and preferences of the invention.

In the context of the present invention unless stated to the contrary, the disclosure of alternative values for the upper or lower limit of the permitted range of a parameter, coupled with an indication that one of said values is more highly preferred than the other, is to be construed as an implied statement that each intermediate value of said parameter, lying in between the more preferred and the less preferred of said alternatives, is itself preferred to said less preferred value and also to each value lying between said less preferred value and said intermediate value.

The terms 'effective', 'acceptable', 'active' and/or 'suitable' (for example with reference to any process, use, method, application, preparation, product, material, formulation, compound, composition, monomer, oligomer, polymer precursor, and/or polymers of the present invention and/or described herein as appropriate) will be understood to refer to those features of the invention which if used in the correct manner provide the required properties to that which they are added and/or incorporated to be of utility as described herein. Such utility may be direct for example where a material has the required properties for the aforementioned uses and/or indirect for example where a material has use as a synthetic intermediate and/or diagnostic tool in preparing other materials of direct utility. As used herein these terms also denote that a functional group is compatible with producing effective, acceptable, active and/or suitable end products.

The term 'comprising' as used herein means that the list that immediately follows is non-exhaustive and may or may not include any other additional suitable items, for example one or more further feature(s), component(s) and/or substituent(s) as appropriate. The term 'comprising' will be used interchangeably with the term 'containing'. 'Substantially comprising' or 'essentially consisting of' as used herein means a component or list of component(s) is present in a given material in an amount of at least 90, preferably at least 95, more preferably at least 98, even more preferably 99 pph of the given material. The term 'consisting of' as used herein mean that the list that follows is exhaustive and does not include additional items. 'Substantially-free' as used herein means a component or list of component(s) is present in a given material in an amount of at most 10, preferably at most 9, more preferably at most 8, even more preferably at most 7, most preferably at most 6, especially at most 5, more especially at most 4, even more especially at most 3, most especially at most 2, for example at most 1, for example at most 0.5, for example at most 0.2, for example at most 0.1 pph of the given material. 'Free' as used herein means a component or list of component(s) is not present in a given material.

It will be understood that the total sum of any quantities expressed herein as percentages (or pph) cannot (allowing for rounding errors) exceed 100% (or 100 pph). However where a list of components is non-exhaustive, the sum of the percentage (or pph) for each of such components may be less than 100% (or 100 pph) to allow a certain percentage for additional amount(s) of any additional component(s) that may not be explicitly described herein.

Unless the context clearly indicates otherwise, as used herein plural forms of the terms herein (for example monomer, polyester resin, binder, crosslinker, thermosetting powder coating composition, component, minute) are to be construed as including the singular form and vice versa.

The decimal separator in numbers (also known as the radix character) is indicated with a period ('.').

1. THE ONE-COMPONENT (1K) THERMOSETTING POWDER COATING COMPOSITION A (PCCA) & ITS VARIOUS COMPONENTS

The PCC A is as described in the entire application and as described in the claims. The term 'PCC A' as used herein includes any and all of its preferments, combinations of its features and ranges as well as combinations of any and all of its preferments with any and all of the combinations of its features and ranges. Thus, any and all of the PCC A disclosed in this section 1—and its subsections—includes any and all of their preferments, combinations of their features and ranges as well as combinations of any and all of their preferments with any and all of the combinations of their features and ranges, are collectively referred to—in the whole of the application—as the PCC A. Every and all components of the PCC A are described in detail in section 1 and its sub-sections.

The PCC A is a one-component (1K) thermosetting powder coating composition. More specifically, broadly in accordance with the invention there is provided an one-component (1K) thermosetting powder coating composition A (PCC A) comprising:

a) a binder (B) in an amount of at least 30 and at most 100, preferably at least 40 and at most 100, more preferably at least 50 and at most 100, even more preferably at least 60 and at most 100 pph PCC A, wherein the B consists of:
  i) a polyester binder (PB) in an amount of at least 90.0 and at most 98.0, preferably of at least 92.0 and at most 96.0, more preferably at least 92.5 and at most 95.0 pph B, wherein the PB consists of a polyester resin A (PRA) and a polyester resin B (PRB), and wherein the weight ratio of the weight amount of PRA to the weight amount of PRB (R=weight of PRA/weight of PRB) is at least 0.50 and at most 4.00 preferably at least 0.55 and at most 3.00, more preferably at least 0.60 and at most 2.50, even more preferably at least 0.60 and at most 2.00, most preferably at least 0.60 and at most 1.50, especially at least 0.70 and at most 1.30, more especially at least 0.80 and at most 1.25, even more especially at least 0.88 and at most 1.13, most especially at least 0.91 and at most 1.10, for example is equal to 1.0, and wherein the difference between the acid value of the PRB ($AV_B$) and the acid value of the PRA ($AV_A$) (DeltaAV=$AV_B$−$AV_A$) is at least 20 and at most 59, preferably at least 30 and at most 59, more preferably at least 40 and at most 59 mg KOH/g, and
  ii) a crosslinker in an amount of at least 2.0 and at most 10.0, preferably of at least 4.0 and at most 8.0, more preferably at least 5.0 and at most 7.5 pph B, wherein the crosslinker is selected from the group consisting of β-hydroxylalkyl-amides—as these are disclosed in the description-, and mixtures thereof, wherein the crosslinker is able to react with the PB, and b) a pigment in an amount of at least 0 and at most 70, preferably at least 0 and at most 60, more preferably at least 0 and at most 50, even more preferably at least 0 and at most 40 pph PCC A, and wherein the PRA is the polycondensation reaction product of at least:
  a component A1 in an amount of at least 45.0 and at most 49.9, more preferably at least 46.0 and at most 49.9, even more preferably at least 47.0 and at most 49.9, especially at least 47.5 and at most 49.9, more especially at least 47.5 and at most 49.5, most especially at least 48 and at most 49.5 mol % based on PRA, wherein the component A1 consists of: i) 2,2-dimethylpropane-1,3-diol in an amount of at least 70 and at most 100, preferably at least 80 and at most 100, more preferably at least 90 and at most 100, even more preferably at least 95 and at most 100, most preferably at least 96 and at most 100, especially 100% of the total amount of moles making up the A1, and ii) a diol-A1 selected from the group consisting of $C_{2-18}$ preferably $C_{2-16}$ aliphatic saturated diols excluding the 2,2-dimethylpropane-1,3-diol, and mixtures thereof, in an amount of at least 0 and at most 30, preferably at least 0 and at most 20, more preferably at least 0 and at most 10, even more preferably at least 0 and at most 5, most preferably at least 0 and at most 4, especially is 0% of the total amount of moles making up the A1, and a component A2 in an amount of at least 48.0 and at most 55.0, preferably at least 49.0 and at most 54.0, more preferably at least 49.5 and at most 53.0, even more preferably at least 49.8 and at most 52.5, most preferably at least 49.9 and at most 52.0, especially at least 50.1 and at most 52.0 mol % based on PRA, wherein the component A2 consists of: i) a dicarboxylic-acid-A2a selected from the group consisting of terephthalic acid, esters of terephthalic acid (e.g. diesters of terephthalic acid such as dimethyl terephthalate, diethyl terephthalate, dioctyl terephthalate), isophthalic acid, esters of isophthalic acid (e.g. diesters of isophthalic acid such as dimethyl isophthalate, diethyl isophthalate, dioctyl isophthalate), and mixtures thereof, in an amount of at least 90 and at most 100% of the total amount of moles making up the A2, and ii) a dicarboxylic-acid-A2b selected from the group consisting of $C_{6-13}$ aliphatic saturated dicarboxylic acids (preferably $C_{6-12}$ aliphatic saturated dicarboxylic acids, more preferably $C_{6-10}$ aliphatic saturated dicarboxylic acids), esters of $C_{6-13}$ aliphatic saturated dicarboxylic acids (preferably esters of $C_{6-12}$ aliphatic saturated dicarboxylic acids, more preferably esters of $C_{6-10}$ aliphatic saturated dicarboxylic acids, most preferably diesters of $C_{6-13}$ aliphatic saturated dicarboxylic acids, especially diesters of $C_{6-12}$ aliphatic saturated dicarboxylic acids, more especially diesters of $C_{6-10}$ aliphatic saturated dicarboxylic acids), hexahydrophthalic anhydride, and mixtures thereof, in an amount of at least 0 and at most 10% of the total amount of moles making up the A2, and a component A3 in an amount of at least 0 and at most 2.7, preferably at least 0 and at most 2.1, more preferably at least 0 and at most 1.5, even more preferably at least 0 and at most 1, most preferably at least 0 and at most 0.5 mol % based on PRA, wherein the component A3 is selected from the group consisting of: i) an alcohol-A3 selected from the group consisting of $C_{3-10}$ aliphatic saturated alcohols having at least 3 and at most 6 hydroxyl groups, and mixtures thereof, and ii) a carboxylic-acid-anhydride-A3 selected from the group consisting of trimellitic acid anhydride, pyromellitic acid anhydride, and mixtures thereof, wherein the total amount of monomers reacted to produce the PRA is 100 mol %, and wherein the PRA is carboxylic acid functional having an acid value ($AV_A$) as measured titrimetrically by ISO 2114-2000, of at least 15 and at most 35, preferably at least 15 and at most 33, more preferably at least 15 and at most 30, even more preferably at least 15 to 28, most preferably at least 15 to 26, for example at least 17 and at most 35, example at least 17 and at most 33, example at least 17 and at most 30, example at least 17 and at most 28, example at least 17 and at most 26, for example at least 20 and at most 35, example at least 20 and at most 33, example at least 20 and at most 30, example at least 20 and at most 28, example at least 20 and at most 26, for example at least 22 and at most 35, example at least 22 and at most 33, example at least 22 and at most 30, example at least 22 and at most 28, example at least 22 and at most 26, for example at least 23 and at most 35, example at least 23 and at most 33, example at least 23 and at most 30, example at least 23 and at most 28, example at least 23 and at most 26 mg KOH/g, and a hydroxyl value (OHV$_A$) as measured titrimetrically by ISO 4629-2-2016, of at most 10, preferably at most 5 mg KOH/g, has a glass transition temperature (T$_{gA}$) as determined by Differential Scanning Calorimetry (DSC) according to the description, of at least 40 and at most 75° C., and has a functionality (f$_A$) of at least 2.0 and at most 3.5, preferably at least 2.0 and at most 2.5, and has a number average molecular weight (M$_{nA}$) as determined by Size Exclusion Chromatography (SEC) according to the description, of at least 1100 and at most 10000 Da, preferably at least 2000 and at most 9000 Da, more preferably at least 2500 and at most 8000 Da, even more preferably at least 3000 and at most 7000 Da, has a weight average molecular weight (M$_A$) as determined by SEC according to the description, of at least 2200 and at most 20000 Da, preferably at least 4000 and at most 18000 Da, more preferably at least 5000 and at most 18000 Da, even more preferably at least 6000 and at most 18000 Da, has a polydispersity D$_A$ (=M$_{wA}$/M$_{nA}$) of at least 2.0 and at most 4.0, preferably at least 2.0 and at most 3.5, more preferably at least 2.0 and at most 3.0, and has a melt viscosity (N$_A$) as determined via rheometry according to the description, of at least 15 and at most 150, preferably at least 20 and at most 130, more preferably at least 25 and at most 120 Pa·s, and wherein the PRB is the polycondensation reaction product of at least:

a component B1 in an amount of at least 42 and at most 49.9, preferably at least 45.0 and at most 49.5, more preferably at least 47.0 and at most 49.0 mol % based on PRB, wherein the component B1 consists of: i) a diol-B1a selected from the group consisting of ethylene glycol, 1,2-propane diol, 1,3-propane diol, and mixtures thereof, in an amount of at least 50 and at most 90, preferably at least 57 and at most 88, more preferably at least 64 and at most 83% of the total amount of moles making up the B1, and ii) a diol-B1b selected from the group consisting of C$_{4-18}$ preferably C$_{4-16}$ aliphatic saturated diols and mixtures thereof, in an amount of at least 10 and at most 50, preferably at least 12 and at most 43, more preferably at least 17 and at most 36% of the total amount of moles making up the B1, and a component B2, in an amount of at least 42 and at most 55, preferably at least 43 and at most 52, more preferably at least 44 and at most 48 mol % on PRB, wherein the component B2 consists of: i) a dicarboxylic-acid-B2a selected from the group consisting of terephthalic acid, esters of terephthalic acid (e.g. diesters of terephthalic acid such as dimethyl terephthalate, diethyl terephthalate, dioctyl terephthalate), isophthalic acid, esters of isophthalic acid (e.g. diesters of isophthalic acid such as dimethyl isophthalate, diethyl isophthalate, dioctyl isophthalate), and mixtures thereof, in an amount of at least 80 and at most 100, more preferably at least 90 and at most 100% of the total amount of moles making up the B2, and ii) a dicarboxylic-acid-B2b selected from the group consisting of C$_{6-18}$ aliphatic saturated dicarboxylic acids (preferably C$_{6-12}$ aliphatic saturated dicarboxylic acids, more preferably C$_{6-10}$ aliphatic saturated dicarboxylic acids), esters of C$_{6-13}$ aliphatic saturated dicarboxylic acids (preferably esters of C$_{6-12}$ aliphatic saturated dicarboxylic acids, more preferably esters of C$_{6-10}$ aliphatic saturated dicarboxylic acids, most preferably diesters of C$_{6-13}$ aliphatic saturated dicarboxylic acids, especially diesters of C$_{6-12}$ aliphatic saturated dicarboxylic acids, more especially diesters of C$_{6-10}$ aliphatic saturated dicarboxylic acids), hexahydrophthalic anhydride, and mixtures thereof, in an amount of at least 0 and at most 20, more preferably at least 0 and at most 10% of the total amount of moles making up the B2, and a component B3 in an amount of at least 0.5 and at most 8.5, preferably at least 0.7 and at most 8.0, more preferably at least 1.0 and at most 8.0, even more preferably at least 2.0 and at most 8.0, most preferably at least 3.0 and at most 8.0, especially at least 4.0 and at most 8.0, more especially at least 5.0 and at most 8.0, even more especially at least 5.5 and at most 7.0, most especially at least 3.0 and at most 7.0 mol % on PRB, wherein the component B3 is selected from the group consisting of: i) an alcohol-B3 selected from the group consisting of C$_{3-10}$ aliphatic saturated alcohols having at least 3 and at most 6 hydroxyl groups, and mixtures thereof, and ii) a carboxylic-acid-anhydride-B3 selected from the group consisting of trimellitic acid anhydride, pyromellitic acid anhydride, and mixtures thereof, and wherein the total amount of monomers reacted to produce the PRB is 100 mol %, and wherein the PRB is a branched carboxylic acid functional having an acid value (AV$_B$) as measured titrimetrically by ISO 2114-2000, of at least 40 and at most 74, preferably at least 45 and at most 74, more preferably at least 50 and at most 74, even more preferably at least 54 and at most 74, most preferably at least 60 and at most 74, especially at least 40 and at most 73, more especially at least 45 and at most 73, even more especially at least 50 and at most 73, most especially at least 54 and at most 73, for example at least 60 and at most 73, for example at least 60 and at most 73, for example at least 40 and at most 72, for example at least 45 and at most 72, for example at least 50 and at most 72, for example at least 54 and at most 72, for example at least 60 and at most 72, for example at least 40 and at most 70, for example at least 45 and at most 70, for example at least 50 and at most 70, for example at least 54 and at most 70, for example at least 60 and at most 70, for example at least 62 and at most 74, for example at least 62 and at most 73, for example at least 62 and at most 72, for example at least 62 and at most 70, for example at least 64 and at most 74, for example at least 64 and at most 73, for example at least 64 and at most 72, for example at least 64 and at most 70, for example at least 68 and at most 74, for example at least 68 and at most 73, for example at least 68 and at most 72, for example at least 68 and at most 70, and a hydroxyl value (OHV$_A$) as measured titrimetrically by ISO 4629-2-2016, of at most 10, preferably at most 5 mg KOH/g, has a glass transition temperature (T$_{gB}$) as determined by DSC according to the description, of at least 40 and at most 80° C., preferably at least 50 and at most 70° C., more preferably at least 55 and at most 65° C., and has a functionality ($f_B$) of at least 2.7 and at most 6.0, preferably at least 3.5 and at most 5.0, and has a number average molecular weight ($M_{nB}$) as determined by SEC according to the description, of at least 1100 and at most 10000 Da, preferably at least 1500 and at most 8000 Da, more preferably at least 1600 and at most 7000 Da, even more preferably at least 1700 and at most 6000 Da, most preferably at least 1800 and at most 5500 Da, has a weight average molecular weight ($M_B$) as determined by SEC according to the description, of at least 3000 and at most 25000 Da, preferably at least 4000 and at most 24000 Da, more preferably at least 5000 and at most 23000 Da, even more preferably at least 6000 and at most 22000 Da, especially at least 6500 and at most 21000 Da, has a polydispersity DB ($=M_{wB}/M_{nB}$) of at least 2.5 and at most 4.0, preferably at least 2.5 and at most 3.5, and has a melt viscosity ($N_B$) as determined via rheometry according to the description, of at least 8 and at most 120, more preferably at least 10 and at most 100, even more preferably at least 12 and at most 90 Pa·s.

Broadly in accordance with the invention there is provided an one-component (1K) thermosetting powder coating composition A (PCC A) comprising:

a) a binder (B) in an amount of at least 30 and at most 100, preferably at least 40 and at most 100, more preferably at least 50 and at most 100, even more preferably at least 60 and at most 100 pph PCC A, wherein the B consists of:

i) a polyester binder (PB) in an amount of at least 90.0 and at most 98.0, preferably of at least 92.0 and at most 96.0, more preferably at least 92.5 and at most 95.0 pph B, wherein the PB consists of a polyester resin A (PRA) and a polyester resin B (PRB), and wherein the weight ratio of the weight amount of PRA to the weight amount of PRB (R=weight of PRA/weight of PRB) is at least 0.50 and at most 4.00 preferably at least 0.55 and at most 3.00, more preferably at least 0.60 and at most 2.50, even more preferably at least 0.60 and at most 2.00, most preferably at least 0.60 and at most 1.50, especially at least 0.70 and at most 1.30, more especially at least 0.80 and at most 1.25, even more especially at least 0.88 and at most 1.13, most especially at least 0.91 and at most 1.10, for example is equal to 1.0, and wherein the difference between the acid value of the PRB ($AV_B$) and the acid value of the PRA ($AV_A$) (DeltaAV=$AV_B$−$AV_A$) is at least 20 and at most 59, preferably at least 30 and at most 59, more preferably at least 40 and at most 59 mg KOH/g, and ii) a crosslinker in an amount of at least 2.0 and at most 10.0, preferably of at least 4.0 and at most 8.0, more preferably at least 5.0 and at most 7.5 pph B, wherein the crosslinker is selected from the group consisting of β-hydroxylalkyl-amides, and mixtures thereof, wherein the crosslinker is able to react with the PB, and wherein the β-hydroxylalkyl-amides are chemical compounds having the average chemical structure represented by the following Formulae 1 or 2:

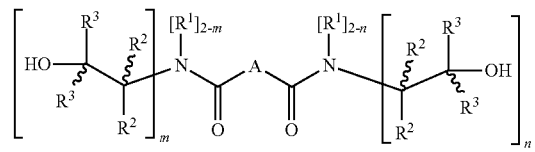

Formula 1 wherein:

n ranges from and including 1 up to and including 2, preferably equal or greater than 1.6 and lower than 2;

m ranges from and including 1 up to and including 2, preferably equal or greater than 1.6 and lower than 2;

A is a $C_{1-60}$ optionally-substituted-hydrocarbylene (preferably a $C_{1-60}$ saturated-hydrocarbylene, more preferably a $C_{1-20}$ optionally-substituted-hydrocarbylene, even more preferably a $C_{1-20}$ saturated-hydrocarbylene) linking group;

$R^1$ is hydrogen, or a $C_{1-5}$ alkyl group optionally substituted with one or more hydroxyl groups;

$R^2$ is hydrogen, or a $C_{1-5}$ alkyl group;

$R^3$ is hydrogen, or a $C_{1-5}$ alkyl group;

while one of the groups $R^2$ and one of the groups $R^3$ of the unit m, may also form—together with the adjacent carbon atoms—, a cycloalkyl group; and/or while one of the groups $R^2$ and one of the groups $R^3$ of the unit n, may also form—together with the adjacent carbon atoms—, a cycloalkyl group,

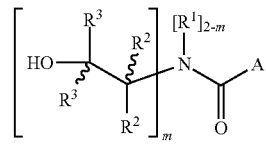

Formula 2 wherein:

m ranges from and including 1 up to and including 2, preferably equal or greater than 1.6 and lower than 2;

A is a $C_{1-60}$ optionally-substituted-hydrocarbyl (preferably a $C_{1-60}$ saturated-hydrocarbyl, more preferably a $C_{1-20}$ optionally-substituted-hydrocarbyl, even more preferably a $C_{1-20}$ saturated-hydrocarbyl);

$R^1$ is hydrogen, or a $C_{1-5}$ alkyl group optionally substituted with one or more hydroxyl groups;

$R^2$ is hydrogen, or a $C_{1-5}$ alkyl group;

$R^3$ is hydrogen, or a $C_{1-5}$ alkyl group;

while one of the groups $R^2$ and one of the groups $R^3$, may also form—together with the adjacent carbon atoms-, a cycloalkyl group, and b) a pigment in an amount of at least 0 and at most 70, preferably at least 0 and at most 60, more preferably at least 0 and at most 50, even more preferably at least 0 and at most 40 pph PCC A, and wherein the PRA is the polycondensation reaction product of at least:

a component A1 in an amount of at least 45.0 and at most 49.9, more preferably at least 46.0 and at most 49.9, even more preferably at least 47.0 and at most 49.9, especially at least 47.5 and at most 49.9, more especially at least 47.5 and at most 49.5, most especially at least 48 and at most 49.5 mol % based on PRA, wherein the component A1 consists of: i) 2,2-dimethylpropane-1,3-diol in an amount of at least 70 and at most 100, preferably at least 80 and at most 100, more preferably at least 90 and at most 100, even more preferably at least 95 and at most 100, most preferably at least 96 and at most 100, especially 100% of the total amount of moles making up the A1, and ii) a diol-A1 selected from the group consisting of $C_{2-18}$ preferably $C_{2-16}$ aliphatic saturated diols excluding the 2,2-dimethylpropane-1,3-diol, and mixtures thereof, in an amount of at least 0 and at most 30, preferably at least 0 and at most 20, more preferably at least 0 and at most 10, even more preferably at least 0 and at most 5, most preferably at least 0 and at most 4, especially is 0% of the total amount of moles making up the A1, and a component A2 in an amount of at least 48.0 and at most 55.0, preferably at least 49.0 and at most 54.0, more preferably at least 49.5 and at most 53.0, even more preferably at least 49.8 and at most 52.5, most preferably at least 49.9 and at most 52.0, especially at least 50.1 and at most 52.0 mol % based on PRA, wherein the component A2 consists of: i) a dicarboxylic-acid-A2a selected from the group consisting of terephthalic acid, esters of terephthalic acid (e.g. diesters of terephthalic acid such as dimethyl terephthalate, diethyl terephthalate, dioctyl terephthalate), isophthalic acid, esters of isophthalic acid (e.g. diesters of isophthalic acid such as dimethyl isophthalate, diethyl isophthalate, dioctyl isophthalate), and mixtures thereof, in an amount of at least 90 and at most 100% of the total amount of moles making up the A2, and ii) a dicarboxylic-acid-A2b selected from the group consisting of $C_{6-18}$ aliphatic saturated dicarboxylic acids (preferably $C_{6-12}$ aliphatic saturated dicarboxylic acids, more preferably $C_{6-10}$ aliphatic saturated dicarboxylic acids), esters of $C_{6-18}$ aliphatic saturated dicarboxylic acids (preferably esters of $C_{6-12}$ aliphatic saturated dicarboxylic acids, more preferably esters of $C_{6-10}$ aliphatic saturated dicarboxylic acids, most preferably diesters of $C_{6-18}$ aliphatic saturated dicarboxylic acids, especially diesters of $C_{6-12}$ aliphatic saturated dicarboxylic acids, more especially diesters of $C_{6-10}$ aliphatic saturated dicarboxylic acids), hexahydrophthalic anhydride, and mixtures thereof, in an amount of at least 0 and at most 10% of the total amount of moles making up the A2, and a component A3 in an amount of at least 0 and at most 2.7, preferably at least 0 and at most 2.1, more preferably at least 0 and at most 1.5, even more preferably at least 0 and at most 1, most preferably at least 0 and at most 0.5 mol % based on PRA, wherein the component A3 is selected from the group consisting of: i) an alcohol-A3 selected from the group consisting of $C_{3-10}$ aliphatic saturated alcohols having at least 3 and at most 6 hydroxyl groups, and mixtures thereof, and ii) a carboxylic-acid-anhydride-A3 selected from the group consisting of trimellitic acid anhydride, pyromellitic acid anhydride, and mixtures thereof, wherein the total amount of monomers reacted to produce the PRA is 100 mol %, and wherein the PRA is carboxylic acid functional having an acid value $(AV_A)$ as measured titrimetrically by ISO 2114-2000, of at least 15 and at most 35, preferably at least 15 and at most 33, more preferably at least 15 and at most 30, even more preferably at least 15 to 28, most preferably at least 15 to 26, for example at least 17 and at most 35, example at least 17 and at most 33, example at least 17 and at most 30, example at least 17 and at most 28, example at least 17 and at most 26, for example at least 20 and at most 35, example at least 20 and at most 33, example at least 20 and at most 30, example at least 20 and at most 28, example at least 20 and at most 26, for example at least 22 and at most 35, example at least 22 and at most 33, example at least 22 and at most 30, example at least 22 and at most 28, example at least 22 and at most 26, for example at least 23 and at most 35, example at least 23 and at most 33, example at least 23 and at most 30, example at least 23 and at most 28, example at least 23 and at most 26 mg KOH/g, and a hydroxyl value $(OHV_A)$ as measured titrimetrically by ISO 4629-2-2016, of at most 10, preferably at most 5 mg KOH/g, has a glass transition temperature $(T_{gA})$ as determined by Differential Scanning Calorimetry (DSC) according to the description, of at least 40 and at most 75° C., and has a functionality $(f_A)$ of at least 2.0 and at most 3.5, preferably at least 2.0 and at most 2.5, and has a number average molecular weight $(M_{nA})$ as determined by Size Exclusion Chromatography (SEC) according to the description, of at least 1100 and at most 10000 Da, preferably at least 2000 and at most 9000 Da, more preferably at least 2500 and at most 8000 Da, even more preferably at least 3000 and at most 7000 Da, has a weight average molecular weight $(M_A)$ as determined by SEC according to the description, of at least 2200 and at most 20000 Da, preferably at least 4000 and at most 18000 Da, more preferably at least 5000 and at most 18000 Da, even more preferably at least 6000 and at most 18000 Da, has a polydispersity $D_A (=M_{wA}/M_{nA})$ of at least 2.0 and at most 4.0, preferably at least 2.0 and at most 3.5, more preferably at least 2.0 and at most 3.0, and has a melt viscosity $(N_A)$ as determined via rheometry according to the description, of at least 15 and at most 150, preferably at least 20 and at most 130, more preferably at least 25 and at most 120 Pa·s, and wherein the PRB is the polycondensation reaction product of at least:

a component B1 in an amount of at least 42 and at most 49.9, preferably at least 45.0 and at most 49.5, more preferably at least 47.0 and at most 49.0 mol % based on PRB, wherein the component B1 consists of: i) a diol-B1a selected from the group consisting of ethylene glycol, 1,2-propane diol, 1,3-propane diol, and mixtures thereof, in an amount of at least 50 and at most 90, preferably at least 57 and at most 88, more preferably at least 64 and at most 83% of the total amount of moles making up the B1, and ii) a diol-B1b selected from the group consisting of $C_{4-18}$ preferably $C_{4-16}$ aliphatic saturated diols and mixtures thereof, in an amount of at least 10 and at most 50, preferably at least 12 and at most 43, more preferably at least 17 and at most 36% of the total amount of moles making up the B1, and a component B2, in an amount of at least 42 and at most 55, preferably at least 43 and at most 52, more preferably at least 44 and at most 48 mol % on PRB, wherein the component B2 consists of: i) a dicarboxylic-acid-B2a selected from the group consisting of terephthalic acid, esters of terephthalic acid (e.g. diesters of terephthalic acid such as dimethyl terephthalate, diethyl terephthalate, dioctyl terephthalate), isophthalic acid, esters of isophthalic acid (e.g. diesters of isophthalic acid such as dimethyl isophthalate, diethyl isophthalate, dioctyl isophthalate), and mixtures thereof, in an amount of at least 80 and at most 100, more preferably at least 90 and at most 100% of the total amount of moles making up the B2, and ii) a dicarboxylic-acid-B2b selected from the group consisting of $C_{6-13}$ aliphatic saturated dicarboxylic acids (preferably $C_{6-12}$ aliphatic saturated dicarboxylic acids, more preferably $C_{6-10}$ aliphatic saturated dicarboxylic acids), esters of $C_{6-13}$ aliphatic saturated dicarboxylic acids (preferably esters of $C_{6-12}$ aliphatic saturated dicarboxylic acids, more preferably esters of $C_{6-10}$ aliphatic saturated dicarboxylic acids, most preferably diesters of $C_{6-13}$ aliphatic saturated dicarboxylic acids, especially diesters of $C_{6-12}$ aliphatic saturated dicarboxylic acids, more especially diesters of $C_{6-10}$ aliphatic saturated dicarboxylic acids), hexahydrophthalic anhydride, and mixtures thereof, in an amount of at least 0 and at most 20, more preferably at least 0 and at most 10% of the total amount of moles making up the B2, and a component B3 in an amount of at least 0.5 and at most 8.5, preferably at least 0.7 and at most 8.0, more preferably at least 1.0 and at most 8.0, even more preferably at least 2.0 and at most 8.0, most preferably at least 3.0 and at most 8.0, especially at least 4.0 and at most 8.0, more especially at least 5.0 and at most 8.0, even more especially at least 5.5 and at most 7.0, most especially at least 3.0 and at most 7.0 mol % on PRB, wherein the component B3 is selected from the group consisting of: i) an alcohol-B3 selected from the group consisting of $C_{3-10}$ aliphatic saturated alcohols having at least 3 and at most 6 hydroxyl groups, and mixtures thereof, and ii) a carboxylic-acid-anhydride-B3 selected from the group consisting of trimellitic acid anhydride, pyromellitic acid anhydride, and mixtures thereof, and wherein the total amount of monomers reacted to produce the PRB is 100 mol %, and wherein the PRB is a branched carboxylic acid functional having an acid value ($AV_B$) as measured titrimetrically by ISO 2114-2000, of at least 40 and at most 74, preferably at least 45 and at most 74, more preferably at least 50 and at most 74, even more preferably at least 54 and at most 74, most preferably at least 60 and at most 74, especially at least 40 and at most 73, more especially at least 45 and at most 73, even more especially at least 50 and at most 73, most especially at least 54 and at most 73, for example at least 60 and at most 73, for example at least 60 and at most 73, for example at least 40 and at most 72, for example at least 45 and at most 72, for example at least 50 and at most 72, for example at least 54 and at most 72, for example at least 60 and at most 72, for example at least 40 and at most 70, for example at least 45 and at most 70, for example at least 50 and at most 70, for example at least 54 and at most 70, for example at least 60 and at most 70, for example at least 62 and at most 74, for example at least 62 and at most 73, for example at least 62 and at most 72, for example at least 62 and at most 70, for example at least 64 and at most 74, for example at least 64 and at most 73, for example at least 64 and at most 72, for example at least 64 and at most 70, for example at least 68 and at most 74, for example at least 68 and at most 73, for example at least 68 and at most 72, for example at least 68 and at most 70, and a hydroxyl value ($OHV_A$) as measured titrimetrically by ISO 4629-2-2016, of at most 10, preferably at most 5 mg KOH/g, has a glass transition temperature ($T_{gB}$) as determined by DSC according to the description, of at least 40 and at most 80° C., preferably at least 50 and at most 70° C., more preferably at least 55 and at most 65° C., and has a functionality ($f_B$) of at least 2.7 and at most 6.0, preferably at least 3.5 and at most 5.0, and has a number average molecular weight ($M_{nB}$) as determined by SEC according to the description, of at least 1100 and at most 10000 Da, preferably at least 1500 and at most 8000 Da, more preferably at least 1600 and at most 7000 Da, even more preferably at least 1700 and at most 6000 Da, most preferably at least 1800 and at most 5500 Da, has a weight average molecular weight ($M_B$) as determined by SEC according to the description, of at least 3000 and at most 25000 Da, preferably at least 4000 and at most 24000 Da, more preferably at least 5000 and at most 23000 Da, even more preferably at least 6000 and at most 22000 Da, especially at least 6500 and at most 21000 Da, has a polydispersity DB ($=M_{wB}/M_{nB}$) of at least 2.5 and at most 4.0, preferably at least 2.5 and at most 3.5, and has a melt viscosity ($N_B$) as determined via rheometry according to the description, of at least 8 and at most 120, more preferably at least 10 and at most 100, even more preferably at least 12 and at most 90 Pa·s.

Broadly in accordance with the invention there is provided an one-component (1K) thermosetting powder coating composition A (PCC A) comprising:

a) a binder (B) in an amount of at least 30 and at most 100, preferably at least 40 and at most 100, more preferably at least 50 and at most 100, even more preferably at least 60 and at most 100 pph PCC A, wherein the B consists of:

i) a polyester binder (PB) in an amount of at least 90.0 and at most 98.0, preferably of at least 92.0 and at most 96.0, more preferably at least 92.5 and at most 95.0 pph B, wherein the PB consists of a polyester resin A (PRA) and a polyester resin B (PRB), and wherein the weight ratio of the weight amount of PRA to the weight amount of PRB (R=weight of PRA/weight of PRB) is at least 0.50 and at most 4.00 preferably at least 0.55 and at most 3.00, more preferably at least 0.60 and at most 2.50, even more preferably at least 0.60 and at most 2.00, most preferably at least 0.60 and at most 1.50, especially at least 0.70 and at most 1.30, more especially at least 0.80 and at most 1.25, even more especially at least 0.88 and at most 1.13, most especially at least 0.91 and at most 1.10, for example is equal to 1.0, and wherein the difference between the acid value of the PRB ($AV_B$) and the acid value of the PRA ($AV_A$) (DeltaAV=$AV_B$-$AV_A$) is at least 20 and at most 59, preferably at least 30 and at most 59, more preferably at least 40 and at most 59 mg KOH/g, and ii) a crosslinker in an amount of at least 2.0 and at most 10.0, preferably of at least 4.0 and at most 8.0, more preferably at least 5.0 and at most 7.5 pph B, wherein the crosslinker is selected from the group consisting of β-hydroxylalkyl-amides, and mixtures thereof, wherein the crosslinker is able to react with the PB, and wherein the β-hydroxylalkyl-amides are chemical compounds having the average chemical structure represented by the following Formula 3:

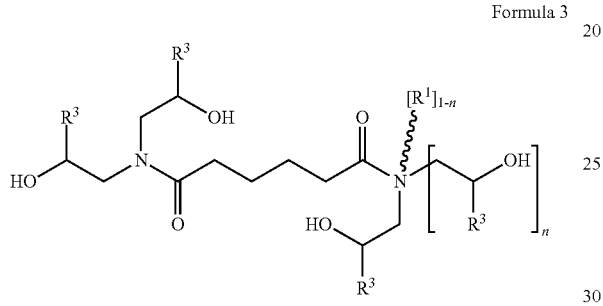

Formula 3 wherein n ranges from and including 0.2 up to and including 1

$R^1$ is hydrogen, or a $C_{1-5}$ alkyl group;

$R^3$ is hydrogen, or a $C_{1-5}$ alkyl group (preferably $R^3$ is hydrogen or a methyl group).

and b) a pigment in an amount of at least 0 and at most 70, preferably at least 0 and at most 60, more preferably at least 0 and at most 50, even more preferably at least 0 and at most 40 pph PCC A, and wherein the PRA is the polycondensation reaction product of at least:

a component A1 in an amount of at least 45.0 and at most 49.9, more preferably at least 46.0 and at most 49.9, even more preferably at least 47.0 and at most 49.9, especially at least 47.5 and at most 49.9, more especially at least 47.5 and at most 49.5, most especially at least 48 and at most 49.5 mol % based on PRA, wherein the component A1 consists of: i) 2,2-dimethylpropane-1,3-diol in an amount of at least 70 and at most 100, preferably at least 80 and at most 100, more preferably at least 90 and at most 100, even more preferably at least 95 and at most 100, most preferably at least 96 and at most 100, especially 100% of the total amount of moles making up the A1, and ii) a diol-A1 selected from the group consisting of $C_{2-18}$ preferably $C_{2-16}$ aliphatic saturated diols excluding the 2,2-dimethylpropane-1,3-diol, and mixtures thereof, in an amount of at least 0 and at most 30, preferably at least 0 and at most 20, more preferably at least 0 and at most 10, even more preferably at least 0 and at most 5, most preferably at least 0 and at most 4, especially is 0% of the total amount of moles making up the A1, and a component A2 in an amount of at least 48.0 and at most 55.0, preferably at least 49.0 and at most 54.0, more preferably at least 49.5 and at most 53.0, even more preferably at least 49.8 and at most 52.5, most preferably at least 49.9 and at most 52.0, especially at least 50.1 and at most 52.0 mol % based on PRA, wherein the component A2 consists of: i) a dicarboxylic-acid-A2a selected from the group consisting of terephthalic acid, esters of terephthalic acid (e.g. diesters of terephthalic acid such as dimethyl terephthalate, diethyl terephthalate, dioctyl terephthalate), isophthalic acid, esters of isophthalic acid (e.g. diesters of isophthalic acid such as dimethyl isophthalate, diethyl isophthalate, dioctyl isophthalate), and mixtures thereof, in an amount of at least 90 and at most 100% of the total amount of moles making up the A2, and ii) a dicarboxylic-acid-A2b selected from the group consisting of $C_{6-18}$ aliphatic saturated dicarboxylic acids (preferably $C_{6-12}$ aliphatic saturated dicarboxylic acids, more preferably $C_{6-10}$ aliphatic saturated dicarboxylic acids), esters of $C_{6-18}$ aliphatic saturated dicarboxylic acids (preferably esters of $C_{6-12}$ aliphatic saturated dicarboxylic acids, more preferably esters of $C_{6-10}$ aliphatic saturated dicarboxylic acids, most preferably diesters of $C_{6-18}$ aliphatic saturated dicarboxylic acids, especially diesters of $C_{6-12}$ aliphatic saturated dicarboxylic acids, more especially diesters of $C_{6-10}$ aliphatic saturated dicarboxylic acids), hexahydrophthalic anhydride, and mixtures thereof, in an amount of at least 0 and at most 10% of the total amount of moles making up the A2, and a component A3 in an amount of at least 0 and at most 2.7, preferably at least 0 and at most 2.1, more preferably at least 0 and at most 1.5, even more preferably at least 0 and at most 1, most preferably at least 0 and at most 0.5 mol % based on PRA, wherein the component A3 is selected from the group consisting of: i) an alcohol-A3 selected from the group consisting of $C_{3-10}$ aliphatic saturated alcohols having at least 3 and at most 6 hydroxyl groups, and mixtures thereof, and ii) a carboxylic-acid-anhydride-A3 selected from the group consisting of trimellitic acid anhydride, pyromellitic acid anhydride, and mixtures thereof, wherein the total amount of monomers reacted to produce the PRA is 100 mol %, and wherein the PRA is carboxylic acid functional having an acid value ($AV_A$) as measured titrimetrically by ISO 2114-2000, of at least 15 and at most 35, preferably at least 15 and at most 33, more preferably at least 15 and at most 30, even more preferably at least 15 to 28, most preferably at least 15 to 26, for example at least 17 and at most 35, example at least 17 and at most 33, example at least 17 and at most 30, example at least 17 and at most 28, example at least 17 and at most 26, for example at least 20 and at most 35, example at least 20 and at most 33, example at least 20 and at most 30, example at least 20 and at most 28, example at least 20 and at most 26, for example at least 22 and at most 35, example at least 22 and at most 33, example at least 22 and at most 30, example at least 22 and at most 28, example at least 22 and at most 26, for example at least 23 and at most 35, example at least 23 and at most 33, example at least 23 and at most 30, example at least 23 and at most 28, example at least 23 and at most 26 mg KOH/g, and a hydroxyl value ($OHV_A$) as measured titrimetrically by ISO 4629-2-2016, of at most 10, preferably at most 5 mg KOH/g, has a glass transition temperature ($T_gA$) as determined by Differential Scanning Calorimetry (DSC) according to the description, of at least 40 and at most 75° C., and has a functionality ($f_A$) of at least 2.0 and at most 3.5, preferably at least 2.0 and at most 2.5, and has a number average molecular weight ($M_{nA}$) as determined by Size Exclusion Chromatography (SEC) according to the description, of at least 1100 and at most 10000 Da, preferably at least 2000 and at most 9000 Da, more preferably at least 2500 and at most 8000 Da, even more preferably at least 3000 and at most 7000 Da, has a weight average molecular weight ($M_A$) as determined by SEC according to the description, of at least 2200 and at most 20000 Da, preferably at least 4000 and at most 18000 Da, more preferably at least 5000 and at most 18000 Da, even more preferably at least 6000 and at most 18000 Da, has a polydispersity $D_A$ ($=M_{wA}/M_{nA}$) of at least 2.0 and at most 4.0, preferably at least 2.0 and at most 3.5, more preferably at least 2.0 and at most 3.0, and has a melt viscosity ($N_A$) as determined via rheometry according to the description, of at least 15 and at most 150, preferably at least 20 and at most 130, more preferably at least 25 and at most 120 Pa·s, and wherein the PRB is the polycondensation reaction product of at least:

a component B1 in an amount of at least 42 and at most 49.9, preferably at least 45.0 and at most 49.5, more preferably at least 47.0 and at most 49.0 mol % based on PRB, wherein the component B1 consists of: i) a diol-B1a selected from the group consisting of ethylene glycol, 1,2-propane diol, 1,3-propane diol, and mixtures thereof, in an amount of at least 50 and at most 90, preferably at least 57 and at most 88, more preferably at least 64 and at most 83% of the total amount of moles making up the B1, and ii) a diol-B1b selected from the group consisting of $C_{4-18}$ preferably $C_{4-16}$ aliphatic saturated diols and mixtures thereof, in an amount of at least 10 and at most 50, preferably at least 12 and at most 43, more preferably at least 17 and at most 36% of the total amount of moles making up the B1, and a component B2, in an amount of at least 42 and at most 55, preferably at least 43 and at most 52, more preferably at least 44 and at most 48 mol % on PRB, wherein the component B2 consists of: i) a dicarboxylic-acid-B2a selected from the group consisting of terephthalic acid, esters of terephthalic acid (e.g. diesters of terephthalic acid such as dimethyl terephthalate, diethyl terephthalate, dioctyl terephthalate), isophthalic acid, esters of isophthalic acid (e.g. diesters of isophthalic acid such as dimethyl isophthalate, diethyl isophthalate, dioctyl isophthalate), and mixtures thereof, in an amount of at least 80 and at most 100, more preferably at least 90 and at most 100% of the total amount of moles making up the B2, and ii) a dicarboxylic-acid-B2b selected from the group consisting of $C_{6-13}$ aliphatic saturated dicarboxylic acids (preferably $C_{6-12}$ aliphatic saturated dicarboxylic acids, more preferably $C_{6-10}$ aliphatic saturated dicarboxylic acids), esters of $C_{6-13}$ aliphatic saturated dicarboxylic acids (preferably esters of $C_{6-12}$ aliphatic saturated dicarboxylic acids, more preferably esters of $C_{6-10}$ aliphatic saturated dicarboxylic acids, most preferably diesters of $C_{6-13}$ aliphatic saturated dicarboxylic acids, especially diesters of $C_{6-12}$ aliphatic saturated dicarboxylic acids, more especially diesters of $C_{6-10}$ aliphatic saturated dicarboxylic acids), hexahydrophthalic anhydride, and mixtures thereof, in an amount of at least 0 and at most 20, more preferably at least 0 and at most 10% of the total amount of moles making up the B2, and a component B3 in an amount of at least 0.5 and at most 8.5, preferably at least 0.7 and at most 8.0, more preferably at least 1.0 and at most 8.0, even more preferably at least 2.0 and at most 8.0, most preferably at least 3.0 and at most 8.0, especially at least 4.0 and at most 8.0, more especially at least 5.0 and at most 8.0, even more especially at least 5.5 and at most 7.0, most especially at least 3.0 and at most 7.0 mol % on PRB, wherein the component B3 is selected from the group consisting of: i) an alcohol-B3 selected from the group consisting of $C_{3-10}$ aliphatic saturated alcohols having at least 3 and at most 6 hydroxyl groups, and mixtures thereof, and ii) a carboxylic-acid-anhydride-B3 selected from the group consisting of trimellitic acid anhydride, pyromellitic acid anhydride, and mixtures thereof, and wherein the total amount of monomers reacted to produce the PRB is 100 mol %, and wherein the PRB is a branched carboxylic acid functional having an acid value ($AV_B$) as measured titrimetrically by ISO 2114-2000, of at least 40 and at most 74, preferably at least 45 and at most 74, more preferably at least 50 and at most 74, even more preferably at least 54 and at most 74, most preferably at least 60 and at most 74, especially at least 40 and at most 73, more especially at least 45 and at most 73, even more especially at least 50 and at most 73, most especially at least 54 and at most 73, for example at least 60 and at most 73, for example at least 60 and at most 73, for example at least 40 and at most 72, for example at least 45 and at most 72, for example at least 50 and at most 72, for example at least 54 and at most 72, for example at least 60 and at most 72, for example at least 40 and at most 70, for example at least 45 and at most 70, for example at least 50 and at most 70, for example at least 54 and at most 70, for example at least 60 and at most 70, for example at least 62 and at most 74, for example at least 62 and at most 73, for example at least 62 and at most 72, for example at least 62 and at most 70, for example at least 64 and at most 74, for example at least 64 and at most 73, for example at least 64 and at most 72, for example at least 64 and at most 70, for example at least 68 and at most 74, for example at least 68 and at most 73, for example at least 68 and at most 72, for example at least 68 and at most 70, and a hydroxyl value ($OHV_A$) as measured titrimetrically by ISO 4629-2-2016, of at most 10, preferably at most 5 mg KOH/g, has a glass transition temperature ($T_{gB}$) as determined by DSC according to the description, of at least 40 and at most 80° C., preferably at least 50 and at most 70° C., more preferably at least 55 and at most 65° C., and has a functionality ($f_B$) of at least 2.7 and at most 6.0, preferably at least 3.5 and at most 5.0, and has a number average molecular weight ($M_{nB}$) as determined by SEC according to the description, of at least 1100 and at most 10000 Da, preferably at least 1500 and at most 8000 Da, more preferably at least 1600 and at most 7000 Da, even more preferably at least 1700 and at most 6000 Da, most preferably at least 1800 and at most 5500 Da, has a weight average molecular weight ($M_B$) as determined by SEC according to the description, of at least 3000 and at most 25000 Da, preferably at least 4000 and at most 24000 Da, more preferably at least 5000 and at most 23000 Da, even more preferably at least 6000 and at most 22000 Da, especially at least 6500 and at most 21000 Da, has a polydispersity DB (=$M_{wB}/M_{nB}$) of at least 2.5 and at most 4.0, preferably at least 2.5 and at most 3.5, and has a melt viscosity ($N_B$) as determined via rheometry according to the description, of at least 8 and at most 120, more preferably at least 10 and at most 100, even more preferably at least 12 and at most 90 Pa·s.

Preferably, the PCC A is a heat-curable thermosetting powder coating composition.

The PCC A is solid at room temperature and at atmospheric pressure.

The PCC A is substantially dry. Preferably the PCC A is substantially dry, and solid at room temperature and at atmospheric pressure.

The PCC A may be amorphous or crystalline; preferably the PCC A is amorphous.

The glass transition temperature ($T_g$) of the PCC A ($T_g$ PCC A) is preferably at least 23, more preferably at least 25, even more preferably at least 35, most preferably at least 40, especially at least 45° C. The glass transition temperature ($T_g$) of the PCC A ($T_{g\ PCC\ A}$) is preferably at most 100° C., more preferably at most 90° C., even more preferably at most 85° C., most preferably at the most 80° C. Preferably the $T_g$ PCC A is at least 23 and at most 90, more preferably at least 30 and at most 85, even more preferably at least 40 and at most 80° C.

The PCC A comprises:
a. a binder (B) as described in the claims and as disclosed herein, and
b. optionally a pigment as described in the claims and as disclosed herein.

The pigment may be present in an amount of at least 0 and at most 70, preferably at least 0 and at most 60, more preferably at least 0 and at most 50, even more preferably at least 0 and at most 40 pph PCC A.

If a pigment is present in the PCC A, then preferably the pigment is present in an amount of at least 1 and at most 70, more preferably at least 1 and at most 60, even more preferably at least 1 and at most 50, most preferably at least 1 and at most 40 pph PCC A. The pigment may be one or a combination of white pigment, color pigment, inert pigment, and functional pigment, as each of them are described herein.

Pigments are insoluble fine particle size materials used in coatings such as powder coatings, to provide color, to hide substrates, and/or to reduce cost. Pigments are insoluble materials used as colloidal dispersions. The pigments are typically offered as a dry powder of aggregates.

Pigments are divided into four broad classes: white, color, inert and functional pigments. Consequently, the pigment may be selected from the group consisting of white pigments, color pigments, inert pigments, functional pigments, and mixtures thereof.

White pigments include but are not limited to $TiO_2$ (titanium dioxide), white lead [basic lead carbonate $2PbCO_3 \cdot Pb(OH)_2$], zinc oxide (ZnO), zinc sulfide (ZnS), lithopone ($ZnS/BaSO_4$). The $TiO_2$ is one of the most important pigments used in powder coatings, and it comes in two different crystal types: rutile and anatase. A variety of $TiO_2$ pigments is offered by each $TiO_2$ manufacturer. Suitable examples of commercially available $TiO_2$ (titanium dioxide) suitable as white pigments for thermosetting powder coating compositions are available commercially from Kronos Titan GmbH under certain trade names using the registered trademark Kronos® such as Kronos® 2360 (which is a typical white pigment widely used in powder coatings), Kronos®2310, Kronos®2300, Kronos®2190, Kronos®2160, Kronos®2066, Kronos®2064, Kronos®2056, Kronos® 2047, Kronos® 2044, Kronos® 2043, Kronos® 4045, Kronos® 4311.

Color pigments include but are not limited to:
i) (inorganic and organic) yellow and orange pigments, such as iron oxide yellows [FeO(OH)] that are low chroma brownish-yellow pigments, chrome yellow pigments, medium chrome yellow pigments such as lead chromate ($PbCrO_4$), redder yellows (cocrystals of lead chromate with PbO), primrose yellow and lemon yellows (cocrystals of lead chromate with lead sulfate), molybdate oranges [cocrystals of lead chromate with lead molybdate ($PbMoO_4$) and lead sulfate], titanium yellows, organic oranges and yellows e.g. diarylide yellows (bisazo pigments derived from 3,3'-dichlorobenzidene (PY 13), monoarylide (monoazo) yellow pigments such as PY 74, nickel azo yellow (PG 10), vat yellow pigments e.g. isoindoline yellow PY139, benzimidazolone orange pigments e.g. P036, and
ii) (inorganic and organic) red pigments e.g. $Fe_2O_3$, tolouidine red pigment, PR3 bright red azo pigment (azo derivative of β-naphthol), permanent Red 2B red azo pigment (available as the calcium, barium or manganese salt), naphthol reds (azo pigments with various ring substituents (Cl, —$OCH_3$, $NO_2$), quinacridone pigments,
iii) (inorganic and organic) blue and green pigments, e.g. iron blue, ferric ammonium ferrocyanide [$FeNH_4Fe(CN)_6$], copper phthalocyanine (CPC) pigments (known also as phthalo blue and phthalo green), and
iv) black pigments e.g. carbon blacks, metallic pigments such as aluminum flake pigments, bronze flake pigments, nickel flake pigments, stainless steel flake pigments, interference pigments which are flake pigments that lead to color by interference e.g. pearlescent pigments platelets of mica having thin surface treatment layers of $TiO_2$ or $Fe_2O_3$.

Inert pigments known also as inerts, fillers, or extenders, are typically inexpensive and are used to reduce the cost of a coating. Inert pigments include but are not limited to synthetic calcium carbonate ($CaCO_3$), calcium carbonate derived from ground limestone or dolomite, clays (aluminum silicates), magnesium silicate minerals, silicon dioxide, barytes (barium sulfate).

Functional pigments include but are not limited to complex zinc chromate pigments, red lead, zinc phosphate, zinc oxide, cuprous oxide, organotin pigments, antimony oxide.

The binder (B) consists of:
i) a polyester binder (PB) as described in the claims and as disclosed herein, and
ii) a crosslinker as described in the claims and as disclosed herein, that is able to react with the PB.

The polyester binder (PB) consists of:
i) polyester resin A (PRA) which is a carboxylic acid functional and as described in the claims and as disclosed herein, and
ii) polyester resin B (PRB) which is a carboxylic acid functional and as described in the claims and as disclosed herein.

The weight ratio of the weight amount of PRA to the weight amount of PRB (R=weight of PRA/weight of PRB) is at least 0.50 and at most 4.00, preferably at least 0.55 and at most 3.00, more preferably at least 0.60 and at most 2.50, even more preferably at least 0.60 and at most 2.00, most preferably at least 0.60 and at most 1.50, especially at least 0.70 and at most 1.30, more especially at least 0.80 and at most 1.25, even more especially at least 0.88 and at most 1.13, most especially at least 0.91 and at most 1.10, for example is equal to 1.0.

The PRA is the polycondensation reaction product of at least:
- a component A1 as described in the claims and as disclosed herein, and
- a component A2 as described in the claims and as disclosed herein, and
- a component A3 as described in the claims and as disclosed herein.

The PRB is the polycondensation reaction product of at least:
- a component B1 as described in the claims and as disclosed herein, and
- a component B2 as described in the claims and as disclosed herein, and
- a component B3 as described in the claims and as disclosed herein.

The component A1 consists of: i) 2,2-dimethylpropane-1,3-diol as described in the claims and as disclosed herein, and ii) a diol-A1 as described in the claims and as disclosed herein.

The component A2 consists of: i) a dicarboxylic-acid-A2a as described in the claims and as disclosed herein, and ii) a dicarboxylic-acid-A2b as described in the claims and as disclosed herein.

The component A3 consists of: i) an alcohol-A3 as described in the claims and as disclosed herein, and ii) a carboxylic-acid-anhydride-A3 as described in the claims and as disclosed herein.

The component B1 consists of: i) a diol-B1a as described in the claims and as disclosed herein, and ii) a diol-B1b as described in the claims and as disclosed herein.

The component B2 consists of: i) a dicarboxylic-acid-B2a as described in the claims and as disclosed herein, and ii) a dicarboxylic-acid-B2b as described in the claims and as disclosed herein.

The component B3 consists of: i) an alcohol-B3 as described in the claims and as disclosed herein, and ii) a carboxylic-acid-anhydride-B3 as described in the claims and as disclosed herein.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this section 1—and its subsections-, can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1. 1 The Binder (B) of the PCC A

The PCC A comprises:
a. a binder (B) in an amount of at least 30 and at most 100, preferably at least 40 and at most 100, more preferably at least 50 and at most 100, even more preferably at least 60 and at most 100 pph PCC A, and
b. optionally a pigment as described herein.

The binder (B) consists of:
i) a polyester binder (PB) in an amount of at least 90.0 and at most 98.0, preferably of at least 92.0 and at most 96.0, more preferably at least 92.5 and at most 95.0 pph B, wherein the PB consists of a polyester resin A (PRA) and a polyester resin B (PRB), and wherein the weight ratio of the weight amount of PRA to the weight amount of PRB (R=weight of PRA/weight of PRB) is at least 0.50 and at most 4.00 preferably at least 0.55 and at most 3.00, more preferably at least 0.60 and at most 2.50, even more preferably at least 0.60 and at most 2.00, most preferably at least 0.60 and at most 1.50, especially at least 0.70 and at most 1.30, more especially at least 0.80 and at most 1.25, even more especially at least 0.88 and at most 1.13, most especially at least 0.91 and at most 1.10, for example is equal to 1.0, and wherein the difference between the acid value of the PRB ($AV_B$) and the acid value of the PRA ($AV_A$) (DeltaAV=$AV_B$-$AV_A$) is at least 20 and at most 59, preferably at least 30 and at most 59, more preferably at least 40 and at most 59 mg KOH/g, and
ii) a crosslinker in an amount of at least 2.0 and at most 10.0, preferably of at least 4.0 and at most 8.0, more preferably at least 5.0 and at most 7.5 pph B, wherein the crosslinker is selected from the group consisting of β-hydroxylalkyl-amides—as these are described herein-, and mixtures thereof, wherein the crosslinker is able to react with the PB.

The B is solid at room temperature and at atmospheric pressure. The B is substantially dry. Preferably the B is substantially dry, and solid at room temperature and at atmospheric pressure.

The B may be amorphous or crystalline; preferably the B is amorphous.

The glass transition temperature ($T_g$) of the B ($T_{g\ B}$) is preferably at least 23, more preferably at least 25, even more preferably at least 35, most preferably at least 40, especially at least 45° C. The glass transition temperature ($T_g$) of the B ($T_{g\ B}$) is preferably at most 100° C., more preferably at most 90° C., even more preferably at most 85° C. most preferably at the most 80° C. Preferably the $T_g$ B is at least 23 and at most 90, more preferably at least 30 and at most 85, even more preferably at least 40 and at most 80° C.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this sub-section 1.1 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.1.1 The Polyester Binder (PB) of the PCC A

The polyester binder (PB) consists of a polyester resin A (PRA) and a polyester resin B (PRB), and wherein the weight ratio of the weight amount of PRA to the weight amount of PRB (R=weight of PRA/weight of PRB) is at least 0.50 and at most 4.00 preferably at least 0.55 and at most 3.00, more preferably at least 0.60 and at most 2.50, even more preferably at least 0.60 and at most 2.00, most preferably at least 0.60 and at most 1.50, especially at least 0.70 and at most 1.30, more especially at least 0.80 and at most 1.25, even more especially at least 0.88 and at most 1.13, most especially at least 0.91 and at most 1.10, for example is equal to 1.0, and wherein the difference between the acid value of the PRB ($AV_B$) and the acid value of the PRA ($AV_A$) (DeltaAV=$AV_B$-$AV_A$) is at least 20 and at most 59, preferably at least 30 and at most 59, more preferably at least 40 and at most 59 mg KOH/g, The PB is solid at room temperature and at atmospheric pressure. The PB is substantially dry. Preferably the PB is substantially dry, and solid at room temperature and at atmospheric pressure.

The PB may be amorphous or crystalline; preferably the PB is amorphous.

The glass transition temperature ($T_g$) of the PB ($T_g$ PB) is preferably at least 23, more preferably at least 25, even more preferably at least 35, most preferably at least 40, especially at least 45° C. The glass transition temperature ($T_g$) of the PB ($T_{g\,pB}$) is preferably at most 100° C., more preferably at most 90° C., even more preferably at most 85° C. most preferably at the most 80° C. Preferably the $T_{g\,PB}$ is at least 23 and at most 90, more preferably at least 30 and at most 85, even more preferably at least 40 and at most 80° C.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this sub-section 1.1.1 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.1.1.1 the Polyester Resin a (PRA) of the PCC A

In the context of the invention, the polyester resin A as disclosed herein is abbreviated as PRA. The term 'PRA' as used herein includes any and all of its preferments, combinations of its features and ranges as well as combinations of any and all of its preferments with any and all of the combinations of its features and ranges. Thus, any and all of the PRA disclosed in this sub-section, includes any and all of their preferments, combinations of their features and ranges as well as combinations of any and all of their preferments with any and all of the combinations of their features and ranges, are collectively referred to—in the whole of the application—as the PRA.

The PRA is the polycondensation reaction product of at least:
- a component A1 in an amount of at least 45.0 and at most 49.9, more preferably at least 46.0 and at most 49.9, even more preferably at least 47.0 and at most 49.9, especially at least 47.5 and at most 49.9, more especially at least 47.5 and at most 49.5, most especially at least 48 and at most 49.5 mol % based on PRA, wherein the component A1 consists of: i) 2,2-dimethylpropane-1,3-diol in an amount of at least 70 and at most 100, preferably at least 80 and at most 100, more preferably at least 90 and at most 100, even more preferably at least 95 and at most 100, most preferably at least 96 and at most 100, especially 100% of the total amount of moles making up the A1, and ii) a diol-A1 selected from the group consisting of $C_{2-18}$ preferably $C_{2-16}$ aliphatic saturated diols excluding the 2,2-dimethylpropane-1,3-diol, and mixtures thereof, in an amount of at least 0 and at most 30, preferably at least 0 and at most 20, more preferably at least 0 and at most 10, even more preferably at least 0 and at most 5, most preferably at least 0 and at most 4, especially is 0% of the total amount of moles making up the A1, and a component A2 in an amount of at least 48.0 and at most 55.0, preferably at least 49.0 and at most 54.0, more preferably at least 49.5 and at most 53.0, even more preferably at least 49.8 and at most 52.5, most preferably at least 49.9 and at most 52.0, especially at least 50.1 and at most 52.0 mol % based on PRA, wherein the component A2 consists of: i) a dicarboxylic-acid-A2a selected from the group consisting of terephthalic acid, esters of terephthalic acid (e.g. diesters of terephthalic acid such as dimethyl terephthalate, diethyl terephthalate, dioctyl terephthalate), isophthalic acid, esters of isophthalic acid (e.g. diesters of isophthalic acid such as dimethyl isophthalate, diethyl isophthalate, dioctyl isophthalate), and mixtures thereof, in an amount of at least 90 and at most 100% of the total amount of moles making up the A2, and ii) a dicarboxylic-acid-A2b selected from the group consisting of $C_{6-18}$ aliphatic saturated dicarboxylic acids (preferably $C_{6-12}$ aliphatic saturated dicarboxylic acids, more preferably $C_{6-10}$ aliphatic saturated dicarboxylic acids), esters of $C_{6-18}$ aliphatic saturated dicarboxylic acids (preferably esters of $C_{6-12}$ aliphatic saturated dicarboxylic acids, more preferably esters of $C_{6-10}$ aliphatic saturated dicarboxylic acids, most preferably diesters of $C_{6-18}$ aliphatic saturated dicarboxylic acids, especially diesters of $C_{6-12}$ aliphatic saturated dicarboxylic acids, more especially diesters of $C_{6-10}$ aliphatic saturated dicarboxylic acids), hexahydrophthalic anhydride, and mixtures thereof, in an amount of at least 0 and at most 10% of the total amount of moles making up the A2, and a component A3 in an amount of at least 0 and at most 2.7, preferably at least 0 and at most 2.1, more preferably at least 0 and at most 1.5, even more preferably at least 0 and at most 1, most preferably at least 0 and at most 0.5 mol % based on PRA, wherein the component A3 is selected from the group consisting of: i) an alcohol-A3 selected from the group consisting of $C_{3-10}$ aliphatic saturated alcohols having at least 3 and at most 6 hydroxyl groups, and mixtures thereof, and ii) a carboxylic-acid-anhydride-A3 selected from the group consisting of trimellitic acid anhydride, pyromellitic acid anhydride, and mixtures thereof, wherein the total amount of monomers reacted to produce the PRA is 100 mol %, and wherein the PRA is carboxylic acid functional having an acid value ($AV_A$) as measured titrimetrically by ISO 2114-2000, of at least 15 and at most 35, preferably at least 15 and at most 33, more preferably at least 15 and at most 30, even more preferably at least 15 to 28, most preferably at least 15 to 26, for example at least 17 and at most 35, example at least 17 and at most 33, example at least 17 and at most 30, example at least 17 and at most 28, example at least 17 and at most 26, for example at least 20 and at most 35, example at least 20 and at most 33, example at least 20 and at most 30, example at least 20 and at most 28, example at least 20 and at most 26, for example at least 22 and at most 35, example at least 22 and at most 33, example at least 22 and at most 30, example at least 22 and at most 28, example at least 22 and at most 26, for example at least 23 and at most 35, example at least 23 and at most 33, example at least 23 and at most 30, example at least 23 and at most 28, example at least 23 and at most 26 mg KOH/g, and a hydroxyl value (OHV$_A$) as measured titrimetrically by ISO 4629-2-2016, of at most 10, preferably at most 5 mg KOH/g, has a glass transition temperature (T$_{gA}$) as determined by Differential Scanning Calorimetry (OSC) according to the description, of at least 40 and at most 75° C., and has a functionality (f$_A$) of at least 2.0 and at most 3.5, preferably at least 2.0 and at most 2.5, and has a number average molecular weight (M$_{nA}$) as determined by Size Exclusion Chromatography (SEC) according to the description, of at least 1100 and at most 10000 Da, preferably at least 2000 and at most 9000 Da, more preferably at least 2500 and at most 8000 Da, even more preferably at least 3000 and at most 7000 Da, has a weight average molecular weight (M$_{wA}$) as determined by SEC according to the description, of at least 2200 and at most 20000 Da, preferably at least 4000 and at most 18000 Da, more preferably at least 5000 and at most 18000 Da, even more preferably at least 6000 and at most 18000 Da, has a polydispersity D$_A$ (=M$_A$/M$_n$A) of at least 2.0 and at most 4.0, preferably at least 2.0 and at most 3.5, more preferably at least 2.0 and at most 3.0, and has a melt viscosity (N$_A$) as determined via rheometry according to the description, of at least 15 and at most 150, preferably at least 20 and at most 130, more preferably at least 25 and at most 120 Pa·s, Preferably, the component A1 is 2,2-dimethylpropane-1,3-diol.

Examples of diol-A1 include but are not limited to diethylene glycol, triethylene glycol, 1,2-propylene glycol, 1,3-propylene glycol, 1,3-butylethyl propanediol, 2-butyl-2-ethyl-1,3-propanediol (BEPD), 2-methyl-1,3-propanediol (MP diol), 1,2-butylene glycol, 1,3-butylene glycol, 1,4-butylene glycol, 1,3-isobutanediol, 1,2-isobutanediol, 2,3-butanediol, 2,2,4-trimethyl-1,3-pentanediol, 1,2-cyclopentanediol, 1,3-cyclopentanediol, 1,4-cyclopentanediol, 1,6-hexanediol, 1,4-dimethoxy cylcohexane, 1,2-cyclohexanediol, 1,3-cyclohexanediol, 1,4-cyclohexanediol, 1,4-cyclohexanedimethanol, 4,4'-methylene-bis(cyclohexanol), 4,4'-isopropylidene-bis(cyclohexanol) (hydrogenated bisphenol A), 1,4-bis(hydroxymethyl)cyclohexane, 1,3-bis (hydroxyethyl) cyclohexane, 1,3-bis(hydroxypropyl) cyclohexane, 1,3-bis(hydroxy isopropyl) cyclohexane, and dodecane diol.

Preferably, the diol-A1 is selected from the group consisting of 2-butyl-2-ethyl-1,3-propanediol, 2-methyl-1,3-propanediol, 1,4-cyclohexane dimethanol and mixtures thereof.

Examples of esters of terephthalic acid and isophthalic acid include but are not limited to diesters of terephthalic acid such as dimethyl terephthalate, diethyl terephthalate, dioctyl terephthalate, diesters of isophthalic acid such as dimethyl isophthalate, diethyl isophthalate, dioctyl isophthalate.

Preferably, the dicarboxylic-acid-A2a is a mixture of terephthalic acid and isophthalic acid, in an amount of at least 90 and at most 100% of the total amount of moles making up the A2, and the dicarboxylic-acid-A2b is adipic acid in an amount of at least 0 and at most 10% of the total amount of moles making up the A2.

Examples of a dicarboxylic-acid-A2b include but are not limited to adipic acid, hexahydrophthalic anhydride, cyclohexane dicarboxylic acid, sebacic acid.

Preferably, the dicarboxylic-acid-A2b is selected from the group consisting of adipic acid, cyclohexane dicarboxylic acid and mixtures thereof. More preferably the dicarboxylic-acid-A2b is adipic acid.

Examples of alcohol-A3 include but are not limited to trimethylolpropane, pentaerythritol, glycerol, dipentaerythritol, trimethylolethane. Preferably, the alcohol-A3 is selected from the group consisting of trimethylolpropane, glycerol, trimethylolethane and mixtures thereof; more preferably the polyol is trimethylolpropane.

Preferably, the carboxylic-acid-anhydride-A3 is trimellitic acid anhydride in an amount of at least 0 and at most 0.5 mol % on PRA.

The PRA is solid at room temperature and at atmospheric pressure. The PRA is substantially dry. Preferably the PRA is substantially dry, and solid at room temperature and at atmospheric pressure.

The PRA may be amorphous or crystalline; preferably the PRA is amorphous.

The PRA is prepared according to conventional polycondensation polymerization procedures by esterification or transesterification, optionally in the presence of customary esterification catalysts for example dibutyltin oxide, butyl stannoic acid or tetrabutyl titanate. The preparation conditions and the —COOH/—OH ratio may be selected so as to obtain a PRA that has an acid value and a hydroxyl value within a targeted range of values as disclosed herein. Preferably the PRA is prepared in bulk without the use of a solvent. The condensation polymerization (polycondensation) reaction may occur at a temperature of from 100 to 350° C., preferably 290° C. or less, more preferably from 150 to 270° C. Reaction times may range from 2 to 96 hours, preferably less than 72 hours, more preferably less than 60 hours. The condensation polymerization reaction is preferably carried out in a reactor vessel (the term reactor vessel is used in the entire application interchangeably with the term reactor). The condensation polymerization reaction is preferably carried out in a nitrogen atmosphere. Preferably the reaction is carried out under vacuum to remove water produced during the condensation polymerization reaction whilst vacuum is typically applied at the last stage of the synthesis of a PRA in order to achieve the desired specifications of the PRA. If carboxylic-acid-anhydride-A3 is not used, then preferably the reaction is carried out under vacuum to remove water produced during the condensation polymerization reaction whilst vacuum is typically applied at the last stage of the synthesis of a PRA in order to achieve the desired specifications of the PRA. If carboxylic-acid-anhydride-A3 is used, then preferably the reaction is carried out under vacuum to remove water produced during the condensation polymerization reaction whilst vacuum is typically applied at the first stage of the synthesis of a PRA in order to achieve the desired specifications of the PRA. Once prepared and while still in the reactor at temperatures in the range of 130 to 240° C., the PRA is in a liquid state. The PRA solidifies as soon as it is brought to a temperature below its glass transition temperature for example when the PRA is discharged from a reactor onto a cooling belt which is kept at room temperature or lower temperatures or on a metal tray that may be at a room temperature or below. Typical temperatures of the cooling belt or tray are 15-25° C.

A substantially dry PRA can be isolated in any known way including direct discharge from a reactor, from a temperature as high as for example 205° C. and as low as 140° C., any known way of spray drying, freeze drying, flashing or through devolatization after the condensation polymerization reaction or combinations thereof.

The PRA may be obtained in two-steps wherein in the first step a hydroxyl functional polyester resin (precursor of the PRA) is formed at the end of the first step by using an excess of hydroxyl functional monomers; next, the hydroxyl functional polyester resin is reacted further with excess of carboxylic functional monomers to obtain the PRA.

Typically and depending on the reaction set up, one skilled in the art knows that an additional amount of alcohols e.g. diols, during the synthesis of a polyester resin such as a PRA, may be necessary to compensate for alcohol losses that may take place during the synthesis of a PRA; one skilled in the art knows and can easily calculate said amount of alcohols e.g. diols, given the experimental set up, the composition of the PRA, said polyester resin's desired AV and desired OHV.

If desired, additives such anti-oxidants, flow additives, tribo additives can be added to the PRA whilst the PRA is in the reactor vessel and prior the PRA is discharged as mentioned herein; this addition typically takes place at temperatures in the range of 170-195° C. or in the range of 160-210° C. If said additives are mixed within the PRA, a reasonable amount of time to ensure proper mixing of the additive into the PRA is carried out; for example the mixing can last from 15 to 60 min at temperatures in the range of 170-195° C.; subsequently, the PRA is ready for being discharged.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this sub-section 1.1.1.1 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.1.1.2 the Polyester Resin B (PRB) of the PCC A

In the context of the invention, the polyester resin B as disclosed herein is abbreviated as PRB. The term 'PRB' as used herein includes any and all of its preferments, combinations of its features and ranges as well as combinations of any and all of its preferments with any and all of the combinations of its features and ranges. Thus, any and all of the PRB disclosed in this sub-section, includes any and all of their preferments, combinations of their features and ranges as well as combinations of any and all of their preferments with any and all of the combinations of their features and ranges, are collectively referred to—in the whole of the application—as the PRB.

The PRB is the polycondensation reaction product of at least:
a component B1 in an amount of at least 42 and at most 49.9, preferably at least 45.0 and at most 49.5, more preferably at least 47.0 and at most 49.0 mol % based on PRB, wherein the component B1 consists of: i) a diol-B1a selected from the group consisting of ethylene glycol, 1,2-propane diol, 1,3-propane diol, and mixtures thereof, in an amount of at least 50 and at most 90, preferably at least 57 and at most 88, more preferably at least 64 and at most 83% of the total amount of moles making up the B1, and ii) a diol-B1b selected from the group consisting of $C_{4-18}$ preferably $C_{4-16}$ aliphatic saturated diols and mixtures thereof, in an amount of at least 10 and at most 50, preferably at least 12 and at most 43, more preferably at least 17 and at most 36% of the total amount of moles making up the B1,
and
a component B2, in an amount of at least 42 and at most 55, preferably at least 43 and at most 52, more preferably at least 44 and at most 48 mol % on PRB, wherein the component B2 consists of: i) a dicarboxylic-acid-B2a selected from the group consisting of terephthalic acid, esters of terephthalic acid (e.g. diesters of terephthalic acid such as dimethyl terephthalate, diethyl terephthalate, dioctyl terephthalate), isophthalic acid, esters of isophthalic acid (e.g. diesters of isophthalic acid such as dimethyl isophthalate, diethyl isophthalate, dioctyl isophthalate), and mixtures thereof, in an amount of at least 80 and at most 100, more preferably at least 90 and at most 100% of the total amount of moles making up the B2, and ii) a dicarboxylic-acid-B2b selected from the group consisting of $C_{6-18}$ aliphatic saturated dicarboxylic acids (preferably $C_{6-12}$ aliphatic saturated dicarboxylic acids, more preferably $C_{6-10}$ aliphatic saturated dicarboxylic acids), esters of $C_{6-18}$ aliphatic saturated dicarboxylic acids (preferably esters of $C_{6-12}$ aliphatic saturated dicarboxylic acids, more preferably esters of $C_{6-10}$ aliphatic saturated dicarboxylic acids, most preferably diesters of $C_{6-18}$ aliphatic saturated dicarboxylic acids, especially diesters of $C_{6-12}$ aliphatic saturated dicarboxylic acids, more especially diesters of $C_{6-10}$ aliphatic saturated dicarboxylic acids), hexahydrophthalic anhydride, and mixtures thereof, in an amount of at least 0 and at most 20, more preferably at least 0 and at most 10% of the total amount of moles making up the B2,
and
a component B3 in an amount of at least 0.5 and at most 8.5, preferably at least 0.7 and at most 8.0, more preferably at least 1.0 and at most 8.0, even more preferably at least 2.0 and at most 8.0, most preferably at least 3.0 and at most 8.0, especially at least 4.0 and at most 8.0, more especially at least 5.0 and at most 8.0, even more especially at least 5.5 and at most 7.0, most especially at least 3.0 and at most 7.0 mol % on PRB, wherein the component B3 is selected from the group consisting of: i) an alcohol-B3 selected from the group consisting of $C_{3-10}$ aliphatic saturated alcohols having at least 3 and at most 6 hydroxyl groups, and mixtures thereof, and ii) a carboxylic-acid-anhydride-B3 selected from the group consisting of trimellitic acid anhydride, pyromellitic acid anhydride, and mixtures thereof,
and wherein the total amount of monomers reacted to produce the PRB is 100 mol %, and wherein the PRB is a branched carboxylic acid functional having an acid value ($AV_B$) as measured titrimetrically by ISO 2114-2000, of at least 40 and at most 74, preferably at least 45 and at most 74, more preferably at least 50 and at most 74, even more preferably at least 54 and at most 74, most preferably at least 60 and at most 74, especially at least 40 and at most 73, more especially at least 45 and at most 73, even more especially at least 50 and at most 73, most especially at least 54 and at most 73, for example at least 60 and at most 73, for example at least 60 and at most 73, for example at least 40 and at most 72, for example at least 45 and at most 72, for example at least 50 and at most 72, for example at least 54 and at most 72, for example at least 60 and at most 72, for example at least 40 and at most 70,
for example at least 45 and at most 70, for example at least 50 and at most 70, for example at least 54 and at most 70, for example at least 60 and at most 70, for example at least 62 and at most 74, for example at least 62 and at most 73, for example at least 62 and at most 72, for example at least 62 and at most 70, for example at least 64 and at most 74, for example at least 64 and at most 73, for example at least 64 and at most 72, for example at least 64 and at most 70, for example at least 68 and at most 74, for example at least 68 and at most 73, for example at least 68 and at most 72, for example at least 68 and at most 70, and a hydroxyl value ($OHV_A$) as measured titrimetrically by ISO 4629-2-2016, of at most 10, preferably at most 5 mg KOH/g,
has a glass transition temperature ($T_{gB}$) as determined by DSC according to the description, of at least 40 and at most 80° C., preferably at least 50 and at most 70° C., more preferably at least 55 and at most 65° C., and
has a functionality ($f_B$) of at least 2.7 and at most 6.0, preferably at least 3.5 and at most 5.0, and
has a number average molecular weight ($M_{nB}$) as determined by SEC according to the description, of at least 1100 and at most 10000 Da, preferably at least 1500 and at most 8000 Da, more preferably at least 1600 and at most 7000 Da, even more preferably at least 1700 and at most 6000 Da, most preferably at least 1800 and at most 5500 Da,
has a weight average molecular weight ($M_B$) as determined by SEC according to the description, of at least 3000 and at most 25000 Da, preferably at least 4000 and at most 24000 Da, more preferably at least 5000 and at most 23000 Da, even more preferably at least 6000 and at most 22000 Da, especially at least 6500 and at most 21000 Da,
has a polydispersity DB ($=M_{wB}/M_{nB}$) of at least 2.5 and at most 4.0, preferably at least 2.5 and at most 3.5, and
has a melt viscosity ($N_B$) as determined via rheometry according to the description, of at least 8 and at most 120, more preferably at least 10 and at most 100, even more preferably at least 12 and at most 90 Pa·s.
Preferably, the diol-B1a is ethylene glycol.
Examples of diol-B1b include but are not limited to diethylene glycol, triethylene glycol, 1,2-propylene glycol, 1,3-propylene glycol, 1,3-butylethyl propanediol, 2-butyl-2-ethyl-1,3-propanediol (BEPD), 2-methyl-1,3-propanediol (MP diol), 2,2-dimethylpropane-1,3-diol, 1,2-butylene glycol, 1,3-butylene glycol, 1,4-butylene glycol, 1,3-isobutanediol, 1,2-isobutanediol, 2,3-butanediol, 2,2,4-trimethyl-1,3-pentanediol, 1,2-cyclopentanediol, 1,3-cyclopentanediol, 1,4-cyclopentanediol, 1,6-hexanediol, 1,4-dimethoxy cylcohexane, 1,2-cyclohexanediol, 1,3-cyclohexanediol, 1,4-cyclohexanediol, 1,4-cyclohexanedimethanol, 4,4'-methylene-bis(cyclohexanol), 4,4'-isopropylidene-bis(cyclohexanol) (hydrogenated bisphenol A), 1,4-bis(hydroxymethyl)cyclohexane, 1,3-bis(hydroxyethyl) cyclohexane, 1,3-bis(hydroxypropyl) cyclohexane, 1,3-bis(hydroxy isopropyl) cyclohexane, and dodecane diol.
Preferably, the diol-B1b is selected from the group consisting of 2,2-dimethylpropane-1,3-diol, 2-methyl-1,3-propanediol, diethylene glycol and mixtures thereof. More preferably the diol-B1b is 2,2-dimethylpropane-1,3-diol.
Examples of esters of terephthalic acid and isophthalic acid include but are not limited to diesters of terephthalic acid such as dimethyl terephthalate, diethyl terephthalate, dioctyl terephthalate, diesters of isophthalic acid such as dimethyl isophthalate, diethyl isophthalate, dioctyl isophthalate.
Examples of a dicarboxylic-acid-B2b include but are not limited to adipic acid, hexahydrophthalic anhydride, cyclohexane dicarboxylic acid, sebacic acid.
Preferably, the dicarboxylic-acid-B2b is selected from the group consisting of adipic acid, cyclohexane dicarboxylic acid and mixtures thereof. More preferably the dicarboxylic-acid-B2b is adipic acid.
Preferably, the dicarboxylic-acid-B2a is selected from the group consisting of isophthalic acid, terephthalic acid, and mixtures thereof, in an amount of at least 95 and at most 100% of the total amount of moles making up the B2, and the dicarboxylic-acid-B2b is adipic acid in an amount of at least 0 and at most 5% of the total amount of moles making up the B2.
Examples of alcohol-B3 include but are not limited to trimethylolpropane, pentaerythritol, glycerol, dipentaerythritol, trimethylolethane.
Preferably, the alcohol-B3 is selected from the group consisting of trimethylolpropane, glycerol, trimethylolethane and mixtures thereof; more preferably the polyol is trimethylolpropane.
Preferably, the component B3 is trimellitic acid anhydride in an amount of at least 3 and at most 7 mol % on PRB.
The PRB is solid at room temperature and at atmospheric pressure.
The PRA is substantially dry. Preferably the PRB is substantially dry, and solid at room temperature and at atmospheric pressure.
The PRB may be amorphous or crystalline; preferably the PRB is amorphous.
The PRB is prepared according to conventional polycondensation polymerization procedures by esterification or transesterification, optionally in the presence of customary esterification catalysts for example dibutyltin oxide, butyl stanoic acid or tetrabutyl titanate. The preparation conditions and the —COOH/—OH ratio may be selected so as to obtain a PRB that has an acid value and a hydroxyl value within a targeted range of values as disclosed herein. Preferably the PRB is prepared in bulk without the use of a solvent. The condensation polymerization (polycondensation) reaction may occur at a temperature of from 100 to 350° C., preferably 290° C. or less, more preferably from 150 to 270° C. Reaction times may range from 2 to 96 hours, preferably less than 72 hours, more preferably less than 60 hours. The condensation polymerization reaction is preferably carried out in a reactor vessel (the term reactor vessel is used in the entire application interchangeably with the term reactor). The condensation polymerization reaction is preferably carried out in a nitrogen atmosphere. Preferably the reaction is carried out under vacuum to remove water produced during the condensation polymerization reaction whilst vacuum is typically applied at the last stage of the synthesis of a PRB in order to achieve the desired specifications of the PRB. If carboxylic-acid-anhydride-B3 is not used, then preferably the reaction is carried out under vacuum to remove water produced during the condensation polymerization reaction whilst vacuum is typically applied at the last stage of the synthesis of a PRB in order to achieve the desired specifications of the PRB. If carboxylic-acid-anhydride-B3 is used, then preferably the reaction is carried out under vacuum to remove water produced during the condensation polymerization reaction whilst vacuum is typically applied at the first stage of the synthesis of a PRB in order to achieve the desired specifications of the PRB. Once prepared and while still in the reactor at temperatures in the range of 130 to 240° C., the PRB is in a liquid state. The PRB solidifies as soon as it is brought to a temperature below its glass transition temperature for example when the PRB is discharged from a reactor onto a cooling belt which is kept at room temperature or lower temperatures or on a metal tray that may be at a room temperature or below. Typical temperatures of the cooling belt or tray are 15-25° C.

A substantially dry PRB can be isolated in any known way including direct discharge from a reactor, from a temperature as high as for example 205° C. and as low as 140° C., any known way of spray drying, freeze drying, flashing or through devolatization after the condensation polymerization reaction or combinations thereof.

The PRB may be obtained in two-steps wherein in the first step a hydroxyl functional polyester resin (precursor of the PRB) is formed at the end of the first step by using an excess of hydroxyl functional monomers; next, the hydroxyl functional polyester resin is reacted further with excess of carboxylic functional monomers to obtain the PRB.

Typically and depending on the reaction set up, one skilled in the art knows that an additional amount of alcohols e.g. diols, during the synthesis of a polyester resin such as a PRB, may be necessary to compensate for alcohol losses that may take place during the synthesis of a PRB; one skilled in the art knows and can easily calculate said amount of alcohols e.g. diols, given the experimental set up, the composition of the PRB, said polyester resin's desired AV and desired OHV.

If desired, additives such anti-oxidants, flow additives, tribo-additives can be added to the PRB whilst the PRB is in the reactor vessel and prior the PRB is discharged as mentioned herein; this addition typically takes place at temperatures in the range of 170-195° C. or in the range of 160-210° C. If said additives are mixed within the PRB, a reasonable amount of time to ensure proper mixing of the additive into the PRB is carried out; for example the mixing can last from 15 to 60 min at temperatures in the range of 170-195° C.; subsequently, the PRB is ready for being discharged.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this sub-section 1.1.1.2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.1.2 The crosslinker of the PCC A

The binder (B) consists of:
i) a polyester binder (PB) as described herein, and
ii) a crosslinker in an amount of at least 2.0 and at most 10.0, preferably of at least 4.0 and at most 8.0, more preferably at least 5.0 and at most 7.5 pph B, wherein the crosslinker is selected from the group consisting of β-hydroxylalkyl-amides—as these are described herein-, and mixtures thereof, wherein the crosslinker is able to react with the PB.

By 'crosslinker' is meant herein a compound or a mixture of compounds that are able to react with carboxylic acid functional polyester resins. The crosslinker may be a monodispersed compound, or a mixture of monodispersed compounds, or a resin or a mixture of resins, or a mixture of monodispersed compounds and resins. In the context of the present invention and since each of the polyester resins PRA and PRB that make up the polyester binder (PB) of the PCC A is a carboxylic acid functional polyester, the crosslinker is able to react with the polyester binder (PB).

The term 'crosslinker' (referring to the crosslinker of the PCC A) includes any and all of its preferments, combinations of its features and ranges as well as combinations of any and all of its preferments with any and all of the combinations of its features and ranges. Thus, any and all of the crosslinkers disclosed in this sub-section, includes any and all of their preferments, combinations of their features and ranges as well as combinations of any and all of their preferments with any and all of the combinations of their features and ranges, are collectively referred to—in the whole of the application—as the crosslinker.

By 'β-hydroxylalkyl-amide compounds' (HHA compounds) is meant herein chemical compounds having the average chemical structure represented by the following Formulae 1 or 2:

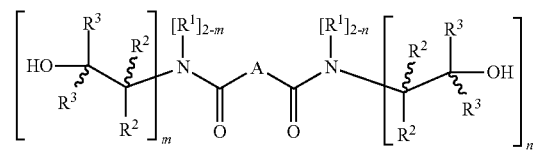

Formula 1 wherein:
n ranges from and including 1 up to and including 2, preferably equal or greater than 1.6 and lower than 2;
m ranges from and including 1 up to and including 2, preferably equal or greater than 1.6 and lower than 2;
A is a $C_{1-60}$ optionally-substituted-hydrocarbylene (preferably a $C_{1-60}$ saturated-hydrocarbylene, more preferably a $C_{1-20}$ optionally-substituted-hydrocarbylene, even more preferably a $C_{1-20}$ saturated-hydrocarbylene) linking group;
$R^1$ is hydrogen, or a $C_{1-5}$ alkyl group optionally substituted with one or more hydroxyl groups;
$R^2$ is hydrogen, or a $C_{1-5}$ alkyl group;
$R^3$ is hydrogen, or a $C_{1-5}$ alkyl group;
while one of the groups $R^2$ and one of the groups $R^3$ of the unit m, may also form—together with the adjacent carbon atoms-, a cycloalkyl group; and/or while one of the groups $R^2$ and one of the groups $R^3$ of the unit n, may also form—together with the adjacent carbon atoms-, a cycloalkyl group,

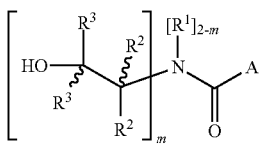

Formula 2 wherein:
  m ranges from and including 1 up to and including 2, preferably equal or greater than 1.6 and lower than 2;
  A is a $C_{1-60}$ optionally-substituted-hydrocarbyl (preferably a $C_{1-60}$ saturated-hydrocarbyl, more preferably a $C_{1-20}$ optionally-substituted-hydrocarbyl, even more preferably a $C_{1-20}$ saturated-hydrocarbyl);
  $R^1$ is hydrogen, or a $C_{1-5}$ alkyl group optionally substituted with one or more hydroxyl groups;
  $R^2$ is hydrogen, or a $C_{1-5}$ alkyl group;
  $R^3$ is hydrogen, or a $C_{1-5}$ alkyl group;
while one of the groups $R^2$ and one of the groups $R^3$, may also form—together with the adjacent carbon atoms-, a cycloalkyl group.

If the β-hydroxylalkyl-amide compounds represented by Formulae 1 or 2, are monodisperse then these Formulae represent a single molecule and n and m are independently an integer. If the β-hydroxylalkyl-amide compounds represented by Formulae 1 or 2, are polydisperse mixtures then these Formulae represent an average structure of the molecules in the mixture and n and m are independently real numbers. β-hydroxylalkyl-amides suitable as crosslinkers for thermosetting powder coating compositions are well-known to those skilled in the art. Examples of β-hydroxylalkyl-amides are disclosed in U.S. Pat. Nos. 4,727,111, 4,788,255, 4,076,917, EP 322834 and EP 473380, WO 2009106454.

Suitable examples of commercially available β-hydroxylalkyl-amides suitable as crosslinkers for thermosetting powder coating compositions are available commercially from EMS Chemie AG under certain trade names using the registered trademark Primid® such as Primid® SF-4510 (substituted adipamide), Primid® XL-552 [N,N,N',N'-tetrakis-(2-hydroxyethyl)-adipamide; average structure corresponds to Formula 3 wherein $R^3$ is hydrogen], Primid® QM 1260 [N,N,N',N'-tetrakis-(2-hydroxypropyl)-adipamide; average structure corresponds to Formula 3 wherein $R^3$ is methyl group].

Preferably the crosslinker is selected from the group consisting of β-hydroxylalkyl-amides having the average structure represented by the following Formula 3, and mixtures thereof.

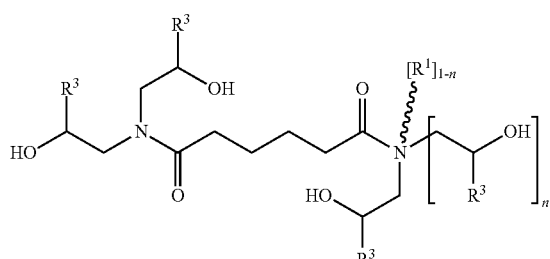

Formula 3 wherein
  n ranges from and including 0.2 up to and including 1
  $R^1$ is hydrogen, or a $C_5$alkyl group;
  $R^3$ is hydrogen, or a $C_5$ alkyl group (preferably $R^3$ is hydrogen, or a methyl group).

Preferably, the crosslinker is selected from the group consisting of β-hydroxylalkyl-amides having the average structure represented by the Formula 3, and mixtures thereof,

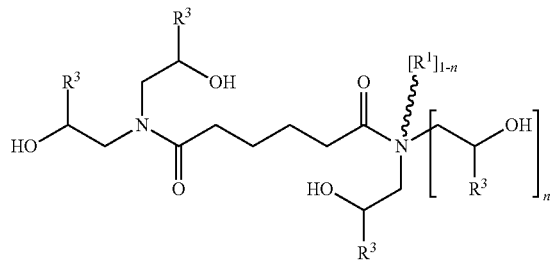

Formula 3 wherein
  n ranges from and including 0.2 up to and including 1
  $R^1$ is hydrogen, or a $C_{1-5}$ alkyl group;
  $R^3$ is hydrogen, or a methyl group.

Preferably, the crosslinker is selected from the group consisting of β-hydroxylalkyl-amides having the average structure represented by the Formula 3, and mixtures thereof,

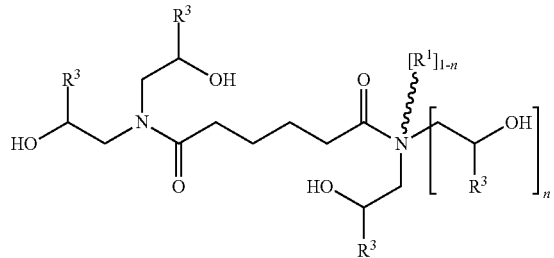

Formula 3 wherein
  n ranges from and including 0.2 up to and including 1
  $R^1$ is hydrogen, or a $C_{1-5}$ alkyl group;
  $R^3$ is hydrogen.

For clarity, Formula 3 represents HHA compounds that also read under the Formula 1.

Specific examples of β-hydroxylalkyl-amides having the average structure represented by the following Formula 3 are bis[N,N-di(β-hydroxyethyl)]adipamide, bis[N,N-di(β-hydroxypropyl)] succinamide, bis[N,N-di(β-hydroxyethyl)] azelamide, bis[N,N-di(β-hydroxypropyl)] adipamide, and bis[N-methyl-N-(p-hydroxyethyl)] oxamide.

Preferably the crosslinker is selected from the group consisting of bis[N,N-di(β-hydroxyethyl)] adipamide, bis[N,N-di(β-hydroxypropyl)] succinamide, bis[N,N-di(β-hydroxyethyl)] azelamide, bis[N,N-di(β-hydroxypropyl)] adipamide, and bis[N-methyl-N-(β-hydroxyethyl)] oxamide, and mixtures thereof.

Preferably the crosslinker is selected from the group consisting of Primid® SF-4510, Primid® QM 1260, Primid® XL-552, and mixtures thereof.

Preferably the crosslinker is selected from the group consisting of Primid® QM 1260, Primid® XL-552, and mixtures thereof.

Preferably the crosslinker is Primid® XL-552.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this sub-section 1.1.2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

1.4 Other Components of the PCC A

The PCC A may contain other components in addition to the binder (B), such as waxes, and/or the usual (processing) additives, for example degassing agents, smoothness, appearance enhancing agents or (light) stabilizers. Suitable stabilizers include for example primary and/or secondary antioxidants and UV stabilizers for example quinones, (sterically hindered) phenolic compounds, phosphonites, phosphites, thioethers and HALS (hindered amine light stabilizers). Examples of suitable degassing agents include cyclohexane dimethanol bisbenzoate, benzoin and benzoin derivatives such as for example those described in WO02/50194. Other additives, such as additives for improving tribo-chargeability may also be added. Some of these additives may be added to any one of the PRA or PRB when each one is prepared in a chemical reactor but before each one of them is discharged from the chemical reactor. Alternatively, some of these additives may be added in the premix of the thermosetting powder coating composition as described above or in the extruder for instance by liquid injection.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in this sub-section 1.4 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

2. PROCESS FOR MAKING THE PCC A

The PCC A may be prepared by mixing the separately weighed-out components in a mixer, heat the obtained premix, for example in a kneader, preferably in an extruder to obtain an extrudate, cool down the obtained extrudate until it solidifies and grind it into granules or flakes that are further ground to reduce the particle size followed by appropriate classification to obtain a thermosetting powder coating composition of the right particle size.

Alternatively, the PCC A may be prepared by mixing the separately weighed-out components of the polyester binder (PB) to form a polyester binder (PB) premix (PB-premix). Subsequently, the PB-premix is mixed together with the separately weighed-out crosslinker—and perhaps other components of the PCC A- to obtain a premix, heat the obtained premix, for example in a kneader, preferably in an extruder to obtain an extrudate, cool down the obtained extrudate until it solidifies and grind it into granules or flakes that are further ground to reduce the particle size followed by appropriate classification to obtain a thermosetting powder coating composition of the right particle size.

Alternatively, the PCC A may be prepared by mixing the separately weighed-out crosslinker with the polyester binder (PB) to form a premix (B-premix). Subsequently, the B-premix is mixed together with the separately weighed-out other components of the PCC A to obtain a premix, heat the obtained premix, for example in a kneader, preferably in an extruder to obtain an extrudate, cool down the obtained extrudate until it solidifies and grind it into granules or flakes that are further ground to reduce the particle size followed by appropriate classification to obtain a thermosetting powder coating composition of the right particle size.

Preferably, the PCC A is prepared by a process comprising the steps of:
a. mixing the components of the polyester binder (PB)—that is the PRA and PRB—to obtain a PB-premix;
b. mixing the PB-premix with the crosslinker and optionally other components of the PCC A to obtain a premix, and
c. heating the premix, preferably in an extruder, to obtain an extrudate;
d. cooling down the extrudate to obtain a solidified extrudate; and
e. grinding the solidified extrudate into smaller particles to obtain the PCC A.

If the premix is heated in an extruder or mixer/kneader, it is preferred to use a temperature control in order to avoid too high temperatures that could lead to curing of the PCC A in the extruder. The temperature should be set so that a good mixing is ensured by melting/kneading/mixing of all components to get a homogeneous mass. Typical temperatures for ensuring a good mixing by melting/kneading/mixing, may range from 90 up to and including 120° C., preferably from 100 up to and including 120° C., more preferably from 110 up to and including 120° C., most preferably 120° C. The disclosure of this paragraph applies also to each of the B-premix and PB-premix.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 2 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

3. THE CURED PCC A, THE PROCESS FOR CURING THE PCC A, AND AN OBJECT OBTAINABLE BY AND/OR OBTAINED BY SAID PROCESS

Broadly in accordance with the invention there is provided a cured PCC A, as the PCC A is described herein. The cured PCC A, is derived upon curing of the PCC A, as the PCC A is described herein. Preferably the cured PCC A is a powder coating, said powder coating can be a primer, top coat or an intermediate coating.

Broadly in accordance with the invention there is provided a process for curing the PCC A comprising the steps of:

i) providing the PCC A; and
ii) heating the PCC A to partially or fully cure it.

Broadly in accordance with the invention there is provided an object obtainable and/or obtained by the aforementioned process for curing the PCC A; said object is the cured PCC A and said cured PCC A is preferably a powder coating, said powder coating can be a primer, top coat or an intermediate coating.

In order to cure the PCC A via heating, the heating of the PCC A can be carried out at a temperature and for a time suitable to cure the PCC A.

Heating of the PCC B may be done using conventional methods, such as with a convection oven and/or with an (N)IR lamp and/or infrared laser and/or microwave equipment may be used to heat the PCC A.

The temperature, at which the PCC A is cured, is preferably in the range of 130 to 225° C., more preferably from 140 to 200° C., even more preferably from 140 to 190° C., most preferably from 140 to 180° C., especially from 140 to 170° C., more especially from 140 to 160° C.

Preferably the curing time of the PCC A is at most 60, more preferably is at most 45, even more preferably is at most 30, most preferably is at most 20, especially is at most 15, more especially is at most 12, even more especially is at most 10, most especially is at most 5 minutes.

Preferably the PCC A is cured at a temperature in the range of 130-180° C. for a time in the range of 10-30 minutes, more preferably the PCC A is cured at a temperature in the range of 140-180° C. for a time in the range of 10-30 minutes.

Preferably the PCC A is cured at a temperature in the range of 140-225° C. for a time in the range of 1-60 minutes, more preferably the PCC A is cured at a temperature in the range of 140-225° C. for a time in the range of 5-60 minutes.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 3 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

4. THE PROCESS FOR COATING AN ARTICLE WITH THE PCC A AND THE PROCESS FOR COATING AND CURING AN ARTICLE HAVING THE PCC A COATED AND CURED THEREON

The invention relates also to a process for making an article having coated thereon the PCC A, comprising the step of applying the PCC A to an article to obtain the article having coated thereon the PCC A.

The invention further relates to a process for making an article having coated and cured thereon the thermosetting powder coating composition B, comprising the steps of:

a. applying the PCC A to an article;
b. heating the PCC A for enough time (curing time) and at a suitable temperature (curing temperature) to cure the PCC A to obtain the article having coated and cured thereon the PCC A.

The PCC A may be applied to an article using the techniques known to the person skilled in the art, for example using electrostatic spray or electrostatic fluidized bed or flame spray.

Once applied to an article, the PCC A may be cured via heating.

The temperature, at which the PCC A is cured, is preferably in the range of 130 to 225° C., more preferably from 140 to 200° C., even more preferably from 140 to 190° C., most preferably from 140 to 180° C., especially from 140 to 170° C., more especially from 140 to 160° C.

Preferably the curing time of the PCC A is at most 60, more preferably is at most 45, even more preferably is at most 30, most preferably is at most 20, especially is at most 15, more especially is at most 12, even more especially is at most 10, most especially is at most 5 minutes.

Preferably the PCC A is cured at a temperature in the range of 130-180° C. for a time in the range of 10-30 minutes, more preferably the PCC A is cured at a temperature in the range of 140-180° C. for a time in the range of 10-30 minutes.

Preferably the PCC A is cured at a temperature in the range of 140-225° C. for a time in the range of 1-60 minutes, more preferably the PCC A is cured at a temperature in the range of 140-225° C. for a time in the range of 5-60 minutes.

Unless otherwise explicitly stated, any feature, element, component, embodiment, aspect, range and especially any preferred feature, preferred element, preferred embodiment, preferred aspect, preferred range, preferred combination of ranges, preferments, embodiments and aspects in connection with any piece of disclosure disclosed in section 4 can be combined with each other and with any other feature, element, component, embodiment, aspect, range and especially any preferred feature, preferred element, preferred embodiment, preferred aspect, preferred range, preferred combination of ranges, preferments, embodiments and aspects of the invention as these are disclosed in the entire application.

5. OTHER ASPECTS AND EMBODIMENTS OF THE INVENTION

Broadly in accordance with the invention, there is provided a process for making a composition or an article, each one of them suitable for any one of the applications selected from the group consisting of powder coating applications, powder-in-mould coating applications, 3D-printing applications, automotive applications, marine applications, aerospace applications, medical applications, defense applications, sports/recreational applications, architectural applications, bottling applications, household applications, machinery applications, can applications, coil applications, energy applications, textile applications and electrical applications, wherein the process comprises the step of using (providing) a PCC A as described in the claims and as disclosed herein.

The invention further relates to a use of:
i) the PCC A as described in the claims and as disclosed herein; and/or
ii) a cured PCC A as described in the claims and as disclosed herein; and/or
iii) an article as described in the claims and as disclosed herein;

in powder coatings, powder-in-mould coatings, 3D-printing, automotive applications (car parts, agricultural machines, composite structures, ceramic structures), marine applications (ships, boats), aerospace applications (planes, helicopters, composite structures, ceramic structures), medical applications (artificial joints, meshes, woven or non-woven sheets, tapes, ribbons, bands, cables, tube-like products for e.g. ligament replacement, composite structures, ceramic structures), defense applications (ballistic protection, body armour, ballistic vests, ballistic helmets, ballistic vehicle protection, composite structures, ceramic structures), sports/recreational applications (fencing, skates, skateboarding, snowboarding, suspension lines on sport parachutes, paragliders, kites, kite lines for kite sports, climbing equipment, composite structures, ceramic structures), architectural applications (windows, doors, (pseudo-)walls, cables, bottling applications, household applications (household appliances, white goods, furniture, computer housings), machinery applications (can and bottle handling machine parts, moving parts on weaving machines, bearings, gears, composite structures, ceramic structures, computer housings), can applications, coil applications, energy applications for e.g. generators for wind, tide or solar energy, textile applications for e.g. fabrics, this can be very broad from impregnation technical textiles to for example complete composites both as coating and as a binder for composites, and electrical applications (cabinets for electrical wire or switch boards).

Broadly in accordance with the invention, there is provided a use of:
i) a PCC A as described in the claims and as disclosed herein; or
ii) a cured PCC A as described in the claims and as disclosed herein; or
iii) an article as described herein;
in powder coatings, powder-in-mould coatings, 3D-printing, automotive applications, marine applications, aerospace applications, medical applications, defense applications, sports/recreational applications, architectural applications, bottling applications, household applications, machinery applications, can applications, coil applications, energy applications, textile applications and electrical applications.

In another aspect the invention relates to a use of the PCC A as described in the claims and as disclosed herein for matt powder coatings.

In another aspect the invention relates to a method for obtaining matt powder coatings using a thermosetting powder coating composition A as described in the claims and as disclosed herein for matt powder coatings.

Broadly in accordance with the invention there is provided a use of a PCC A as described in the claims and as disclosed herein for matt powder coatings.

Broadly in accordance with the invention there is provided a use of a PCC A as described in the claims and as disclosed herein for impact resistant matt powder coatings.

Broadly in accordance with the invention there is provided a use of a PCC A as described in the claims and as disclosed herein for matt powder coatings having at least sufficient—preferably excellent—low gloss consistency.

Broadly in accordance with the invention there is provided a use of a PCC A as described in the claims and as disclosed herein for matt powder coatings having at least sufficient—preferably excellent—batch-to-batch low gloss consistency.

Broadly in accordance with the invention there is provided a use of a PCC A as described in the claims and as disclosed herein for impact resistant matt powder coatings which have also at least sufficient—preferably excellent low gloss consistency.

Broadly in accordance with the invention there is provided a use of a PCC A as described in the claims and as disclosed herein for impact resistant matt powder coatings which have also at least sufficient—preferably excellent low gloss consistency, and also at least sufficient—preferably excellent—batch-to-batch low gloss consistency.

Yet, another aspect of the invention is any one of the PCC A shown in the Examples that is according to the invention (Examples 4, 7, 8, 11, 12, 15, 16, 17, 19, 20, 22, 23).

Yet, another aspect of the invention is any one of the PC A [a cured PCC A e.g. a powder coating derived upon curing of the PCC A] shown in the Examples that is according to the invention (Examples 26, 29, 30, 33, 34, 37, 38, 39, 41, 42, 44, 45).

Many other variations and embodiments of the invention will be apparent to those skilled in the art and such variations are contemplated within the scope of the claims.

Any feature, element, component, embodiment, range and especially any preferred feature, preferred element, preferred embodiment, preferred range, preferred combination of ranges, preferment described in the entire application can be combined with each other.

Further aspects of the invention and preferred features thereof are given in the claims herein.

The invention will now be described in detail with reference to the following non limiting examples which are by way of illustration only.

6. EXAMPLES

The invention is explained in more detail with reference to the following non-limiting examples.

In the Examples section:
the abbreviation 'PRA' represents a polyester resin according to the PRA as disclosed herein;
the abbreviation 'PRB' represents a polyester resin according to the PRB as disclosed herein;
the abbreviation 'PCC A' represents a thermosetting powder coating composition according to the PCC A as disclosed herein.

In the Examples section:
the abbreviation 'Inv' represents an entity according to the invention;
the abbreviation 'Comp' represents an entity not according to the invention;
the abbreviation 'n.m.' means 'not measured'.

6.1 Chemicals & Raw Materials

Ethylene glycol (purity 97.5%) was supplied by Brenntag. 2,2-dimethylpropane-1,3-diol (neopentyl glycol) (purity 99-100%) was supplied by BASF. Trimethylolpropane (purity 98%) was supplied by Oxea. Adipic acid (purity 99.8%) was supplied by BASF. Isophthalic acid (purity 95-100%) was supplied by Lotte Chemical. Terephthalic acid (purity 99%) was supplied by BP. Trimellitic anhydride (purity 97.5%) was supplied by Polynt. Butyl stannoic acid (purity 98%) was used as a polycondensation catalyst and it was supplied by PMC Group. Distearyl pentaerythritol diphosphate (purity 90-100%) was used as an antioxidant and it was supplied by Addivant. 6.6'-di-tert-butyl-4.4'-butyl-idenedi-m-cresol (purity >99%), was supplied by Adeka. Primid® XL-552 (supplied by EMS Chemie AG) is a β-hydroxylalkyl-amide according to Formula 3, and it was used as crosslinker. Kronos® 2360 (supplied by Kronos Titan GmbH) is titanium dioxide and was used as a white pigment. Resiflow PV-5 (supplied by Worlee-Chemie GmbH) was used as a flow control agent. Benzoin (supplied by Sigma Aldrich) was used as air release agent.

6.2 Determination of the Number Average Molecular Weight ($M_n$) and the Weight Average Molecular Weight ($M_w$) of the Polyester Resins (Abbreviated as 'SEC-Method')

The number average molecular weight ($M_n$) and the weight average molecular weight ($M_w$) were measured via SEC calibrated with a set of polystyrene standards with a molecular weight range of from 500 up to $7 \times 10^6$ g/mol and using as an eluent stabilized tetrahydrofuran [THF with 0.007-0.015% w/w butyl-hydroxytoluene (BHT)] modified with 0.8% acetic acid, at a flow rate of 1 mL/min at 40° C. More specifically, 50 mg of a solid sample of a polyester resin, were dissolved in 5 mL eluent for 16 hours at room temperature without shaking. 10 µL of the solution thus prepared were injected into the system for the measurement. The SEC measurements were carried out on a Waters Acquity APC™ system which consisted of: i) an Waters Acquity® UPLC RI refractive index detector at 40° C., ii) an Waters Acquity® APC™ Column Manager—S with three different Acquity® APC™ columns (450 Å, 125 Å and 45 Å pore size) with l/d=150/4.6 mm and are filled with particles having a particle size of 2.5 (the 450 Å and the 125 Å column) or 1.7 µm (the 45 Å column) (1 µm=1×10$^{-6}$), (supplied by Waters), iii) an Acquity® APC™ Sample Manager—pFTN injection system and iv) an Acquity® APC™ p-Isocratic Solvent Manager isocratic pump. The $M_n$ and $M_w$ were determined by the use of suitable software.

6.3 Determination of Polydispersity (D) of Polyester Resins

Once the $M_n$ and $M_w$ were determined via the SEC-Method described above, the polydispersity (D) was calculated according to the following equation (EQ1):

$$D = M_w / M_n \quad (EQ1)$$

For example in case of a PRA, the D was calculated as follows:

$$D_A = M_{wA} / M_{nA}$$

For example in case of a PRB, the f was calculated as follows:

$$D_B = M_{wB} / M_{nB}$$

6.4 Determination of the Melt Viscosity (N) of Polyester Resins

The melt viscosity (N) (or equally viscosity, in Pa·s) of polyester resins was determined via rheometry at 160° C. at an applied shear-rate of 70 s$^{-1}$ (21 rpm) using a 19.05 mm spindle [cone spindle CAP-S-05 (19.05 mm, 1.8°)], on a cone and plate rheometer Brookfield CAP 2000+H Viscometer.

In case of a PRA, its N is symbolized as $N_A$.
In case of a PRB, its N is symbolized as $N_B$.

6.5 Determination of the Acid Value (AV) of Polyester Resins

The acid value (AV) was measured according to ISO 2114-2000. The AV is given as the mass of potassium hydroxide (KOH) in milligrams that is required to neutralize one gram of the tested substance and is used as a measure of the concentration of carboxylic acid groups present.

6.6 Determination of the Hydroxyl Value (OHV) of Polyester Resins

The hydroxyl value (OHV) was measured according to ISO 4629-2-2016 (version used for the catalysed method). The OHV is given as the mass of potassium hydroxide (KOH) in milligrams that is required to neutralize one gram of the tested substance and is used as a measure of the concentration of hydroxyl groups present.

6.7 Determination of the Functionality (f) of Polyester Resins

The functionality (f) of a polyester resin was calculated according to the following equation EQ2:

$$f = [M_n \times (AV + OHV)] / 56110 \quad (EQ2)$$

For example in case of a PRA, the f was calculated as follows:

$$f_A = [M_{nA} \times (AV_A + OHV_A)] / 56110$$

For example in case of a PRB, the f was calculated as follows:

$$f_B = [M_{nB} \times (AV_B + OHV_B)] / 56110$$

6.8 Determination of the $T_g$ of Polyester Resins ('DSC Method-$T_g$-PR')

The glass transition temperature ($T_g$ in ° C.) of the polyester resins PRA and PRB was measured via Differential Scanning Calorimetry (DSC) on a TA instruments DSC Q20 apparatus, in $N_2$ atmosphere calibrated with indium, as follows: a sample of 7.5±2.5 mg of the polyester resin placed in the DSC cell at room temperature. The sample was heated up to 150° C. at a heating rate of 40° C./minute (thermograph A). Once the sample has reached 150° C., the temperature was maintained at 150° C. for 10 minutes. Subsequently, the sample was cooled down to 0° C. at a heating rate of 30° C./minute (thermograph B); once the sample has reached 0° C., the temperature was maintained at 0° C. for 1 minute. Subsequently, the sample was heated up to 150° C. at a heating rate of 5° C./minute (thermograph C). Thermographs A, B and C were processed as the Y axis of the thermographs representing the heat flow having exotherm up and endotherm down. Thermograph C was used to measure the inflection point (glass transition temperature, $T_g$) of the polyester resins. The glass transition temperature of the polyester resins was the inflection point temperature of the temperature range over which the glass transition took place, said inflection point temperature was the point on the thermal curve corresponding to the peak of the first derivative (with respect to time) of the parent thermal curve. This point corresponds to the inflection point of the parent thermal curve, as defined in § 3.2.1.3 in ASTM E 1356-08 (edition of 2014). The processing of the signal (DSC thermogram, Heat Flow vs. Temperature) was carried out using Universal Analysis 2000 software version 4.5a provided by TA instruments.

6.9 Determination of the $T_g$ of Thermosetting Powder Coating Compositions ('DSC Method-$T_g$-PCC')

The glass transition temperature ($T_g$ in ° C.) of the thermosetting powder coating compositions was measured via Differential Scanning Calorimetry (DSC) on a TA instruments DSC Q20 apparatus, in $N_2$ atmosphere calibrated with indium, as follows: a sample of 7.5±2.5 mg of the thermosetting powder coating compositions was placed in the DSC cell at room temperature. The sample was heated up to 90° C. at a heating rate of 10° C./minute (thermograph A). Once the sample has reached 90° C., the temperature was maintained at 90° C. for 1 minute. Subsequently, the sample was cooled down to 0° C. at a heating rate of 20° C./min (thermograph B); once the sample has reached 0° C., the temperature was maintained at 0° C. for 2 minutes. Subsequently, the sample was heated up to 120° C. at a heating rate of 5° C./minute (thermograph C). Subsequently, the sample was cooled down to 20° C. at a cooling rate of 5° C./minute. The thermographs A, B and C were processed as the Y axis of the thermographs representing the heat flow having exotherm up and endotherm down. The thermograph C was used to measure the inflection point (glass transition temperature, $T_g$) of the thermosetting powder coating compositions. The glass transition temperature of the thermosetting powder coating composition was the inflection point temperature of the temperature range over which the glass transition took place, said inflection point temperature was the point on the thermal curve corresponding to the peak of the first derivative (with respect to time) of the parent thermal curve. This point corresponds to the inflection point of the parent thermal curve, as defined in § 3.2.1.3 in ASTM E 1356-08 (edition of 2014). The processing of the signal (DSC thermogram, Heat Flow vs. Temperature) was carried out using Universal Analysis 2000 software version 4.5a provided by TA instruments.

6.10 Determination of the $\Delta H_m$ of Polyester Resins or Polyester Binders ('DSC Method-$\Delta H_m$-PR')

The $\Delta H_m$ of a polyester resin was measured via Differential Scanning Calorimetry (DSC) on a TA instruments DSC Q20 apparatus, in $N_2$ atmosphere calibrated with indium, as follows: a sample of 7.5±2.5 mg of the polyester resin was placed in the DSC cell at room temperature. The sample was equilibrated at 25° C. for 1 minute. Subsequently the sample was cooled down to –50° C. at a cooling rate of 5° C./minute (thermograph A); once the sample reached –50° C., the temperature was maintained at –50° C. for 1 minute. Subsequently, the sample was heated up to 200° C. at a heating rate of 5° C./minute (thermograph B). Subsequently, the sample was cooled down to 20° C. at a cooling rate of 5° C./minute. The thermographs A and B were processed as the Y axis of the thermographs representing the heat flow has exotherm up and endotherm down. The thermograph B was used to measure the $\Delta H_m$. The $\Delta H_m$ was measured as the integrated heat flow over the temperature range of the melting. The processing of the signal (DSC thermogram, Heat Flow vs. Temperature) was carried out using suitable software such as the Universal Analysis 2000 software version 4.5a provided by TA instruments.

The same method (as described in paragraph) is used to determine the $\Delta H_m$ of a polyester binder.

6.11 Determination of the $\Delta H_m$ of Thermosetting Powder Coating Compositions or Binders ('DSC Method-$\Delta H_m$-PCC')

The $\Delta H_m$ of a thermosetting powder coating composition is measured via Differential Scanning Calorimetry (DSC) on a TA instruments DSC Q2000 apparatus, in $N_2$ atmosphere calibrated with indium, as follows: a sample of 7.5±2.5 mg of the thermosetting powder coating composition is placed in the DSC cell at room temperature. Subsequently the sample is cooled down to –20° C. and once that temperate is reached the sample is equilibrated at –20° C. for 1 minute (Thermograph A).

Subsequently the sample is heated up to 200° C. at a heating rate of 5° C./minute. Once the sample reaches 200° C., the temperature is maintained at 200° C. for 1 minute (thermograph B). Subsequently, the sample was cooled down to 20° C. at a cooling rate of 5° C./minute. The thermographs A and B were processed as the Y axis of the thermographs representing the heat flow has exotherm up and endotherm down. The thermograph B is used to measure the $\Delta H_m$. The $\Delta H_m$ is determined as the integrated heat flow over the temperature range of the melting. The processing of the signal (DSC thermogram, Heat Flow vs. Temperature) is carried out using suitable software such as the Universal Analysis 2000 software version 4.5a provided by TA instruments.

The same method (as described in paragraph) is used to determine the $\Delta H_m$ of a binder.

6.12 Assessment of Properties of the Thermosetting Powder Coating Compositions and their Corresponding Powder Coatings The physical storage stability (PSS) was assessed on white thermosetting powder coating compositions as these are defined herein. The physical storage stability (PSS) of the white thermosetting powder coating compositions of Table 1 was tested according to ISO 8130/part 8 (edition of 2010), at 40° C. for a total of 28 days. The measurement of the PSS of said thermosetting powder coating compositions was initiated upon their preparation as the preparation is described in the specification; upon the completion of the heating at 40° C. for a total of 28 days, the samples of the thermosetting powder coating compositions were removed from the oven and were left to cool down to room temperature for 120 minutes prior to the assessment of the PSS.

The greater the extend of agglomeration or sintering the poorer the PSS, thus the lower its ranking according to the following scale. The extent of agglomeration was visually assessed and ranked according to the following rating on a 1-10 scale (1 representing the worst PSS and 10 the best PSS):

10: No change.
9: No agglomeration, very good fluidity.
8: No agglomeration, good fluidity.
7: Very low agglomeration; agglomeration can be dispersed by one light tap into a fine powder.
6: Very low agglomeration; agglomeration can be dispersed by several taps into a fine powder.
5: Low agglomeration; agglomeration can be dispersed by hand pressure into a fine powder.
4: Low agglomeration; agglomeration cannot be dispersed by hand pressure in a fine powder.
3: Severe agglomeration into several large lumps, material is pourable.
2: Severe agglomeration into several large lumps, material is not pourable.
1: product sintered to one lump, volume reduced.

The compositions of the claimed invention have at least good PSS, preferably very good, more preferably excellent PSS.

By 'thermosetting powder coating composition having 'excellent PSS' is meant herein that the white thermosetting powder coating composition has a physical storage stability (PSS) of at least 9 and at most 10.

By 'thermosetting powder coating composition having 'very good PSS' is meant herein that the white thermosetting powder coating composition has a physical storage stability (PSS) of at least 7 and at most 8.

By 'thermosetting powder coating composition having 'good PSS' is meant herein that the white thermosetting powder coating composition has a physical storage stability (PSS) of 6.

By 'thermosetting powder coating composition having 'insufficient PSS' is meant herein that the white thermosetting powder coating composition has a physical storage stability (PSS) of at least 4 and at most 5.

By 'thermosetting powder coating composition having 'poor PSS' is meant herein that the white thermosetting powder coating composition has a physical storage stability (PSS) of at least 2 and at most 3.

By 'thermosetting powder coating composition having 'very poor PSS' is meant herein that the white thermosetting powder coating composition has a physical storage stability (PSS) of 1.

By 'storage stable thermosetting powder coating composition' is meant herein a thermosetting powder coating composition having at least good PSS.

The coating (film) thickness of the powder coatings derived upon heat curing of the corresponding thermosetting powder coating compositions, was measured with a PosiTector 6000 coating thickness gauge from DeFelsko Corporation according to EN ISO 2808:2007.

The reverse impact resistance (RIR) (inch/lbs, 1 inch/bs=0.055997 m/kg) was tested according to ASTM D 2794 (edition of 2010), with a ⅝' ball at 60 inch/lbs and at a film thickness of 75±5 μm (1 μm=1×10$^{-6}$ m) onto 0.8 mm thick chromate aluminium Q-panels (type: ALQ-46) cured for 10 minutes at 180° C. The tests took place within 24 and 36 hours after the curing took place. Upon impact (hit with 60 inch/bs) the powder coatings were visually inspected for any kind of damage e.g. cracks. If the powder coating suffered a damage, then the test result was recorded as a 'fail'. If the powder coating suffered no damage, then the test result was recorded as a 'pass'.

The compositions of the claimed invention provide for impact resistant powder coatings.

By 'impact resistant powder coatings' is meant herein white powder coatings—as these are defined herein—which have reverse impact resistance (RIR) of at least 60 inch/lbs ('pass'), as RIR is defined and determined herein.

By 'non-impact resistant powder coatings' is meant herein white powder coatings—as these are defined herein—which have reverse impact resistance (RIR) lower than 60 inch/lbs ('fail'), as RIR is defined and measured herein.

The gloss60° was measured on white powder coatings as these are defined herein, deposited on ALQ-46 panels and measured according to ASTM D523-14 (edition of 2014) with a BYK-Gardner GmbH Haze-Gloss meter. The gloss was reported at angle 60° in gloss units and it was measured at a film thickness of 60±5 μm on ALQ-46 panels.

The compositions of the claimed invention provide for matt powder coatings.

By 'matt powder coatings' or 'equally 'low gloss powder coatings' is meant herein a white powder coating—as these are defined herein—having a thickness of 60±5 μm on ALQ-46 test panels chromium conversion coated from Q-lab, that is obtained upon curing at 180° C. for 10 min of a white thermosetting powder coating composition as the latter are defined herein, wherein the white powder coating has a gloss60° (gloss60°-180) of at most 45, preferably at most 44, more preferably at most 43, even more preferably at most 42, most preferably at most 41, especially at most 40, more especially at most 39, for example at most 38, for example at most 37, for example at most 36, for example at most 35, for example at most 34, for example at most 33, for example at most 32, for example at most 31, for example at most 30, for example at most 29, for example at most 28, for example at most 27, for example at most 26, for example at most 25, for example at most 24, for example at most 23, for example at most 22, for example at most 21, for example at most 20, as gloss 60° is defined and measured herein.

By 'impact resistant matt powder coatings' is meant herein a powder coating which is matt and impact resistant.

The compositions of the claimed invention provide for powder coatings having at least sufficient low gloss consistency. Preferably the compositions of the claimed invention provide for powder coatings having excellent low gloss consistency.

By 'low gloss consistency' (or low gloss consistent') is meant herein that the SD-gloss60° of a matt powder coating (as the latter is defined herein), is at most 3.0. For example, for a powder coating to have low gloss consistency:
i) it must be a matt powder coating (as this is defined herein), and
ii) its SD-gloss60° must be at most 3.0.

By 'excellent low gloss consistency' is meant herein that the SD-gloss60° of a matt powder coating (as the latter is defined herein), is at most 2.0.

By 'sufficient low gloss consistency' is meant herein that the SD-gloss60° of a matt powder coating (as the latter is defined herein), is at least 2.1 and at most 3.0.

By 'insufficient low gloss consistency' is meant herein that the SD-gloss60° of a matt powder coating (as the latter is defined herein), is at least 3.1.

The compositions of the claimed invention provide for powder coatings having at least sufficient low gloss consistency. Preferably the compositions of the claimed invention provide for powder coatings having excellent low gloss consistency.

The compositions of the claimed invention provide for powder coatings having at least sufficient batch-to-batch low gloss consistency. Preferably the compositions of the claimed invention provide for powder coatings having excellent batch-to-batch low gloss consistency.

By 'batch-to-batch low gloss consistency' (or batch-to-batch low gloss consistent') is meant herein that the SD-BTB-gloss60° of a matt powder coating (as the latter is defined herein), is at most 3.0. For example, for a powder coating to have batch-to-batch low gloss consistency:
i) it must be a matt powder coating (as this is defined herein), and
ii) its SD-BTB-gloss60° must be at most 3.0.

By 'excellent batch-to-batch low gloss consistency' is meant herein that the SD-BTB-gloss60° of a matt powder coating (as the latter is defined herein), is at most 2.0.

By 'sufficient batch-to-batch low gloss consistency' is meant herein that the SD-BTB-gloss60° of a matt powder coating (as the latter is defined herein), is at least 2.1 and at most 3.0.

By 'insufficient batch-to-batch low gloss consistency' is meant herein that the SD-BTB-gloss60° of a matt powder coating (as the latter is defined herein), is at least 3.1.

By 'different batch' of a compositionally the same thermosetting powder coating composition, is meant herein that one or both of the PRA and PRB making up the polyester binder (PB) of the thermosetting powder coating composition, was/were prepared in a different production batch.

Any comparison of any property described herein concerning thermosetting powder coating compositions and their corresponding powder coatings should be carried out on the basis of inventive (according to the claimed invention) formulations and comparative (not according to the claimed invention) as the latter are understood by one of ordinary skill in the art of thermosetting powder coatings and as defined herein.

6.13 Examples 1, 1.1-1.5, 2, 2.1-2.5, 3, 3.1-3.5: Synthesis of Polyester Resins: General The composition of any one of the polyester resins shown in the § 6.13 of the Examples section refers to a yield of 1.0 Kg of polyester resin.

Each one of the polyester resins shown in the § 6.13 of the Examples section was prepared via a (two step) polycondensation reaction. At the end of the first step a hydroxyl functional polyester resin was obtained (mentioned herein as precursor); next the hydroxyl functional polyester resin was reacted further with excess of carboxylic acid functional monomers to obtain the polyester resins shown in the § 6.13 of the Examples section.

Each one of the polyester resins shown in the § 6.13 of the Examples section was solid at room temperature and at atmospheric pressure.

Example 1: Synthesis of the Polyester Resin PRA-1

A reactor vessel fitted with a thermometer, a stirrer and a distillation device for the removal of water formed during the synthesis, was filled with butyl stannoic acid (1 g) (catalyst), distearyl pentaerythritol diphosphite (1.7 g) (anti-oxidant), neopentyl glycol (431.1 g, 4.14 mol). The vessel was heated up to 150° C. until the mixture was molten. Then terephthalic acid (504.9 g, 3.04 mol) and isophthalic acid (118.1 g, 0.71 mol) were added and under a nitrogen flow the temperature was gradually increased to 260° C. while distilling off the reaction water until the acid value of the precursor of the polyester resin was between 9 and 15 mg KOH/g; that marked the completion of the first step. For the second step the reaction mixture was cooled to 200° C. and subsequently the adipic acid (38.1 g, 0.26 mol) and isophthalic acid (52.4 g, 0.32 mol) were added. The temperature was raised to 250° C. and the polyester resin was stirred at 250° C., vacuum of 50-70 mbar was applied for 120 minutes, until the acid value of the polyester resin was 26±0.5 mg KOH/g and the hydroxyl value was 6.5±0.5 mg KOH/g. Subsequently, the polyester resin was cooled down to 195° C. (marking the end of the second step). Subsequently, the polyester resin was discharged onto aluminium foil that was kept at room temperature.

The properties of the isolated polyester resin were: amorphous, $M_{nA}$=4530 Da, $M_{wA}$=11300 Da, $D_A$=2.5, $T_{gA}$=59° C., $AV_A$=24.8 mg KOH/g resin, $OHV_A$=5.6 mg KOH/g, f=2.5, $N_A$=39.9 Pa·s.

Example 1.1: Synthesis of the Polyester Resin PRA-2

A reactor vessel fitted with a thermometer, a stirrer and a distillation device for the removal of water formed during the synthesis, was filled with butyl stannoic acid (0.3 g) (catalyst), distearyl pentaerythritol diphosphite (0.4 g) (anti-oxidant), neopentyl glycol (437.3 g, 4.2 mol). The vessel was heated up to 150° C. until the mixture was molten. Then terephthalic acid (512.2 g, 3.1 mol) and isophthalic acid (131.7 g, 0.8 mol) were added and under a nitrogen flow the temperature was gradually increased to 260° C. while distilling off the reaction water until the acid value of the precursor of the polyester resin was between 9 and 15 mg KOH/g; that marked the completion of the first step. For the second step the reaction mixture was cooled to 180° C. and subsequently the adipic acid (38.6 g, 0.3 mol) and isophthalic acid (27.5 g, 0.2 mol) were added. The temperature was raised to 240° C. and the polyester resin was stirred at 240° C., vacuum of 50-75 mbar was applied for 250 minutes, until the acid value of the polyester resin was 16.5±0.5 mg KOH/g and the hydroxyl value was 4±0.5 mg KOH/g. Subsequently, the polyester resin was cooled down to 190° C. (marking the end of the second step). Subsequently, the polyester resin was discharged onto aluminium foil that was kept at room temperature.

The properties of the isolated polyester resin were: amorphous, $M_{nA}$=5850 Da, $M_{wA}$=15900 Da, $D_A$=2.7, $T_{gA}$=60.3° C., $AV_A$=15.7 mg KOH/g resin, $OHV_A$=3.1 mg KOH/g, f=2.0, $N_A$=105 Pa·s.

Example 1.2: Synthesis of the Polyester Resin PRA-3

A reactor vessel fitted with a thermometer, a stirrer and a distillation device for the removal of water formed during the synthesis, was filled with butyl stannoic acid (0.3 g) (catalyst), distearyl pentaerythritol diphosphite (0.4 g) (anti-oxidant), neopentyl glycol (425.4 g, 4.1 mol). The vessel was heated up to 150° C. until the mixture was molten. Then terephthalic acid (498.4 g, 3.0 mol) and isophthalic acid (105.1 g, 0.6 mol) were added and under a nitrogen flow the temperature was gradually increased to 260° C. while distilling off the reaction water until the acid value of the precursor of the polyester resin was between 5 and 15 mg KOH/g; that marked the completion of the first step. For the second step the reaction mixture was cooled to 180° C. and subsequently the adipic acid (37.5 g, 0.3 mol) and isophthalic acid (76.8 g, 0.5 mol) were added. The temperature was raised to 240° C. and the polyester resin was stirred at 240° C., vacuum of 50-70 mbar was applied for 90 minutes, until the acid value of the polyester resin was 33±0.5 mg KOH/g and the hydroxyl value was 4±0.5 mg KOH/g. Subsequently, the polyester resin was cooled down to 190° C. (marking the end of the second step). Subsequently, the polyester resin was discharged onto aluminium foil that was kept at room temperature.

The properties of the isolated polyester resin were: amorphous, $M_{nA}$=3690 Da, $M_{wA}$=11500 Da, $D_A$=3.1, $T_{gA}$=60.7° C., $AV_A$=31.9 mg KOH/g resin, $OHV_A$=3.5 mg KOH/g, f=2.3, $N_A$=46.7 Pa·s.

Example 1.3: Synthesis of the Polyester Resin PRA-4

A reactor vessel fitted with a thermometer, a stirrer and a distillation device for the removal of water formed during the synthesis, was filled with butyl stannoic acid (0.3 g) (catalyst), distearyl pentaerythritol diphosphite (0.4 g) (anti-oxidant), neopentyl glycol (427.8 g, 4.1 mol) and trimethylolpropane (3.3 g, 0.02 mol). The vessel was heated up to 150° C. until the mixture was molten. Then terephthalic acid (505.6 g, 3.0 mol) and isophthalic acid (118.2 g, 0.7 mol) were added and under a nitrogen flow the temperature was gradually increased to 260° C. while distilling off the reaction water until the acid value of the precursor of the polyester resin was between 5 and 15 mg KOH/g; that marked the completion of the first step. For the second step the reaction mixture was cooled to 180° C. and subsequently the adipic acid (38.1 g, 0.3 mol) and isophthalic acid (52.4 g, 0.3 mol) were added. The temperature was raised to 240° C. and the polyester resin was stirred at 240° C., vacuum of 50-90 mbar was applied for 140 minutes, until the acid value of the polyester resin was 25.5±0.5 mg KOH/g and the hydroxyl value was 4.5±0.5 mg KOH/g. Subsequently, the polyester resin was cooled down to 190° C. (marking the end of the second step). Subsequently, the polyester resin was discharged onto aluminium foil that was kept at room temperature.

The properties of the isolated polyester resin were: amorphous, $M_{nA}$=4800 Da, $M_{wA}$=12700 Da, $D_A$=2.6, $T_{gA}$=60.5° C., $AV_A$=24.5 mg KOH/g resin, $OHV_A$=3.8 mg KOH/g, f=2.4, $N_A$=47.1 Pa·s.

Example 1.4: Synthesis of the Polyester Resin PRA-5

A reactor vessel fitted with a thermometer, a stirrer and a distillation device for the removal of water formed during the synthesis, was filled with butyl stannoic acid (0.3 g) (catalyst), distearyl pentaerythritol diphosphite (0.4 g) (antioxidant), neopentyl glycol (422.8 g, 4.1 mol) and trimethylolpropane (7.8 g, 0.06 mol). The vessel was heated up to 150° C. until the mixture was molten. Then terephthalic acid (506.0 g, 3.0 mol) and isophthalic acid (118.3 g, 0.7 mol) were added and under a nitrogen flow the temperature was gradually increased to 260° C. while distilling off the reaction water until the acid value of the precursor of the polyester resin was between 5 and 15 mg KOH/g; that marked the completion of the first step. For the second step the reaction mixture was cooled to 180° C. and subsequently the adipic acid (38.1 g, 0.3 mol) and isophthalic acid (52.5 g, 0.3 mol) were added. The temperature was raised to 240° C. and the polyester resin was stirred at 240° C., vacuum of 50-70 mbar was applied for 140 minutes, until the acid value of the polyester resin was 27±0.5 mg KOH/g and the hydroxyl value was 5.5±0.5 mg KOH/g. Subsequently, the polyester resin was cooled down to 190° C. (marking the end of the second step). Subsequently, the polyester resin was discharged onto aluminium foil that was kept at room temperature.

The properties of the isolated polyester resin were: amorphous, $M_{nA}$=4760 Da, $M_{wA}$=13600 Da, $D_A$=2.9, $T_{gA}$=60.6° C., $AV_A$=25.8 mg KOH/g resin, $OHV_A$=4.7 mg KOH/g, f=2.6, $N_A$=40.9 Pa·s.

Example 1.5: Synthesis of the Polyester Resin PRA-6

A reactor vessel fitted with a thermometer, a stirrer and a distillation device for the removal of water formed during the synthesis, was filled with butyl stannoic acid (0.3 g) (catalyst), distearyl pentaerythritol diphosphite (0.4 g) (antioxidant), neopentyl glycol (434.7 g, 4.2 mol). The vessel was heated up to 150° C. until the mixture was molten. Then terephthalic acid (509.2 g, 3.1 mol) and isophthalic acid (125.6 g, 0.8 mol) were added and under a nitrogen flow the temperature was gradually increased to 260° C. while distilling off the reaction water until the acid value of the precursor of the polyester resin was between 5 and 15 mg KOH/g; that marked the completion of the first step. For the second step the reaction mixture was cooled to 180° C. and subsequently the adipic acid (38.3 g, 0.3 mol) and isophthalic acid (38.7 g, 0.2 mol) were added. The temperature was raised to 230° C. and the polyester resin was stirred at 230° C., vacuum of 50-70 mbar was applied for 140 minutes, until the acid value of the polyester resin was 21.5±0.5 mg KOH/g and the hydroxyl value was 7±0.5 mg KOH/g. Subsequently, the polyester resin was cooled down to 190° C. (marking the end of the second step). Subsequently, the polyester resin was discharged onto aluminium foil that was kept at room temperature.

The properties of the isolated polyester resin were: amorphous, $M_{nA}$=4410 Da, $M_{wA}$=12100 Da, $D_A$=2.7, $T_{gA}$=58.4° C., $AV_A$=20.7 mg KOH/g resin, $OHV_A$=6.1 mg KOH/g, f=2.1, $N_A$=46.6 Pa·s.

Example 2: Synthesis of the Polyester Resin PRB-1

A reactor vessel fitted with a thermometer, a stirrer and a distillation device for the removal of water formed during the synthesis, was filled with butyl stanoic acid (0.5 g) (catalyst), distearyl pentaerythritol diphosphite (0.8 g) (antioxidant), neopentyl glycol (137.2 g, 1.3 mol), ethylene glycol (200.4 g, 3.2 mol). The vessel was heated up to 150° C. until the mixture was molten. Then isophthalic acid (205.5 g, 1.2 mol), terephthalic acid (446.7 g, 2.7 mol) and adipic acid (51.8 g, 0.4 mol) were added and under a nitrogen flow the temperature was gradually increased to 250° C. while distilling off the reaction water under vacuum of 50-70 mbar for 60 minutes, until the acid value of the precursor of the polyester resin was between 5 and 7 mg KOH/g; that marked the completion of the first step. For the second step the reaction mixture was cooled to 200° C. and subsequently the trimellitic anhydride (111.0 g, 0.6 mol) was added. The temperature was raised to 225° C. and the polyester resin was stirred at 225° C. until the acid value of the polyester resin was 67±0.5 mg KOH/g and the hydroxyl value was 3.5±0.5 mg KOH/g. Subsequently, the polyester resin was discharged onto aluminium foil that was kept at room temperature.

The properties of the isolated polyester resin were: amorphous, $M_{nB}$=3110 Da, $M_{wB}$ 9000 Da, $D_B$=2.9, $T_{gB}$=58.7° C., $AV_B$=65.8 mg KOH/g resin, $OHV_B$=2.5 mg KOH/g, f=3.8, $N_B$=22.6 Pa·s.

Example 2.1: Synthesis of the Polyester Resin PRB-2

A reactor vessel fitted with a thermometer, a stirrer and a distillation device for the removal of water formed during the synthesis, was filled with butyl stannoic acid (0.3 g) (catalyst), distearyl pentaerythritol diphosphite (0.4 g) (antioxidant), neopentyl glycol (164.7 g, 1.6 mol), ethylene glycol (180.4 g, 2.9 mol). The vessel was heated up to 150° C. until the mixture was molten. Then isophthalic acid (202.7 g, 1.2 mol), terephthalic acid (440.6 g, 2.7 mol) and adipic acid (51.1 g, 0.3 mol) were added and under a nitrogen flow the temperature was gradually increased to 250° C. After completion of the reaction under atmospheric conditions, the temperature was decreased to 230° C. At 230° C., more reaction water was distilled off under vacuum of 50-70 mbar for 90 minutes, until the acid value of the precursor of the polyester resin was between 5 and 7 mg KOH/g; that marked the completion of the first step. For the second step the reaction mixture was cooled to 200° C. and subsequently the trimellitic anhydride (111.0 g, 0.6 mol) was added. The temperature was raised to 225° C. and the polyester resin was stirred at 225° C. until the acid value of the polyester resin was 67±0.5 mg KOH/g and the hydroxyl value was 3.5±0.5 mg KOH/g. Subsequently, the polyester resin was discharged onto aluminium foil that was kept at room temperature.

The properties of the isolated polyester resin were: amorphous, $M_{nB}$=3410 Da, $M_{wB}$=11200 Da, $D_B$=3.3, $T_{gB}$=59.4° C., $AV_B$=65.6 mg KOH/g resin, $OHV_B$=2.5 mg KOH/g, f=4.1, $N_B$=29.6 Pa·s.

Example 2.2: Synthesis of the Polyester Resin PRB-3

A reactor vessel fitted with a thermometer, a stirrer and a distillation device for the removal of water formed during the synthesis, was filled with butyl stannoic acid (0.5 g) (catalyst), distearyl pentaerythritol diphosphite (0.8 g) (antioxidant), neopentyl glycol (165.3 g, 1.6 mol), ethylene glycol (176.8 g, 2.8 mol). The vessel was heated up to 150° C. until the mixture was molten. Then terephthalic acid (635.8 g, 3.8 mol) and adipic acid (50.5 g, 0.3 mol) were added and under a nitrogen flow the temperature was gradually increased to 260° C. After completion of the reaction under atmospheric conditions, the temperature was decreased to 230° C. At 230° C., more reaction water was distilled off under vacuum of 50-70 mbar for 60 minutes, until the acid value of the precursor of the polyester resin was between 5 and 8 mg KOH/g; that marked the completion of the first step. For the second step the reaction mixture was cooled to 180° C. and subsequently the trimellitic anhydride (114.3 g, 0.6 mol) was added. The temperature was raised to 225° C. and the polyester resin was stirred at 225° C. until the acid value of the polyester resin was 72.5±0.5 mg KOH/g and the hydroxyl value was 5±0.5 mg KOH/g. Subsequently, the polyester resin was discharged onto aluminium foil that was kept at room temperature.

The properties of the isolated polyester resin were: amorphous, $M_{nB}$=3250 Da, $M_{wB}$=11400 Da, $D_B$=3.5, $T_{gB}$=59.8° C., $AV_B$=71.6 mg KOH/g resin, $OHV_B$=4.4 mg KOH/g, f=4.4, $N_B$=23.6 Pa·s.

Example 2.3: Synthesis of the Polyester Resin PRB-4

A reactor vessel fitted with a thermometer, a stirrer and a distillation device for the removal of water formed during the synthesis, was filled with butyl stannoic acid (0.3 g) (catalyst), distearyl pentaerythritol diphosphite (0.4 g) (antioxidant), neopentyl glycol (110.7 g, 1.1 mol), ethylene glycol (219.6 g, 3.5 mol). The vessel was heated up to 150° C. until the mixture was molten. Then isophthalic acid (208.1 g, 1.3 mol), terephthalic acid (452.3 g, 2.7 mol) and adipic acid (52.5 g, 0.4 mol) were added and under a nitrogen flow the temperature was gradually increased to 250° C. After completion of the reaction under atmospheric conditions, the temperature was decreased to 230° C. At 230° C., more reaction water was distilled off under vacuum of 50-70 mbar for 60 minutes, until the acid value of the precursor of the polyester resin was between 5 and 7 mg KOH/g; that marked the completion of the first step. For the second step the reaction mixture was cooled to 200° C. and subsequently the trimellitic anhydride (111.3 g, 0.6 mol) was added. The temperature was raised to 225° C. and the polyester resin was stirred at 225° C. until the acid value of the polyester resin was 74.5±0.5 mg KOH/g and the hydroxyl value was 6±0.5 mg KOH/g. Subsequently, the polyester resin was discharged onto aluminium foil that was kept at room temperature.

The properties of the isolated polyester resin were: amorphous, $M_{nB}$=3110 Da, $M_{wB}$=8710 Da, DB=2.8, $T_{gB}$=57.8° C., $AV_B$=73.5 mg KOH/g resin, $OHV_B$=5.4 mg KOH/g, f=4.7, $N_B$=18.9 Pa·s.

Example 2.4: Synthesis of the Polyester Resin PRB-5

A reactor vessel fitted with a thermometer, a stirrer and a distillation device for the removal of water formed during the synthesis, was filled with butyl stannoic acid (0.3 g) (catalyst), distearyl pentaerythritol diphosphite (0.4 g) (antioxidant), neopentyl glycol (173.9 g, 1.7 mol), ethylene glycol (180.2 g, 2.9 mol). The vessel was heated up to 150° C. until the mixture was molten. Then terephthalic acid (665.1 g, 4.0 mol) and adipic acid (52.8 g, 0.4 mol) were added and under a nitrogen flow the temperature was gradually increased to 250° C. After completion of the reaction under atmospheric conditions, the temperature was decreased to 230° C. At 230° C., more reaction water was distilled off under vacuum of 50-70 mbar for 60 minutes, until the acid value of the precursor of the polyester resin was between 5 and 7 mg KOH/g; that marked the completion of the first step. For the second step the reaction mixture was cooled to 200° C. and subsequently the trimellitic anhydride (83.8 g, 0.4 mol) was added. The temperature was raised to 225° C. and the polyester resin was stirred at 225° C. until the acid value of the polyester resin was 54.5±0.5 mg KOH/g and the hydroxyl value was 3±0.5 mg KOH/g. Subsequently, the polyester resin was discharged onto aluminium foil that was kept at room temperature.

The properties of the isolated polyester resin were: amorphous, $M_{nB}$=3740 Da, $M_{wB}$=14600 Da, $D_B$=3.9, $T_{gB}$ 61.4° C., $AV_B$=53.7 mg KOH/g resin, $OHV_B$=2.2 mg KOH/g, f=3.7, $N_B$=66.9 Pa·s.

Example 2.5: Synthesis of the Polyester Resin PRB-6

A reactor vessel fitted with a thermometer, a stirrer and a distillation device for the removal of water formed during the synthesis, was filled with butyl stannoic acid (0.3 g) (catalyst), distearyl pentaerythritol diphosphite (0.4 g) (antioxidant), neopentyl glycol (167.4 g, 1.6 mol), ethylene glycol (180.3 g, 2.9 mol). The vessel was heated up to 150° C. until the mixture was molten. Then terephthalic acid (650.4 g, 3.9 mol) and adipic acid (51.7 g, 0.4 mol) were added and under a nitrogen flow the temperature was gradually increased to 250° C. After completion of the reaction under atmospheric conditions, the temperature was decreased to 230° C. At 230° C., more reaction water was distilled off under vacuum of 50-70 mbar for 90 minutes, until the acid value of the precursor of the polyester resin was between 5 and 7 mg KOH/g; that marked the completion of the first step. For the second step the reaction mixture was cooled to 200° C. and subsequently the trimellitic anhydride (102.5 g, 0.5 mol) was added. The temperature was raised to 225° C. and the polyester resin was stirred at 225° C. until the acid value of the polyester resin was 66±0.5 mg KOH/g and the hydroxyl value was 2.5±0.5 mg KOH/g. Subsequently, the polyester resin was discharged onto aluminium foil that was kept at room temperature.

The properties of the isolated polyester resin were: amorphous, $M_{nB}$=3150 Da, $M_{wB}$ 9930 Da, $D_B$=3.2, $T_{gB}$=61.0° C., $AV_B$=65.1 mg KOH/g resin, $OHV_B$=1.7 mg KOH/g, f=3.8, $N_B$=35.3 Pa·s.

Example 3: Synthesis of the Polyester Resin CompPRB-1

A reactor vessel fitted with a thermometer, a stirrer and a distillation device for the removal of water formed during the synthesis, was filled with butyl stanoic acid (0.5 g) (catalyst), distearyl pentaerythritol diphosphite (0.8 g) (anti-oxidant), ethylene glycol (299.5 g, 4.8 mol). The vessel was heated up to 150° C. until the mixture was molten. Then isophthalic acid (219.0 g, 1.3 mol), terephthalic acid (476.0 g, 2.9 mol) and adipic acid (55.2 g, 0.4 mol) were added and under a nitrogen flow the temperature was gradually increased to 250° C. while distilling off the reaction water under vacuum of 50-70 mbar for 60 minutes, until the acid value of the precursor of the polyester resin was between 5 and 7 mg KOH/g; that marked the completion of the first step. For the second step the reaction mixture was cooled to 200° C. and subsequently the trimellitic anhydride (112.8 g, 0.6 mol) was added. The temperature was raised to 225° C. and the polyester resin was stirred at 225° C. until the acid value of the polyester resin was 71±0.5 mg KOH/g and the hydroxyl value was 6.5±0.5 mg KOH/g. Once the acid value and OH-value were reached, the polyester resin was discharged onto aluminium foil that was kept at room temperature.

The properties of the isolated polyester resin were: amorphous, $M_n$=3150 Da, $M_w$=10400 Da, D=3.3, $T_g$=57.6° C., AV=70.1 mg KOH/g resin, OHV=5.5 mg KOH/g, f=4.2, N=16.7 Pa·s.

Example 3.1: Synthesis of the Polyester Resin CompPRB-2

A reactor vessel fitted with a thermometer, a stirrer and a distillation device for the removal of waterformed during the synthesis, was filled with butyl stannoic acid (0.2 g) (catalyst), distearyl pentaerythritol diphosphite (0.4 g) (anti-oxidant), neopentyl glycol (248.3 g, 2.4 mol), ethylene glycol (119.3 g, 1.9 mol). The vessel was heated up to 150° C. until the mixture was molten. Then isophthalic acid (194.0 g, 1.2 mol), terephthalic acid (421.7 g, 2.5 mol) and adipic acid (48.9 g, 0.3 mol) were added and under a nitrogen flow the temperature was gradually increased to 250° C. After completion of the reaction under atmospheric conditions, the temperature was decreased to 230° C. At 230° C., more reaction water was distilled off under vacuum of 50-70 mbar for 60 minutes, until the acid value of the precursor of the polyester resin was between 4 and 7 mg KOH/g; that marked the completion of the first step. For the second step the reaction mixture was cooled to 200° C. and subsequently the trimellitic anhydride (111.6 g, 0.6 mol) was added. The temperature was raised to 225° C. and the polyester resin was stirred at 225° C. until the acid value of the polyester resin was 67±0.5 mg KOH/g and the hydroxyl value was 1±0.5 mg KOH/g. Once the acid value and OH-value were reached, the polyester resin was discharged onto aluminium foil that was kept at room temperature.

The properties of the isolated polyester resin were: amorphous, $M_n$=3290 Da, $M_w$=9520 Da, D=2.9, $T_g$=58.9° C., AV=65.9 mg KOH/g resin, OHV=0.1 mg KOH/g, f=3.9, N=32.3 Pa·s.

Example 3.2: Synthesis of the Polyester Resin CompPRB-3

A reactor vessel fitted with a thermometer, a stirrer and a distillation device for the removal of waterformed during the synthesis, was filled with butyl stannoic acid (0.3 g) (catalyst), distearyl pentaerythritol diphosphite (0.4 g) (anti-oxidant), neopentyl glycol (179.1 g, 1.7 mol), ethylene glycol (181.8 g, 2.9 mol). The vessel was heated up to 150° C. until the mixture was molten. Then terephthalic acid (683.0 g, 4.1 mol) and adipic acid (54.3 g, 0.4 mol) were added and under a nitrogen flow the temperature was gradually increased to 250° C. After completion of the reaction under atmospheric conditions, the temperature was decreased to 230° C. At 230° C., more reaction water was distilled off under vacuum of 50-70 mbar for 120 minutes, until the acid value of the precursor of the polyester resin was between 4 and 7 mg KOH/g; that marked the completion of the first step. For the second step the reaction mixture was cooled to 200° C. and subsequently the trimellitic anhydride (59.2 g, 0.3 mol) was added. The temperature was raised to 225° C. and the polyester resin was stirred at 225° C. until the acid value of the polyester resin was 39±0.5 mg KOH/g and the hydroxyl value was 1.5±0.5 mg KOH/g. Once the acid value and OH-value were reached, the polyester resin was discharged onto aluminium foil that was kept at room temperature.

The properties of the isolated polyester resin were: amorphous, $M_n$=4850 Da, $M_w$=20300 Da, D=4.2, $T_g$=61.2° C., AV=38.2 mg KOH/g resin, OHV=0.5 mg KOH/g, f=3.3, N=96.0 Pa·s.

Example 3.3 Synthesis of the Polyester Resin CompPRB-4

A reactor vessel fitted with a thermometer, a stirrer and a distillation device for the removal of water formed during the synthesis, was filled with distearyl pentaerythritol diphosphite (0.9 g) (anti-oxidant), neopentyl glycol (257.4 g, 2.5 mol), ethylene glycol (100.0 g, 1.6 mol). The vessel was heated up to 150° C. until the mixture was molten. Then isophthalic acid (100.0 g, 0.6 mol), trimellitic anhydride (47.5 g, 0.2 mol) and terephthalic acid (425.4 g, 2.6 mol) were added and under a nitrogen flow the temperature was gradually increased to 250° C. After completing of the reactions, the temperature is decreased to 215° C. At 215° C., isophthalic acid (74.5 g, 0.4 mol) is added. After completion of the reaction under atmospheric conditions, the temperature was decreased to 200° C. At 200° C., more reaction water was distilled off under vacuum of 50-70 mbar for 90 minutes, until the acid value of the precursor of the polyester resin was between 25 and 28 mg KOH/g; that marked the completion of the second step. For the third step the reaction trimellitic anhydride (125.9 g, 0.7 mol) was added. The temperature was kept at 200° C. and the polyester resin was stirred at 200° C. until the acid value of the polyester resin was 104±0.5 mg KOH/g and the hydroxyl value was 1.5±0.5 mg KOH/g. Once the acid value and OH-value were reached, the polyester resin was discharged onto aluminium foil that was kept at room temperature.

The properties of the isolated polyester resin were: amorphous, $M_n$=2780 Da, $M_w$=8330 Da, D=3.0, $T_g$=71.1° C., AV=103.0 mg KOH/g resin, OHV=0.5 mg KOH/g, f=5.1, N=79.0 Pa·s.

Example 3.4: Synthesis of the Polyester Resin CompPRA-1

A reactor vessel fitted with a thermometer, a stirrer and a distillation device for the removal of waterformed during the synthesis, was filled with butyl stannoic acid (0.3 g) (catalyst), distearyl pentaerythritol diphosphite (0.4 g) (antioxidant), neopentyl glycol (439.3 g, 4.2 mol). The vessel was heated up to 150° C. until the mixture was molten. Then terephthalic acid (511.3 g, 3.1 mol) and isophthalic acid (131.4 g, 0.8 mol) were added and under a nitrogen flow the temperature was gradually increased to 260° C. while distilling off the reaction water until the acid value of the precursor of the polyester resin was between 9 and 16 mg KOH/g; that marked the completion of the first step. For the second step the reaction mixture was cooled to 180° C. and subsequently the adipic acid (38.5 g, 0.3 mol) and isophthalic acid (27.5 g, 0.2 mol) were added. The temperature was raised to 240° C. and the polyester resin was stirred at 240° C., vacuum of 50-75 mbar was applied for 300 minutes, until the acid value of the polyester resin was 12±0.5 mg KOH/g and the hydroxyl value was 3±0.5 mg KOH/g. Subsequently, the polyester resin was cooled down to 190° C. (marking the end of the second step). Subsequently, the polyester resin was discharged onto aluminium foil that was kept at room temperature.

The properties of the isolated polyester resin were: amorphous, $M_n$=6160 Da, $M_w$=19800 Da, D=3.2, $T_g$=61.9° C., AV=11.0 mg KOH/g resin, OHV=2.3 mg KOH/g, f=1.5, N=287 Pa·s.

Example 3.5: Synthesis of the Polyester Resin CompPRA-2

A reactor vessel fitted with a thermometer, a stirrer and a distillation device for the removal of waterformed during the synthesis, was filled with butyl stannoic acid (0.2 g) (catalyst), distearyl pentaerythritol diphosphite (0.4 g) (antioxidant), neopentyl glycol (421.5 g, 4.0 mol). The vessel was heated up to 150° C. until the mixture was molten. Then terephthalic acid (487.6 g, 2.9 mol) and isophthalic acid (102.8 g, 0.6 mol) were added and under a nitrogen flow the temperature was gradually increased to 260° C. while distilling off the reaction water until the acid value of the precursor of the polyester resin was between 6 and 15 mg KOH/g; that marked the completion of the first step. For the second step the reaction mixture was cooled to 180° C. and subsequently the adipic acid (36.7 g, 0.3 mol) and isophthalic acid (93.4 g, 0.6 mol) were added. The temperature was raised to 240° C. and the polyester resin was stirred at 240° C., vacuum of 50-75 mbar was applied for 90 minutes, until the acid value of the polyester resin was 42.5±0.5 mg KOH/g and the hydroxyl value was 1.5±0.5 mg KOH/g. Subsequently, the polyester resin was cooled down to 190° C. (marking the end of the second step). Subsequently, the polyester resin was discharged onto aluminium foil that was kept at room temperature.

The properties of the isolated polyester resin were: amorphous, $M_n$=3150 Da, $M_w$=8380 Da, D=2.7, $T_g$=58.4° C., AV=41.6 mg KOH/g resin, OHV=0.7 mg KOH/g, f=2.4, N=22.4 Pa·s.

6.14 Preparation of the 1K Thermosetting Powder Coating Compositions InvPCC A-1-InvPCC A-12 (Examples 4, 7, 8, 11, 12, 15, 16, 17, 19, 20, 22, 23) and 1K Thermosetting Powder Coating Compositions CompPCC A-1-CompPCC A-8 (Examples 5, 6, 9, 10, 13, 14, 18, 21)

The preparation of each of the thermosetting powder coating compositions InvPCC A-1-InvPCC A-12 (Examples 4, 7, 8, 11, 12, 15, 16, 17, 19, 20, 22, 23) and CompPCC A-1-CompPCC A-8 (Examples 5, 6, 9, 10, 13, 14, 18, 21) was carried out separately and according to the following general process: at first the polyester resins which form part of each of their binders were mixed in 50/50 weight ratio to obtain the polyester binder mixture. Subsequently the polyester binder mixture was introduced into a blender together with the rest of the components of the thermosetting powder coating composition. After thorough blending, the resultant mixture was melt-extruded in a PRISM TSE 16PC twin screw extruder at 120° C. at a screw speed of 200 RPM and a torque higher than 90%. The extrudate was allowed to cool at room temperature and it was subsequently broken into chips. Subsequently, the chips were then ground in an ultra-centrifugal mill type Pulverisette 14, from FRITSCH GmbH at 14000 rpm and sieved with the use Analysette 3 Spartan from FRITSCH GmbH. The sieve fraction with particle size below 90 μm was collected (by means of a Fritsch GmbH Analysette 3 Spartan sieving apparatus equipped with a 90 micron sieve, sieving performed for 15 minutes at 2.5 mm amplitude) thus obtaining the thermosetting powder coating composition.

6.15 Preparation of Powder Coatings InvPC A-1-InvPC A-12 (Examples 26, 29, 30, 33, 34, 37, 38, 39, 41, 42, 44, 45) and Powder Coatings CompPC A-1-CompPCC A-8 (Examples 27, 28, 31, 32, 35, 36, 40, 43)

Once the thermosetting powder coating compositions InvPCC A-1-InvPCC A-12 (Examples 4, 7, 8, 11, 12, 15, 16, 17, 19, 20, 22, 23) and CompPCC A-1-CompPCC A-8 (Examples 5, 6, 9, 10, 13, 14, 18, 21) were prepared, they were electrostatically sprayed (corona, 60 kV) onto 0.8 mm thick chromate aluminium Q-panels (type: ALQ-46) to a coating thickness to suit each test mentioned herein, and cured individually for 10 minutes at: 160, 170, 180, 190 and 200° C. in an air-circulation oven (Heraeus Instruments UT6120) at atmospheric pressure to provide white powder coatings.

6.16 Preparation of the Comparative 2K Thermosetting Powder Coating Composition of Example 24

The preparation of the comparative 2K thermosetting powder coating composition of Example 24 was carried out according to the following process:

Step 1: Preparation of the powder composition 1 via melt-extrusion

The ingredients of the powder composition 1 were:

|  | Powder composition 1 |
| --- | --- |
| Polyester resin | PRA-1 (289 g) |
| Crosslinker | PRIMID ® XL 552 (11 g) |
| White pigment | Kronos ® 2360 (150 g) |
| Flow control agent | Resiflow PV-5 (4.5 g) |
| Air release agent | Benzoin (1.25 g) |

All the above ingredients were introduced into a blender. After thorough blending, the resultant mixture was melt-extruded in a PRISM TSE 16PC twin screw extruder at 120° C. at a screw speed of 200 RPM and a torque higher than 90%. The extrudate was allowed to cool at room temperature and it was subsequently broken into chips. Subsequently, the chips were then ground in an ultra-centrifugal mill type Pulverisette 14, from FRITSCH GmbH at 14000 rpm and sieved with the use Analysette 3 Spartan from FRITSCH GmbH. The sieve fraction with particle size below 90 μm was collected (by means of a Fritsch GmbH Analysette 3 Spartan sieving apparatus equipped with a 90 micron sieve, sieving performed for 15 minutes at 2.5 mm amplitude) thus obtaining the powder composition 1.

Step 2: Preparation of the powder composition 2 via melt-extrusion

The ingredients of the powder composition 2 were:

|  | Powder composition 2 |
|---|---|
| Polyester resin | PRB-1 (271 g) |
| Crosslinker | PRIMID ® XL 552 (29 g) |
| White pigment | Kronos ® 2360 (150 g) |
| Flow control agent | Resiflow PV-5 (4.5 g) |
| Air release agent | Benzoin (1.25 g) |

All the above ingredients were introduced into a blender. After thorough blending, the resultant mixture was melt-extruded in a PRISM TSE 16PC twin screw extruder at 120° C. at a screw speed of 200 RPM and a torque higher than 90%. The extrudate was allowed to cool at room temperature and it was subsequently broken into chips. Subsequently, the chips were then ground in an ultra-centrifugal mill type Pulverisette 14, from FRITSCH GmbH at 14000 rpm and sieved with the use Analysette 3 Spartan from FRITSCH GmbH. The sieve fraction with particle size below 90 μm was collected (by means of a Fritsch GmbH Analysette 3 Spartan sieving apparatus equipped with a 90 micron sieve, sieving performed for 15 minutes at 2.5 mm amplitude) thus obtaining the powder composition 2.

Step 3: Preparation of the comparative 2K thermosetting powder coating composition of Example 24 via physical mixing The powder composition 1 (34 g) and the powder composition 2 (36 g)—each of which is a separate and distinct powder of different chemical composition—were physically mixed by introducing them into a plastic container (200 mL) which was subsequently closed and thoroughly shaken by hand for 2 minutes.

The weight ratio of the weight amount of the PRA-1 to the weight amount of the PRB-1 in the comparative 2 k thermosetting powder coating composition of Example 24, was equal to 1.

The comparative Example 24 (2K thermosetting powder coating composition) may be compared with the inventive Example 4 (1K thermosetting powder coating composition) (2K vs. 1K powders; see Table 7).

6.17 Preparation of the Comparative 2K Thermosetting Powder Coating Composition of Example 25

The preparation of the comparative 2K thermosetting powder coating composition of Example 25 was carried out according to the following process:

Step 1: Preparation of the powder composition 1 via melt-extrusion

The ingredients of the powder composition 1 were:

|  | Powder composition 1 |
|---|---|
| Polyester resin | PRA-1 (289 g) |
| Crosslinker | PRIMID ® XL 552 (11 g) |
| White pigment | Kronos ® 2360 (150 g) |
| Flow control agent | Resiflow PV-5 (4.5 g) |
| Air release agent | Benzoin (1.25 g) |

All the above ingredients were introduced into a blender. After thorough blending, the resultant mixture was melt-extruded in a PRISM TSE 16PC twin screw extruder at 120° C. at a screw speed of 200 RPM and a torque higher than 90%. The extrudate was allowed to cool at room temperature and it was subsequently broken into chips. Subsequently, the chips were then ground in an ultra-centrifugal mill type Pulverisette 14, from FRITSCH GmbH at 14000 rpm and sieved with the use Analysette 3 Spartan from FRITSCH GmbH. The sieve fraction with particle size below 90 μm was collected (by means of a Fritsch GmbH Analysette 3 Spartan sieving apparatus equipped with a 90 micron sieve, sieving performed for 15 minutes at 2.5 mm amplitude) thus obtaining the powder composition 1.

Step 2: Preparation of the powder composition 2 via melt-extrusion

The ingredients of the powder composition 2 were:

|  | Powder composition 2 |
|---|---|
| Polyester resin | PRB-1 (271 g) |
| Crosslinker | PRIMID ® XL 552 (29 g) |
| White pigment | Kronos ® 2360 (150 g) |
| Flow control agent | Resiflow PV-5 (4.5 g) |
| Air release agent | Benzoin (1.25 g) |

All the above ingredients were introduced into a blender. After thorough blending, the resultant mixture was melt-extruded in a PRISM TSE 16PC twin screw extruder at 120° C. at a screw speed of 200 RPM and a torque higher than 90%. The extrudate was allowed to cool at room temperature and it was subsequently broken into chips. Subsequently, the chips were then ground in an ultra-centrifugal mill type Pulverisette 14, from FRITSCH GmbH at 14000 rpm and sieved with the use Analysette 3 Spartan from FRITSCH GmbH. The sieve fraction with particle size below 90 μm was collected (by means of a Fritsch GmbH Analysette 3 Spartan sieving apparatus equipped with a 90 micron sieve, sieving performed for 15 minutes at 2.5 mm amplitude) thus obtaining the powder composition 2.

Step 3: Preparation of the comparative 2K thermosetting powder coating composition of Example 25 via physical mixing The powder composition 1 (41 g) and the powder composition 2 (29 g)—each of which is a separate and distinct powder of different chemical composition—were physically mixed by introducing them into a plastic container (200 mL) which was subsequently closed and thoroughly shaken by hand for 2 minutes.

The weight ratio of the weight amount of the PRA-1 to the weight amount of the PRB-1 in the comparative 2 k thermosetting powder coating composition of Example 25, was equal to 1.5.

The comparative Example 25 (2K thermosetting powder coating composition) may be compared with the inventive Example 7 (1K thermosetting powder coating composition) (2K vs. 1K powders; see Table 7).

6.18 Preparation of the Powder Coating CompPC A-9 (Example 46) Prepared Upon Heat Curing of the Corresponding 2K Thermosetting Powder Coating Composition of Example 24

Once the comparative 2K thermosetting powder coating composition of Example 24 was prepared, it was electrostatically sprayed (corona, 60 kV) onto 0.8 mm thick chromate aluminium Q-panels (type: ALQ-46) to a coating thickness to suit each test mentioned herein, and cured individually for 10 minutes at: 160, 170, 180, 190 and 200°

C. in an air-circulation oven (Heraeus Instruments UT6120) at atmospheric pressure to provide white powder coatings.

6.19 Preparation of the Powder Coating CompPC A-10 (Example 47) Prepared Upon Heat Curing of the Corresponding 2K Thermosetting Powder Coating Composition of Example 25

Once the comparative 2K thermosetting powder coating composition of Example 25 was prepared, it was electrostatically sprayed (corona, 60 kV) onto 0.8 mm thick chromate aluminium Q-panels (type: ALQ-46) to a coating thickness to suit each test mentioned herein, and cured individually for 10 minutes at: 160, 170, 180, 190 and 200° C. in an air-circulation oven (Heraeus Instruments UT6120) at atmospheric pressure to provide white powder coatings.

6.20 Preparation of Formulations for the SD-BTB-Gloss60° Measurements

For the (inventive) Example 4, the SD-BTB-gloss60° was the result of the following two variations of the formulation of Example 4: i) PRA-1 (batch 1) and PRB-1, and ii) PRA-1 (batch 2) and PRB-1. In each of these two formulations the rest of the ingredients as shown in the Example 4, remained the same, and the SD-BTB-gloss60° was measured as disclosed in the specification.

For the (comparative) Example 5, the SD-BTB-gloss60° was the result of the following two variations of the formulation of Example 5: i) PRA-1 (batch 1) and CompPRB-1, and ii) PRA-1 (batch 2) and CompPRB-1. In each of these two formulations the rest of the ingredients as shown in the Example 4, remained the same, and the SD-BTB-gloss60° was measured as disclosed in the specification.

For the (comparative) Example 14, the SD-BTB-gloss60° was the result of the following two variations of the formulation of Example 14: i) PRA-1 (batch 1) and CompPRB-2, and ii) PRA-1 (batch 2) and CompPRB-2. In each of these two formulations the rest of the ingredients as shown in the Example 14, remained the same, and the SD-BTB-gloss60° was measured as disclosed in the specification.

For the (inventive) Example 15, the SD-BTB-gloss60° was the result of the following two variations of the formulation of Example 15: i) PRA-1 (batch 1) and PRB-2, and ii) PRA-1 (batch 2) and PRB-2. In each of these two formulations the rest of the ingredients as shown in the Example 15, remained the same, and the SD-BTB-gloss60° was measured as disclosed in the specification.

For the (inventive) Example 16, the SD-BTB-gloss60° was the result of the following two variations of the formulation of Example 16: i) PRA-1 (batch 1) and PRB-3, and ii) PRA-1 (batch 2) and PRB-3. In each of these two formulations the rest of the ingredients as shown in the Example 16, remained the same, and the SD-BTB-gloss60° was measured as disclosed in the specification.

For the (inventive) Example 17, the SD-BTB-gloss60° was the result of the following two variations of the formulation of Example 17: i) PRA-1 (batch 1) and PRB-4, and ii) PRA-1 (batch 2) and PRB-4. In each of these two formulations the rest of the ingredients as shown in the Example 17, remained the same, and the SD-BTB-gloss60° was measured as disclosed in the specification.

For the (comparative) Example 21, the SD-BTB-gloss60° was the result of the following two variations of the formulation of Example 21: i) PRA-1 (batch 1) and CompPRB-4, and ii) PRA-1 (batch 2) and CompPRB-4. In each of these two formulations the rest of the ingredients as shown in the Example 21, remained the same, and the SD-BTB-gloss60° was measured as disclosed in the specification.

The PRA-1 (batch 1) is the one described in Example 1.
The PRA-1 (batch 2) was a duplicate of Example 1 and had similar properties as the PRA-1 (batch 1).

TABLE 1

Examples 4 and 5 (compositions) and 26 to 27 (coatings) and their corresponding properties

| | Example 4 InvPCC A-1 | Example 5 CompPCC A-1 |
|---|---|---|
| Binder | PRA-1 (140 g) PRB-1 (140 g) PRIMID ® XL 552 (20 g) | PRA-1 (140 g) CompPRB-1 (140 g) PRIMID ® XL 552 (20 g) |
| White pigment | Kronos ® 2360 (150 g) | Kronos ® 2360 (150 g) |
| Flow control agent | Resiflow PV-5 (4.5 g) | Resiflow PV-5 (4.5 g) |
| Air release agent | Benzoin (1.25 g) | Benzoin (1.25 g) |
| Propertes of the thermosetting powder coating compositions | | |
| PSS | Good | Poor |
| Properties of the Powder Coatings | Example 26 InvPC A-1 | Example 27 CompPC A-1 |
| SD-gloss60° | 1.0 | 3.5 |
| SD-BTB-gloss60° | 1.0 | 4.0 |
| Gloss60°-180 | 18 | 49 |
| Impact resistant | Yes | No |
| Matt powder coating | Yes | No |
| Low gloss consistency | Excellent | No |
| Batch-to-Batch low gloss consistency | Excellent | No |

The thermosetting powder coating composition CompPCC A-1 and its (powder coating CompPC A-1) is a comparative thermosetting powder coating composition because it does not read on the (inventive) one-component (1K) thermosetting powder coating composition A (PCC A) of the invention as the latter are disclosed herein. The reason is that the polyester resin CompPRB-1 is a comparative polyester resin because it does not read on the PRB as the latter is disclosed herein because the component B1 of the CompPRB-1 is different than the component B1 of the PRB as the component B1 is disclosed herein. The component B1 of the CompPRB-1 does not comprise any diol-1b and the diol-B1a (ethylene glycol in the CompPRB-1) counts for 100% of the component B1.

In the Example 26 (Table 1), the InvPC A-1 was a matt powder coating (gloss60°-180 of 18), and had a SD-gloss60° of 1.0. Therefore, the InvPC A1 demonstrated excellent low gloss consistency. Contrary to that, the CompPC A-1 of Example 27 (Table 1), was not a matt powder coating since it had a gloss60°-180 higher than 45, thus this powder coating did not demonstrate low gloss consistency.

In the Example 26 (Table 1), the InvPC A-1 was a matt powder coating (gloss60°-180 of 18), and had a SD-BTB-gloss60° of 1.0. Therefore, the InvPC A1 demonstrated excellent batch-to-batch low gloss consistency. Contrary to that, the CompPC A-1 of Example 27 (Table 1), was not a matt powder coating since it had a gloss60°-180 higher than 45, thus this powder coating did not demonstrate batch-to-batch low gloss consistency.

In conclusion the results shown in Table 1 demonstrated that only the composition of the inventive Example 4 that meet and all the requirements of the claimed invention provided for 1K thermosetting powder coating compositions which had at least good PSS (physical storage stability), and at the same time these compositions provided—upon curing—impact resistant matt powder coatings (without the use of matting additives/agents e.g. silicas, waxes) which had excellent low gloss consistency and excellent batch-to-batch low gloss consistency. The comparative Example 5 failed to afford matt powder coatings, failed to afford impact resistant matt powder coatings and as a result exhibited no low gloss consistency, and no batch-to-batch low gloss consistency.

TABLE 2

Examples 6 to 9 (compositions) and 28 to 31 (coatings) and their corresponding properties

|  | Example 6 CompPCC A-2 | Example 7 InvPCC A-2 | Example 8 InvPCC A-3 | Example 9 CompPCC A-3 |
|---|---|---|---|---|
| Binder | PRA-1 (83 g) PRB-1 (193 g) PRIMID ® XL 552 (24 g) | PRA-1 (168 g) PRB-1 (112 g) PRIMID ® XL 552 (19 g) | PRA-1 (198 g) PRB-1 (85 g) PRIMID ® XL 552 (17 g) | PRA-1 (228 g) PRB-1 (57 g) PRIMID ® XL 552 (14 g) |
| White pigment | Kronos ® 2360 (150 g) | Kronos ® 2360 (150 g) | Kronos ® 2360 (150 g) | Kronos ® 2360 (150 g) |
| Flow control agent | Resiflow PV-5 (4.5 g) | Resiflow PV-5 (4.5 g) | Resiflow PV-5 (4.5 g) | Resiflow PV-5 (4.5 g) |
| Air release agent | Benzoin (1.25 g) | Benzoin (1.25 g) | Benzoin (1.25 g) | Benzoin (1.25 g) |
| Properties of the thermosetting powder coating compositions |  |  |  |  |
| PSS | Very Poor | Good | Good | n.m. |
| Properties of the Powder Coatings | Example 28 CompPC A-2 | Example 29 InvPC A-2 | Example 30 InvPC A-3 | Example 31 CompPC A-3 |
| SD-gloss60° | 2.7 | 2.8 | 1.5 | 0.5 |
| SD-BTB-gloss60° | n.m. | n.m. | n.m. | n.m. |
| Gloss60°-180 | 97 | 37 | 43 | 49 |
| Impact resistant | Yes | Yes | Yes | No |
| Matt powder coating | No | Yes | Yes | No |
| Low gloss consistency | No | Sufficient | Excellent | No |
| Batch-to-Batch low gloss consistency | No | n.m. | n.m. | No |

TABLE 3

Examples 10 to 13 (compositions) and 32 to 35 (coatings) and their corresponding properties

|  | Example 10 CompPCC A-4 | Example 11 InvPCC A-4 | Example 12 InvPCC A-5 | Example 13 CompPCC A-5 |
|---|---|---|---|---|
| Binder | CompPRA-1 (140 g) PRB-1 (140 g) PRIMID ® XL 552 (20 g) | PRA-2 (140.5 g) PRB-1 (140 g) PRIMID ® XL 552 (19.5 g) | PRA-3 (140 g) PRB-1 (140 g) PRIMID ® XL 552 (20 g) | CompPRA-2 (140 g) PRB-1 (140 g) PRIMID ® XL 552 (20 g) |
| White pigment | Kronos ® 2360 (150 g) | Kronos ® 2360 (150 g) | Kronos ® 2360 (150 g) | Kronos ® 2360 (150 g) |
| Flow control agent | Resiflow PV-5 (4.5 g) | Resiflow PV-5 (4.5 g) | Resiflow PV-5 (4.5 g) | Resiflow PV-5 (4.5 g) |
| Air release agent | Benzoin (1.25 g) | Benzoin (1.25 g) | Benzoin (1.25 g) | Benzoin (1.25 g) |
| Properties of the thermosetting powder coating compositions |  |  |  |  |
| PSS | n.m. | Good | Very Good | Very Good |
| Properties of the Powder Coatings | Example 32 CompPC A-4 | Example 33 InvPC A-4 | Example 34 InvPC A-5 | Example 35 CompPC A-5 |
| SD-gloss60° | 1.3 | 1.6 | 1.3 | 5.4 |
| SD-BTB-gloss60° | n.m. | n.m. | n.m. | n.m. |
| Gloss60°-180 | 9 | 16 | 39 | 78 |
| Impact resistant | No | Yes | Yes | Yes |

TABLE 3-continued

Examples 10 to 13 (compositions) and 32 to 35 (coatings) and their corresponding properties

| | | | | |
|---|---|---|---|---|
| Matt powder coating | Yes | Yes | Yes | No |
| Low gloss consistency | Excellent | Excellent | Excellent | No |
| Batch-to-Batch low gloss consistency | n.m. | n.m. | n.m. | No |

TABLE 4

Examples 14 to 17 and 5 (compositions) and 36 to 39 and 27 (coatings) and their corresponding properties

| | Example 14<br>CompPCC A-6 | Example 15<br>InvPCC A-6 | Example 16<br>InvPCC A-7 | Example 17<br>InvPCC A-8 | Example 5<br>CompPCC A-1 |
|---|---|---|---|---|---|
| Binder | PRA-1 (140 g)<br>CompPRB-2 (140 g)<br>PRIMID ® XL<br>552 (20 g) | PRA-1 (140 g)<br>PRB-3 (140 g)<br>PRIMID ® XL<br>552 (20 g) | PRA-1 (140 g)<br>PRB-2 (140 g)<br>PRIMID ® XL<br>552 (20 g) | PRA-1 (140 g)<br>PRB-4 (140 g)<br>PRIMID ® XL<br>552 (20 g) | PRA-1 (140 g)<br>CompPRB-1 (140 g)<br>PRIMID ® XL<br>552 (20 g) |
| White pigment | Kronos ® 2360 (150 g) | Kronos ® 2360 (150 g) | Kronos ® 2360 (150 g) | Kronos ® 2360 (150 g) | Kronos ® 2360 (150 g) |
| Flow control agent | Resiflow PV-5 (4.5 g) | Resiflow PV-5 (4.5 g) | Resiflow PV-5 (4.5 g) | Resiflow PV-5 (4.5 g) | Resiflow PV-5 (4.5 g) |
| Air release agent | Benzoin (1.25 g) | Benzoin (1.25 g) | Benzoin (1.25 g) | Benzoin (1.25 g) | Benzoin (1.25 g) |
| Properties of the thermosetting powder coating compositions | | | | | |
| PSS | Insufficient | Very Good | Very Good | Good | Poor |
| Properties of the Powder Coatings | Example 36<br>CompPC A-6 | Example 37<br>InvPC A-6 | Example 38<br>InvPC A-7 | Example 39<br>InvPC A-8 | Example 27<br>CompPC A-1 |
| SG-gloss60° | 2.4 | 1 | 0.4 | 0.4 | 3.5 |
| SD-BTB-gloss60° | 16 | 1.4 | 1.4 | 0.7 | 4.0 |
| Gloss60°-180 | 87 | 18 | 18 | 19 | 49 |
| Impact resistant | Yes | Yes | Yes | Yes | No |
| Matt powder coating | No | Yes | Yes | Yes | No |
| Low gloss consistency | No | Excellent | Excellent | Excellent | No |
| Batch-to-Batch low gloss consistency | No | Excellent | Excellent | Excellent | No |

TABLE 5

Examples 18 to 21 (compositions) and 40 to 43 (coatings) and their corresponding properties

| | Example 18<br>CompPCC A-7 | Example 19<br>InvPCC A-9 | Example 20<br>InvPCC A-10 | Example 21<br>CompPCC A-8 |
|---|---|---|---|---|
| Binder | PRA-1 (140 g)<br>CompPRB-3 (140 g)<br>PRIMID ® XL 552 (20 g) | PRA-6 (140 g)<br>PRB-5 (140 g)<br>PRIMID ® XL 552 (20 g) | PRA-1 (140 g)<br>PRB-6 (140 g)<br>PRIMID ® XL 552 (20 g) | PRA-1 (137 g)<br>CompPRB-4 (137 g)<br>PRIMID ® XL 552 (26 g) |
| White pigment | Kronos ® 2360 (150 g) | Kronos ® 2360 (150 g) | Kronos ® 2360 (150 g) | Kronos ® 2360 (150 g) |
| Flow control agent | Resiflow PV-5 (4.5 g) | Resiflow PV-5 (4.5 g) | Resiflow PV-5 (4.5 g) | Resiflow PV-5 (4.5 g) |
| Air release agent | Benzoin (1.25 g) | Benzoin (1.25 g) | Benzoin (1.25 g) | Benzoin (1.25 g) |
| Properties of the thermosetting powder coating compositions | | | | |
| PSS | Very Good | Good | Very Good | n.m. |
| Properties of the Powder Coatings | Example 40<br>CompPC A-7 | Example 41<br>InvPC A-9 | Example 42<br>InvPC A-10 | Example 43<br>CompPC A-8 |
| SD-gloss60° | 1.6 | 0.4 | 0.5 | 5.8 |
| SD-BTB-gloss60° | n.m. | n.m. | n.m. | 5.3 |
| Gloss60°-180 | 92 | 25 | 16 | 32 |
| Impact resistant | Yes | Yes | Yes | No |
| Matt powder coating | No | Yes | Yes | Yes |
| Low gloss consistency | No | Excellent | Excellent | Insufficient |
| Batch-to-Batch low gloss consistency | No | n.m. | n.m. | Insufficient |

TABLE 6

Examples 22 to 23 (compositions) and 44 to 45 (coatings) and their corresponding properties

|  | Example 22<br>InvPCC A-11 | Example 23<br>InvPCC A-12 |
|---|---|---|
| Binder | PRA-4 (140 g)<br>PRB-6 (140 g)<br>PRIMID ® XL 552 (20 g) | PRA-5 (140 g)<br>PRB-6 (140 g)<br>PRIMID ® XL 552 (20 g) |
| White pigment | Kronos ® 2360 (150 g) | Kronos ® 2360 (150 g) |
| Flow control agent | Resiflow-10 PV-5 (4.5 g) | Resiflow PV-5 (4.5 g) |
| Air release agent | Benzoin (1.25 g) | Benzoin (1.25 g) |
| Properties of the thermosetting powder coating compositions |  |  |
| PSS | Good | Good |
| Properties of the Powder Coatings | Example 44<br>InvPC A-11 | Example 45<br>InvPC A-12 |
| SD-gloss60° | 0.4 | 0.9 |
| SD-BTB-gloss60° | n.m. | n.m. |
| Gloss60°-180 | 17 | 20 |
| Impact resistant | Yes | Yes |
| Matt powder coating | Yes | Yes |
| Low gloss consistency | Excellent | Excellent |
| Batch-to-Batch low gloss consistency | n.m. | n.m. |

TABLE 7

Examples 24, 25, 4 and 7 (compositions) and 46, 47, 26 and 29 (coatings), and their corresponding properties

|  | Example 24<br>Comparative 2K | Example 4<br>InvPCC A-1 | Example 25<br>Comparative 2K | Example 7<br>InvPCC A-2 |
|---|---|---|---|---|
| Binder | thermosetting powder coating composition (see §6.16 in the Examples section) | PRA-1 (140 g)<br>PRB-1 (140 g)<br>PRIMID ® XL 552 (20 g) | thermosetting powder coating composition (see §6.17 in the Examples section) | PRA-1 (168 g)<br>PRB-1 (112 g)<br>PRIMID ® XL 552 (19 g) |
| White pigment |  | Kronos ® 2360 (150 g) |  | Kronos ® 2360 (150 g) |
| Flow control agent |  | Resiflow PV-5 (4.5 g) |  | Resiflow PV-5 (4.5 g) |
| Air release agent |  | Benzoin (1.25 g) |  | Benzoin (1.25 g) |
| Properties of the thermosetting powder coating compositions |  |  |  |  |
| PSS | Insufficient | Good | Good | Good |
| Properties of the Powder Coatings | Example 46<br>CompPC A-9 | Example 26<br>InvPC A-1 | Example 47<br>CompPC A-10 | Example 29<br>InvPC A-2 |
| SD-gloss60° | 5.9 | 1.0 | 41 | 2.8 |
| SD-BTB-gloss60° | n.m. | 1.0 | n.m. | n.m. |
| Gloss60°-180 | 34 | 18 | 34 | 37 |
| Impact resistant | No | Yes | No | Yes |
| Matt powder coating | Yes | Yes | Yes | Yes |
| Low gloss consistency | Insufficient | Excellent | Insufficient | Sufficient |
| Batch-to-Batch low gloss consistency | n.m. | Excellent | n.m. | n.m. |

The results shown in Table 2 demonstrated the criticality and purposiveness of the claimed range for the weight ratio of the weight amount of PRA to the weight amount of PRB (R=weight of PRA/weight of PRB). More particularly, only the inventive Examples 7 and 8 (wherein the R was 1.5 and 2.3, respectively) provided for 1K thermosetting powder coating compositions which had at least good PSS (physical storage stability), and at the same time these compositions provided—upon curing-impact resistant matt powder coatings (without the use of matting additives/agents e.g. silicas, waxes) which had at least sufficient low gloss consistency. The comparative Example 6 (wherein the R was 0.43) provided for 1K thermosetting powder coating compositions of very poor physical storage stability and afforded high gloss powder coatings and as a result exhibited no low gloss consistency, and no batch-to-batch low gloss consistency. The comparative Example 9 (wherein the R was 4.5) failed to afford matt powder coatings, failed to afford impact resistant matt powder coatings and as a result exhibited no low gloss consistency, and no batch-to-batch low gloss consistency.

The results shown in Table 3 demonstrated the criticality and purposiveness of the claimed range for the acid value of the PRA. More particularly, only the inventive Examples 11 and 12 (wherein the $AV_A$ was 15.7 and 31.9 mg KOH/g resin) provided for 1K thermosetting powder coating compositions which had at least good PSS (physical storage stability), and at the same time these compositions provided—upon curing—impact resistant matt powder coatings (without the use of matting additives/agents e.g. silicas, waxes) which had excellent low gloss consistency. The comparative Example 10 (wherein the AV was 11.0 mg KOH/g resin) failed to afford impact resistant matt powder coatings. The comparative Example 13 (wherein the AV was 41.6 mg KOH/g resin) afforded high gloss powder coatings and as a result exhibited no low gloss consistency, and no batch-to-batch low gloss consistency.

The results shown in Table 4 demonstrated the criticality and purposiveness of the claimed range for amount of the diol-B1a of the PRB. More particularly, only the inventive Examples 15-17 [wherein the amount of the diol-B1a (ethylene glycol) ranged from 64 to 77% of the total amount of moles making up the B1] provided for 1K thermosetting powder coating compositions which had at least good PSS (physical storage stability), and at the same time these compositions provided—upon curing—impact resistant matt powder coatings (without the use of matting additives/agents e.g. silicas, waxes) which had excellent low gloss consistency and excellent batch-to-batch low gloss consistency. The comparative Example 14 (wherein the amount of the ethylene glycol was 45% of the total amount of moles making up the B1) afforded high gloss powder coatings and as a result exhibited no low gloss consistency, and no batch-to-batch low gloss consistency. The comparative Example 5 (wherein the amount of the ethylene glycol was 100% of the total amount of moles making up the B1) failed to afford matt powder coatings, failed to afford impact resistant matt powder coatings and as a result exhibited no low gloss consistency, and no batch-to-batch low gloss consistency.

The results shown in Table 5 demonstrated the criticality and purposiveness of the claimed range for the acid value of the PRB. More particularly, only the inventive Examples 19 and 20 (wherein the $AV_B$ was 53.7 and 65.1 mg KOH/g resin) provided for 1K thermosetting powder coating compositions which had at least good PSS (physical storage stability), and at the same time these compositions provided—upon curing—impact resistant matt powder coatings (without the use of matting additives/agents e.g. silicas, waxes) which had excellent low gloss consistency. The comparative Example 18 (wherein the AV was 38.2 mg KOH/g resin) afforded high gloss powder coatings and as a result exhibited no low gloss consistency, and no batch-to-batch low gloss consistency. The comparative Example 21 (wherein the AV was 103.0 mg KOH/g resin) failed to afford impact resistant matt powder coatings and exhibited insufficient low gloss consistency, and insufficient batch-to-batch low gloss consistency.

The results shown in Table 6 demonstrated that once 1K thermosetting powder coating compositions were used each of them having PRA resins of different functionality ($f_A$) though within the claimed range for the functionality of the PRA resins [Example 22 ($f_A$=2.4), and Example 23 ($f_A$=2.6)], said 1K thermosetting powder coating compositions had good PSS (physical storage stability), and at the same time these compositions provided—upon curing— impact resistant matt powder coatings (without the use of matting additives/agents e.g. silicas, waxes) which had also excellent low gloss consistency.

The results shown in Table 7 demonstrated that the 2K thermosetting powder coating compositions (Examples 24 and 25) failed to provide impact resistant mat powder coatings having at least sufficient low gloss consistency whilst in one case the physical storage stability was insufficient. In contrast to that the claimed 1K thermosetting powder coating compositions (Examples 4 and 7) provided for 1K thermosetting powder coating compositions which had good PSS (physical storage stability), and these compositions provided—upon curing—impact resistant matt powder coatings (without the use of matting additives/agents e.g. silicas, waxes) which had also at least sufficient low gloss consistency (one of them had excellent low gloss consistency), and also excellent batch-to-batch low gloss consistency.

In conclusion, from the results shown in Tables 1-7 (the terms shown in the Tables 1-7 are explained in the specification and in the Examples section), it becomes clear that only the compositions of the claimed invention provided for 1K thermosetting powder coating compositions which had at least good PSS (physical storage stability), and at the same time these compositions provided—upon curing-impact resistant matt powder coatings (without the use of matting additives/agents e.g. silicas, waxes) which had also at least sufficient low gloss consistency (most of them had excellent low gloss consistency), and also excellent batch-to-batch low gloss consistency. This unique combination of 1K (physically) storage stable thermosetting powder coating compositions which—upon curing—can afford impact resistant matt powder coatings (without the use of matting additives/agents e.g. silicas, waxes), and at least sufficient— preferably excellent—low gloss consistency as well as at least sufficient—preferably excellent—batch-to-batch low gloss consistency, is of extreme significance and importance, and as such it constitutes a major technological advancement for the powder coating technology.

The invention claimed is:

1. An one-component (1K) thermosetting powder coating composition A (PCC A) comprising:
   a) a binder (B) in an amount of at least 30 and at most 100 pph PCC A, wherein the B consists of:
      i) a polyester binder (PB) in an amount of at least 90.0 and at most 98.0 pph B, wherein the PB consists of a polyester resin A (PRA) and a polyester resin B (PRB), and wherein the weight ratio of the weight amount of PRA to the weight amount of PRB (R=weight of PRA/weight of PRB) is at least 0.50 and at most 4.00, and wherein the difference between the acid value of the PRB ($AV_B$) and the acid value of the PRA ($AV_A$) (DeltaAV=$AV_B$-$AV_A$) is at least 20 and at most 59 mg KOH/g, and
      ii) a crosslinker in an amount of at least 2.0 and at most 10.0 pph B, wherein the crosslinker is selected from the group consisting of β-hydroxylalkyl-amides and mixtures thereof, wherein the crosslinker is able to react with the PB, and
   b) a pigment in an amount of at least 0 and at most 70 pph PCC A,
   and
   wherein the PRA is the polycondensation reaction product of at least:
      a component A1 in an amount of at least 45.0 and at most 49.9, mol % based on PRA, wherein the component A1 consists of: i) 2,2-dimethylpropane-1,3-diol in an amount of at least 70 and at most 100% of the total amount of moles making up the A1, and
      ii) a diol-A1 selected from the group consisting of $C_{2-18}$ excluding the 2,2-dimethylpropane-1,3-diol, and mixtures thereof, in an amount of at least 0 and at most 30% of the total amount of moles making up the A1,
   and
      a component A2 in an amount of at least 48.0 and at most 55.0, mol % based on PRA, wherein the component A2 consists of: i) a dicarboxylic-acid- A2a selected from the group consisting of terephthalic acid, esters of terephthalic acid), isophthalic acid, esters of isophthalic acid, and mixtures thereof, in an amount of at least 90 and at most 100% of the total amount of moles making up the A2, and ii) a dicarboxylic-acid-A2b selected from the group consisting of $C_{6-18}$ aliphatic saturated dicarboxylic acids, esters of $C_{6-18}$ aliphatic saturated dicarboxylic acids, hexahydrophthalic anhydride, and mixtures thereof, in an amount of at least 0 and at most 10% of the total amount of moles making up the A2, and a component A3 in an amount of at least 0 and at most 2.7 mol % based on PRA, wherein the component A3 is selected from the group consisting of: i) an alcohol-A3 selected from the group consisting of $C_{3-10}$ aliphatic saturated alcohols having at least 3 and at most 6 hydroxyl groups, and mixtures thereof, and ii) a carboxylic-acid-anhydride-A3 selected from the group consisting of trimellitic acid anhydride, pyromellitic acid anhydride, and mixtures thereof, wherein the total amount of monomers reacted to produce the PRA is 100 mol %, and wherein the PRA
  is carboxylic acid functional having an acid value $(AV_A)$ as measured titrimetrically by ISO 2114-2000, of at least 15 and at most 35, and a hydroxyl value $(OHV_A)$ as measured titrimetrically by ISO 4629-2-2016, of at most 10 mg KOH/g,
  has a glass transition temperature $(T_{gA})$ as determined by Differential Scanning Calorimetry (DSC) according to the description, of at least 40 and at most 75° C., and
  has a functionality $(f_A)$ of at least 2.0 and at most 3.5 and
  has a number average molecular weight $(M_{nA})$ as determined by Size Exclusion Chromatography (SEC) according to the description, of at least 1100 and at most 10000 Da,
  has a weight average molecular weight $(M_{wA})$ as determined by SEC according to the description, of at least 2200 and at most 20000 Da,
  has a polydispersity $D_A$ $(=M_{wA}/M_{nA})$ of at least 2.0 and at most 4.0, and
  has a melt viscosity $(N_A)$ as determined via rheometry according to the description, of at least 15 and at most 150 Pa·s, and wherein the PRB is the polycondensation reaction product of at least:
  a component B1 in an amount of at least 42 and at most 49.9, mol % based on PRB, wherein the component B1 consists of: i) a diol-B1a selected from the group consisting of ethylene glycol, 1,2-propane diol, 1,3-propane diol, and mixtures thereof, in an amount of at least 50 and at most 90% of the total amount of moles making up the B1, and ii) a diol-B1b selected from the group consisting of $C_{4-18}$ and mixtures thereof, in an amount of at least 10 and at most 50% of the total amount of moles making up the B1, and a component B2, in an amount of at least 42 and at most 55, mol % on PRB, wherein the component B2 consists of: i) a dicarboxylic-acid-B2a selected from the group consisting of terephthalic acid, esters of terephthalic acid, isophthalic acid, esters of isophthalic acid, and mixtures thereof, in an amount of at least 80 and at most 100% of the total amount of moles making up the B2, and ii) a dicarboxylic-acid-B2b selected from the group consisting of $C_{6-18}$ aliphatic saturated dicarboxylic acids, esters of $C_{6-18}$ aliphatic saturated dicarboxylic acids, hexahydrophthalic anhydride, and mixtures thereof, in an amount of at least 0 and at most 20% of the total amount of moles making up the B2, and a component B3 in an amount of at least 0.5 and at most 8.5, mol % on PRB, wherein the component B3 is selected from the group consisting of: i) an alcohol-B3 selected from the group consisting of $C_{3-10}$ aliphatic saturated alcohols having at least 3 and at most 6 hydroxyl groups, and mixtures thereof, and ii) a carboxylic-acid-anhydride-B3 selected from the group consisting of trimellitic acid anhydride, pyromellitic acid anhydride, and mixtures thereof, and wherein the total amount of monomers reacted to produce the PRB is 100 mol %, and wherein the PRB is a branched carboxylic acid functional having an acid value $(AV_B)$ as measured titrimetrically by ISO 2114-2000, of at least 40 and at most 74,
  and a hydroxyl value $(OHV_A)$ as measured titrimetrically by ISO 4629-2-2016, of at most 10 mg KOH/g,
  has a glass transition temperature $(T_{gB})$ as determined by DSC according to the description, of at least 40 and at most 80° C., and
  has a functionality $(f_B)$ of at least 2.7 and at most 6.0, and
  has a number average molecular weight $(M_{nB})$ as determined by SEC according to the description, of at least 1100 and at most 10000 Da,
  has a weight average molecular weight $(M_{wB})$ as determined by SEC according to the description, of at least 3000 and at most 25000 Da,
  has a polydispersity $D_B$ $(=M_{wB}/M_{nB})$ of at least 2.5 and at most 4.0, and
  has a melt viscosity $(N_B)$ as determined via rheometry according to the description, of at least 8 and at most 120 Pa·s, and wherein the β-hydroxylalkyl-amide compounds are chemical compounds having the average chemical structure represented by the following Formulae 1 or 2:

Formula 1

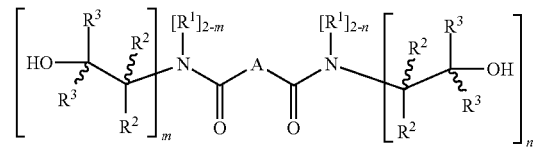

wherein:
n ranges from and including 1 up to and including 2;
m ranges from and including 1 up to and including 2;
A is a $C_{1-60}$ optionally-substituted-hydrocarbylene linking group;
$R^1$ is hydrogen, or a $C_{1-5}$ alkyl group optionally substituted with one or more hydroxyl groups;
$R^2$ is hydrogen, or a $C_{1-5}$ alkyl group;
$R^3$ is hydrogen, or a $C_{1-5}$ alkyl group;
while one of the groups $R^2$ and one of the groups $R^3$ of the unit m, may also form—together with the adjacent carbon atoms—, a cycloalkyl group; and/or while one of the groups $R^2$ and one of the groups $R^3$ of the unit n, may also form—together with the adjacent carbon atoms—, a cycloalkyl group,

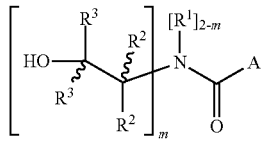

Formula 2

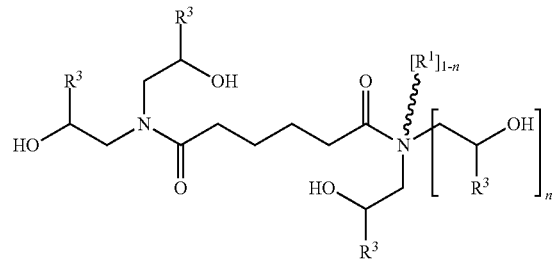

Formula 3 wherein:

m ranges from and including 1 up to and including 2;

A is a $C_{1-60}$ optionally-substituted-hydrocarbyl;

$R^1$ is hydrogen, or a $C_{1-5}$ alkyl group optionally substituted with one or more hydroxyl groups;

$R^2$ is hydrogen, or a $C_{1-5}$ alkyl group;

$R^3$ is hydrogen, or a $C_{1-5}$ alkyl group;

while one of the groups $R^2$ and one of the groups $R^3$, may also form—together with the adjacent carbon atoms—, a cycloalkyl group.

2. The PCC A as claimed in claim 1, wherein the PRB has an acid value of at least 45 and at most 74 mg KOH/g.

3. The PCC A as claimed in claim 1, wherein the PRB has an acid value of at least 50 and at most 74 mg KOH/g.

4. The PCC A as claimed in claim 1, wherein the diol-B1a is ethylene glycol.

5. The PCC A as claimed in claim 1, wherein the diol-B1b is 2,2-dimethylpropane-1,3-diol.

6. The PCC A as claimed in claim 1, wherein the component B3 is trimellitic acid anhydride in an amount of at least 3 and at most 7 mol % on PRB.

7. The PCC A as claimed in claim 1, wherein the dicarboxylic-acid-B2a is selected from the group consisting of isophthalic acid, terephthalic acid, and mixtures thereof, in an amount of at least 95 and at most 100% of the total amount of moles making up the B2, and the dicarboxylic-acid-B2b is adipic acid in an amount of at least 0 and at most 5% of the total amount of moles making up the B2.

8. The PCC A as claimed in claim 1, wherein the component A1 is 2,2-dimethylpropane-1,3-diol.

9. The PCC A as claimed in claim 1, wherein the dicarboxylic-acid-A2a is a mixture of terephthalic acid and isophthalic acid, in an amount of at least 90 and at most 100% of the total amount of moles making up the A2, and the dicarboxylic-acid-A2b is adipic acid in an amount of at least 0 and at most 10% of the total amount of moles making up the A2.

10. The PCC A as claimed in claim 1, wherein the R is at least at least 0.80 and at most 1.25.

11. The PCC A as claimed in claim 1, wherein the the crosslinker is selected from the group consisting of β-hydroxylalkyl-amides having the average structure represented by the following Formula 3, and mixtures thereof, wherein n ranges from and including 0.2 up to and including 1

$R^1$ is hydrogen, or a $C_{1-5}$ alkyl group;

$R^3$ is hydrogen, or a $C_{1-5}$ alkyl group.

12. The PCC A as claimed in claim 1, wherein the PCC A, comprises:

a) a binder (B) in an amount of at least 30 and at most 100 pph PCC A, wherein the B consists of:
 i) a polyester binder (PB) in an amount of at least 90.0 and at most 98.0 pph B, wherein the PB consists of a polyester resin A (PRA) and a polyester resin B (PRB), and wherein the weight ratio of the weight amount of PRA to the weight amount of PRB (R=weight of PRA/weight of PRB) is at least 0.50 and at most 4.00, and wherein the difference between the acid value of the PRB ($AV_B$) and the acid value of the PRA ($AV_A$) (DeltaAV=$AV_B$-$AV_A$) is at least 20 and at most 59 mg KOH/g, and
 ii) a crosslinker in an amount of at least 2.0 and at most 10.0 pph B, wherein the crosslinker is selected from the group consisting of β-hydroxylalkyl-amides and mixtures thereof, b) a pigment in an amount of at least 0 and at most 70 pph PCC A, and wherein the PRA is the polycondensation reaction product of at least:
 a component A1 in an amount of at least 47.5 and at most 49.9 mol % based on PRA, wherein the component A1 consists of: i) 2,2-dimethylpropane-1,3-diol in an amount of at least 95 and at most 100% of the total amount of moles making up the A1, and ii) a diol-A1 selected from the group consisting of $C_{2-18}$ excluding the 2,2-dimethylpropane-1,3-diol, and mixtures thereof, in an amount of at least 0 and at most 5% of the total amount of moles making up the A1, and a component A2 in an amount of at least 49.5 and at most 53.0 mol % based on PRA, wherein the component A2 consists of: i) a dicarboxylic-acid-A2a selected from the group consisting of terephthalic acid, esters of terephthalic acid), isophthalic acid, esters of isophthalic acid), and mixtures thereof, in an amount of at least 90 and at most 100% of the total amount of moles making up the A2, and ii) a dicarboxylic-acid-A2b selected from the group consisting of $C_{6-18}$ aliphatic saturated dicarboxylic acids), esters of $C_{6-18}$ aliphatic saturated dicarboxylic acids), hexahydrophthalic anhydride, and mixtures thereof, in an amount of at least 0 and at most 10% of the total amount of moles making up the A2, and a component A3 in an amount of at least 0 and at most 1 mol % based on PRB, wherein the component A3 is selected from the group consisting of:
i) an alcohol-A3 selected from the group consisting of $C_{3-10}$ aliphatic saturated alcohols having at least 3 and at most 6 hydroxyl groups, and mixtures thereof, and ii) a carboxylic-acid-anhydride-A3 selected from the group consisting of trimellitic acid anhydride, pyromellitic acid anhydride, and mixtures thereof, and wherein the total amount of monomers reacted to produce the PRA is 100 mol %, and wherein the PRA is carboxylic acid functional having an acid value ($AV_A$) as measured titrimetrically by ISO 2114-2000, of at least 22 and at most 35 mg KOH/g, and a hydroxyl value ($OHV_A$) as measured titrimetrically by ISO 4629-2-2016, of at most 10 mg KOH/g, and has a glass transition temperature ($T_{gA}$) as determined by Differential Scanning Calorimetry (DSC) according to the description, of at least 50 and at most 65° C., and has a functionality ($f_A$) of at least 2.0 and at most 2.5, and has a number average molecular weight ($M_{nA}$) as determined by Size Exclusion Chromatography (SEC) according to the description, of at least 3000 and at most 6000 Da, has a weight average molecular weight ($M_{wA}$) as determined by SEC according to the description, of at least 7000 and at most 16000 Da, and has a polydispersity $D_A$ ($=M_{wA}/M_{nA}$) of at least 2.0 and at most 3.5, and has a melt viscosity (NA) as determined via rheometry according to the description, of at least 15 and at most 150 Pa·s, and wherein the PRB is the polycondensation reaction product of at least:

a component B1 in an amount of at least 47.0 and at most 49.0 mol % based on PRB, wherein the component B1 consists of: i) a diol-B1a selected from the group consisting of ethylene glycol, 1,2-propane diol, 1,3-propane diol, and mixtures thereof, in an amount of at least 60 and at most 75% of the total amount of moles making up the B1, and ii) a diol-B1b selected from the group consisting of $C_{4-18}$ and mixtures thereof, in an amount of at least 25 and at most 40% of the total amount of moles making up the B1, and a component B2, in an amount of at least 44.0 and at most 48.0, mol % on PRB, wherein the component B2 consists of: i) a dicarboxylic-acid-B2a selected from the group consisting of terephthalic acid, esters of terephthalic acid), isophthalic acid, esters of isophthalic acid), and mixtures thereof, in an amount of at least 80 and at most 100% of the total amount of moles making up the B2, and ii) a dicarboxylic-acid-B2b selected from the group consisting of $C_{6-18}$ aliphatic saturated dicarboxylic acids), esters of $C_{6-18}$ aliphatic saturated dicarboxylic acids), hexahydrophthalic anhydride, and mixtures thereof, in an amount of at least 0 and at most 20% of the total amount of moles making up the B2, and a component B3 in an amount of at least 5.0 and at most 8.0 mol % on PRB, wherein the component B3 is selected from the group consisting of: i) an alcohol-B3 selected from the group consisting of $C_{3-10}$ aliphatic saturated alcohols having at least 3 and at most 6 hydroxyl groups, and mixtures thereof, and ii) a carboxylic-acid-anhydride-B3 selected from the group consisting of trimellitic acid anhydride, pyromellitic acid anhydride, and mixtures thereof, and wherein the total amount of monomers reacted to produce the PRB is 100 mol %, and wherein the PRB is a branched carboxylic acid functional having an acid value ($AV_B$) as measured titrimetrically by ISO 2114-2000, of at least 60.0 and at most 74.0 mg KOH/g, and a hydroxyl value ($OHV_A$) as measured titrimetrically by ISO 4629-2-2016, of at most 10 mg KOH/g, and has a glass transition temperature ($T_{gB}$) as determined by DSC according to the description, of at least 50 and at most 70° C., and has a functionality ($f_B$) of at least 3.5 and at most 5.0, and has a number average molecular weight ($M_{nB}$) as determined by SEC according to the description, of at least 2000 and at most 5000 Da, and has a weight average molecular weight ($M_{wB}$) as determined by SEC according to the description, of at least 6000 and at most 13000 Da, and has a polydispersity $D_B$ ($=M_{wB}/M_{nB}$) of at least 2.0 and at most 4.0, and has a melt viscosity ($N_B$) as determined via rheometry according to the description, of at least 8 and at most 120 Pa·s, and wherein the β-hydroxylalkyl-amide compounds are chemical compounds having the average chemical structure represented by the following Formulae 1 or 2:

Formula 1

$$\left[ HO \underset{R^3}{\overset{R^3}{\underset{|}{\overset{|}{C}}}}\underset{R^2}{\overset{R^2}{\underset{|}{\overset{|}{C}}}} \right]_m \underset{O}{\overset{[R^1]_{2-m}}{N}} - \underset{O}{\overset{}{C}} - A - \underset{O}{\overset{}{C}} - \underset{}{\overset{[R^1]_{2-n}}{N}} \left[ \underset{R^2}{\overset{R^2}{\underset{|}{\overset{|}{C}}}}\underset{R^3}{\overset{R^3}{\underset{|}{\overset{|}{C}}}} OH \right]_n$$

wherein:

n ranges from and including 1 up to and including 2;

m ranges from and including 1 up to and including 2;

A is a $C_{1-60}$ optionally-substituted-hydrocarbylene) linking group;

$R^1$ is hydrogen, or a $C_{1-5}$ alkyl group optionally substituted with one or more hydroxyl groups;

$R^2$ is hydrogen, or a $C_{1-5}$ alkyl group;

$R^3$ is hydrogen, or a $C_{1-5}$ alkyl group;

while one of the groups $R^2$ and one of the groups $R^3$ of the unit m, may also form—together with the adjacent carbon atoms—, a cycloalkyl group; and/or while one of the groups $R^2$ and one of the groups $R^3$ of the unit n, may also form—together with the adjacent carbon atoms—, a cycloalkyl group,

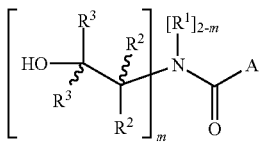

Formula 2 wherein:

m ranges from and including 1 up to and including 2;

A is a $C_{1-60}$ optionally-substituted-hydrocarbyl;

$R^1$ is hydrogen, or a $C_{1-5}$ alkyl group optionally substituted with one or more hydroxyl groups;

$R^2$ is hydrogen, or a $C_{1-5}$ alkyl group;

$R^3$ is hydrogen, or a $C_{1-5}$ alkyl group;

while one of the groups $R^2$ and one of the groups $R^3$, may also form—together with the adjacent carbon atoms—, a cycloalkyl group.

13. The PCC A as claimed in claim 1, wherein the PCC A comprises the pigment in an amount of at least 1 and at most 70 pph PCC A.

14. A cured PCC A as the PCC A is claimed in claim 1.

15. An article having either i) having coated thereon a PCC A as the PCC A, or ii) coated and cured thereon a PCC A, as the PCC A is claimed in claim 1.

16. A process for producing an article having coated and cured thereon a PCC A as claimed in claim 1, wherein the process comprises the steps of:
   a. applying the PCC A, to an article;
   b. heating the PCC A for enough time and at a suitable temperature to cure the PCC A to obtain the article having coated and cured thereon the PCC A.

17. A process for making a composition or an article, each one of them suitable for any one of the applications selected from the group consisting of powder coating applications, powder-in-mould coating applications, 3D-printing applications, automotive applications, marine applications, aerospace applications, medical applications, defense applications, sports/recreational applications, architectural applications, bottling applications, household applications, machinery applications, can applications, coil applications, energy applications, textile applications and electrical applications, wherein the process comprises the step of providing a PCC A as claimed in claim 1.

* * * * *